(12) United States Patent
Kobayashi

(10) Patent No.: US 11,881,102 B2
(45) Date of Patent: Jan. 23, 2024

(54) MEASUREMENT METHOD, MEASUREMENT DEVICE, MEASUREMENT SYSTEM, AND MEASUREMENT PROGRAM

(71) Applicant: Seiko Epson Corporation, Toyko (JP)

(72) Inventor: Yoshihiro Kobayashi, Komagane (JP)

(73) Assignee: SEIKO EPSON CORPORATION

( * ) Notice: Subject to any disclaimer, the term of this patent is extended or adjusted under 35 U.S.C. 154(b) by 166 days.

(21) Appl. No.: 17/204,091

(22) Filed: Mar. 17, 2021

(65) Prior Publication Data
US 2021/0304597 A1    Sep. 30, 2021

(30) Foreign Application Priority Data
Mar. 18, 2020    (JP) .................. 2020-047141

(51) Int. Cl.
*G08G 1/02* (2006.01)
*G01G 19/03* (2006.01)

(52) U.S. Cl.
CPC .............. *G08G 1/02* (2013.01); *G01G 19/03* (2013.01)

(58) Field of Classification Search
CPC ........ G08G 1/02; G01G 19/03; G01G 19/021; G01G 19/024; G01M 5/0066; G01M 5/0008
See application file for complete search history.

(56) References Cited

U.S. PATENT DOCUMENTS

| | | |
|---|---|---|
| 4,958,306 A | 9/1990 | Powell et al. |
| 7,668,692 B2 | 2/2010 | Tatom et al. |
| 8,094,922 B2 | 1/2012 | Lee et al. |
| 10,139,308 B2 | 11/2018 | Kobayashi |

(Continued)

FOREIGN PATENT DOCUMENTS

| | | |
|---|---|---|
| JP | 2006-084404 A | 3/2006 |
| JP | 2009-237805 A | 10/2009 |

(Continued)

OTHER PUBLICATIONS

Mar. 17, 2021, Measurement Method, Measurement Device, Measurement System, And Measurement Program, Yoshihiro Kobayashi.

(Continued)

*Primary Examiner* — Francis C Gray
(74) *Attorney, Agent, or Firm* — Harness, Dickey & Pierce, P.L.C.

(57) ABSTRACT

A measurement method includes: a step of acquiring first observation point information; a step of acquiring second observation point information; a step of calculating a path deflection waveform at a third observation point; a step of calculating a path deflection waveform at a central position between the first observation point and the second observation point; a step of calculating a measurement waveform as a physical quantity at the third observation point; a step of calculating an amplitude coefficient at which a difference is minimized between the measurement waveform and a waveform obtained by multiplying the path deflection waveform at the third observation point by the amplitude coefficient; and a step of calculating, based on the path deflection waveform at the central position and the amplitude coefficient, an estimation waveform as a physical quantity at the central position.

19 Claims, 27 Drawing Sheets

(56) References Cited

U.S. PATENT DOCUMENTS

| | | | |
|---|---|---|---|
| 10,198,640 B2 | 2/2019 | Kobayashi | |
| 10,620,085 B2 | 4/2020 | Zhang et al. | |
| 10,768,145 B2 | 9/2020 | Kobayashi | |
| 10,788,320 B2 | 9/2020 | Takada | |
| 10,830,652 B2 | 11/2020 | Irie | |
| 2006/0137914 A1* | 6/2006 | Hodac | G01M 5/0041 |
| | | | 702/175 |
| 2009/0024336 A1 | 1/2009 | Tatom et al. | |
| 2009/0303469 A1 | 12/2009 | Lee et al. | |
| 2012/0173171 A1 | 7/2012 | Bajwa et al. | |
| 2015/0316426 A1 | 11/2015 | Feichtinger et al. | |
| 2016/0171309 A1 | 6/2016 | Hay | |
| 2017/0038307 A1 | 2/2017 | Ohta et al. | |
| 2017/0097278 A1* | 4/2017 | Kobayashi | G01M 5/0066 |
| 2017/0098127 A1 | 4/2017 | Kobayashi | |
| 2017/0184471 A1 | 6/2017 | Kobayashi | |
| 2017/0184550 A1 | 6/2017 | Kobayashi | |
| 2018/0067637 A1 | 3/2018 | Hay | |
| 2018/0149554 A1* | 5/2018 | Kim | G01G 19/035 |
| 2018/0224352 A1 | 8/2018 | Zhang et al. | |
| 2018/0348064 A1 | 12/2018 | Irie et al. | |
| 2019/0025813 A1 | 1/2019 | Cella et al. | |
| 2019/0121348 A1 | 4/2019 | Cella et al. | |
| 2019/0212141 A1 | 7/2019 | Takada | |
| 2019/0212223 A1* | 7/2019 | Kusaka | E01C 23/01 |
| 2020/0247392 A1* | 8/2020 | Omori | E01D 22/00 |
| 2020/0363287 A1* | 11/2020 | Kinoshita | G01M 7/025 |
| 2021/0293604 A1 | 9/2021 | Kobayashi | |
| 2021/0293605 A1 | 9/2021 | Kobayashi | |
| 2021/0293657 A1 | 9/2021 | Kobayashi | |
| 2021/0302222 A1 | 9/2021 | Kobayashi | |
| 2021/0304597 A1 | 9/2021 | Kobayashi | |
| 2022/0136927 A1 | 5/2022 | Takada | |
| 2022/0261511 A1 | 8/2022 | Umekawa et al. | |
| 2022/0291078 A1 | 9/2022 | Kobayashi | |

FOREIGN PATENT DOCUMENTS

| | | |
|---|---|---|
| JP | 2014-228480 A | 12/2014 |
| JP | 2017-003556 A | 1/2017 |
| JP | 2017-020796 A | 1/2017 |
| JP | 2017-075821 A | 4/2017 |
| JP | 2018-031187 A | 3/2018 |
| JP | 2018-066637 A | 4/2018 |
| JP | 2019-049095 A | 3/2019 |
| JP | 6809691 B2 | 1/2021 |
| KR | 101163764 B1 | 7/2012 |
| WO | 2020-194539 A1 | 10/2020 |

OTHER PUBLICATIONS

Xiang-rong Yuan "Acceleration Integration Method for Calculating Dynamic Deflection of Bridge"; Article Code 1671-4229 (2007) 01-0052-04; vol. 6, No. 1; Published by School of Civil Engineering, Guangzhou University, Guangzhou 510006, China; dated Feb. 2007 (total 16 pages).

* cited by examiner

FIG. 9

| VEHICLE NUMBER | LANE NUMBER | AXLE NUMBER | ENTRY TIME POINT | ACCELERATION INTENSITY AT ENTRY TIME | EXIT TIME POINT | ACCELERATION INTENSITY AT EXIT TIME |
|---|---|---|---|---|---|---|
| 1 | 2 | 1 | ti11 | pai11 | to11 | pao11 |
| 1 | 2 | 2 | ti12 | pai12 | to12 | pao12 |
| 1 | 2 | 3 | ti13 | pai13 | to13 | pao13 |
| 1 | 2 | 4 | ti14 | pai14 | to14 | pao14 |
| 2 | 1 | 1 | ti21 | pai21 | to21 | pao21 |
| 2 | 1 | 2 | ti22 | pai22 | to22 | pao22 |
| 3 | 1 | 1 | ti31 | pai31 | to31 | pao31 |
| 3 | 1 | 2 | ti32 | pai32 | to32 | pao32 |
| ⋮ | | | | | | |

MEASUREMENT METHOD, MEASUREMENT DEVICE, MEASUREMENT SYSTEM, AND MEASUREMENT PROGRAM

The present application is based on, and claims priority from JP Application Serial Number 2020-047141, filed Mar. 18, 2020, the disclosure of which is hereby incorporated by reference herein in its entirety.

BACKGROUND

1. Technical Field

The present disclosure relates to a measurement method, a measurement device, a measurement system, and a measurement program.

2. Related Art

In maintaining and managing a bridge, an axle load of a large vehicle passing through the bridge is important information for predicting damage to the bridge. For axle load measurement, JP-A-2009-237805 proposes weight in motion, which is a method of continuously measuring a strain value when the vehicle passes from a strain gauge installed on a main girder of the bridge and calculating the axle load. JP-A-2009-237805 discloses a bridge-passing vehicle monitoring system that measures a vehicle weight of a vehicle passing through a bridge based on a strain waveform measured by a strain gauge arranged on a main girder of the bridge.

Specifically, in the bridge-passing vehicle monitoring system, the strain gauge is arranged on the main girder for each driving lane, a passage timing of the axle is detected based on the strain waveform measured by the strain gauge, an inter-axle ratio of the vehicle is calculated, the calculated inter-axle ratio is compared with an inter-axle ratio calculated based on an inter-axle distance registered in an inter-axle distance database, and the inter-axle distance, a vehicle speed, and a vehicle type of the vehicle are identified. The bridge-passing vehicle monitoring system generates a strain waveform in which a reference axle load strain waveform is arranged on a time axis according to the passage timing of the axle, and calculates the axle load of each axle by comparing the reference axle load strain waveform with a strain waveform measured by the strain gauge. Then, the bridge-passing vehicle monitoring system calculates the vehicle weight by summing the axle loads of each axle.

In the system disclosed in JP-A-2009-237805, the strain waveform at a central position of a path of a superstructure of the bridge is measured. However, when the strain gauge cannot be arranged at the central position, a measurement waveform at the central position cannot be estimated.

SUMMARY

A first aspect of a measurement method according to the present disclosure includes: a first observation point information acquisition step of acquiring, based on observation information obtained by an observation device that observes, among a first observation point, a second observation point, and a third observation point located at a position other than a central position between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when the plurality of parts passes the second observation point and a physical quantity which is a response to an action of each of the plurality of parts on the second observation point; a first path deflection waveform calculation step of calculating a deflection waveform at the third observation point, generated by the plurality of parts, based on the first observation point information, the second observation point information, a predetermined coefficient, and an approximate expression of deflection at the third observation point based on a structural model of the structure, calculating a deflection waveform at the third observation point generated by the moving object by adding the deflection waveform at the third observation point generated by the plurality of parts, and calculating a path deflection waveform at the third observation point based on the deflection waveform at the third observation point generated by the moving object; a second path deflection waveform calculation step of calculating a deflection waveform at the central position, generated by the plurality of parts, based on the first observation point information, the second observation point information, the predetermined coefficient, and an approximate expression of deflection at the central position based on the structural model of the structure, calculating a deflection waveform at the central position generated by the moving object by adding the deflection waveform at the central position generated by the plurality of parts, and calculating a path deflection waveform at the central position based on the deflection waveform at the central position generated by the moving object; a measurement waveform calculation step of calculating, based on observation information obtained by an observation device that observes the third observation point, a measurement waveform as a physical quantity at the third observation point; an amplitude coefficient calculation step of calculating an amplitude coefficient at which a difference is minimized between the measurement waveform and a waveform obtained by multiplying the path deflection waveform at the third observation point by the amplitude coefficient; and an estimation waveform calculation step of calculating, based on the path deflection waveform at the central position and the amplitude coefficient, an estimation waveform as a physical quantity at the central position.

In the first aspect of the measurement method, in the estimation waveform calculation step, the estimation waveform may be calculated by multiplying the path deflection waveform at the central position by the amplitude coefficient.

In the first aspect of the measurement method, in the amplitude coefficient calculation step, the amplitude coefficient and the difference may be calculated, and in the estimation waveform calculation step, the estimation waveform may be calculated by adding a difference to the waveform obtained by multiplying the path deflection waveform at the central position by the amplitude coefficient.

In the first aspect of the measurement method, for an integer n of 2 or more, the first observation point, the second observation point, the third observation point located at a position other than the central position between the first observation point and the second observation point to an (n+2)th observation point are arranged along the first direction.

In the first path deflection waveform calculation step, for each integer i of 1 or more and n or less, a deflection waveform at the (i+2)th observation point, generated by the plurality of parts may be calculated, based on the first observation point information, the second observation point information, the predetermined coefficient, and an approximate expression of deflection at the (i+2)th observation point based on the structural model of the structure, a deflection waveform at the (i+2)th observation point generated by the moving object may be calculated by adding the deflection waveform at the (i+2)th observation point generated by the plurality of parts, and a path deflection waveform at the (i+2)th observation point may be calculated based on the deflection waveform at the (i+2)th observation point generated by the moving object, in the measurement waveform calculation step, for each integer i, a measurement waveform as a physical quantity at the (i+2)th observation point may be calculated based on observation information obtained by an observation device that observes the (i+2)th observation point, in the amplitude coefficient calculation step, for each integer i, an i-th amplitude coefficient at which an i-th difference is minimized between a measurement waveform at the (i+2)th observation point and a waveform obtained by multiplying a path deflection waveform at the (i+2)th observation point by the i-th amplitude coefficient may be calculated, and in the estimation waveform calculation step, the estimation waveform may be calculated based on the path deflection waveform at the central position and an average value of first to n-th amplitude coefficients.

In the first aspect of the measurement method, in the estimation waveform calculation step, the estimation waveform may be calculated by multiplying the path deflection waveform at the central position by the average value.

In the first aspect of the measurement method, in the amplitude coefficient calculation step, for each integer i, the i-th amplitude coefficient and the i-th difference may be calculated, and in the estimation waveform calculation step, for each integer i, the i-th estimation waveform as the physical quantity at the central position may be calculated by adding the i-th difference to the waveform obtained by multiplying the path deflection waveform at the central position by the i-th amplitude coefficient, and the estimation waveform may be calculated by averaging the first to n-th estimation waveforms.

In the first aspect of the measurement method, the physical quantity at the third observation point may be a displacement or a load generated by the moving object.

In the first aspect of the measurement method, the first observation point may be set at a first end portion of the structure, and the second observation point may be set at a second end portion of the structure different from the first end portion.

In the first aspect of the measurement method, the approximate expression of deflection at the central position and the approximate expression of deflection at the third observation point may be normalized by a maximum value of the approximate expression of deflection at the central position.

In the first aspect of the measurement method, the moving object may be a railroad vehicle, an automobile, a tram, a construction vehicle, or a military vehicle, and the plurality of parts may be axles or wheels.

In the first aspect of the measurement method, the structural model may be a simple beam that supports both ends.

In the first aspect of the measurement method, the observation device that observes the first observation point, the observation device that observes the second observation point, and the observation device that observes the third observation point may be acceleration sensors.

In the first aspect of the measurement method, the observation device that observes the first observation point and the observation device that observes the second observation point may be an impact sensor, a microphone, a strain gauge, or a load cell.

In the first aspect of the measurement method, the observation device that observes the third observation point may be a contact type displacement meter, a ring type displacement meter, a laser displacement meter, a pressure sensor, a displacement measurement device by image processing, or a displacement measurement device by an optical fiber.

In the first aspect of the measurement method, the structure may be a superstructure of a bridge, the superstructure may be a structure across any one of a bridge abutment and a bridge pier adjacent to each other, two adjacent bridge abutments, or two adjacent bridge piers, both end portions of the superstructure may be located at positions of the bridge abutment and the bridge pier adjacent to each other, at positions of the two adjacent bridge abutments, or at positions of the two adjacent bridge piers, and the bridge may be a road bridge or a railway bridge.

In the first aspect of the measurement method, the structure may be a structure in which bridge weigh in motion (BWIM) functions.

An aspect of a measurement device according to the present disclosure includes: a first observation point information acquisition unit that acquires, based on observation information obtained by an observation device that observes, among a first observation point, a second observation point, and a third observation point located at a position other than a central position between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition unit that acquires, based on observation information obtained by an observation device that observes the second observation point, second observation point information including a time point when each of the plurality of parts passes the second observation point and a physical quantity which is a response to an action of each of the plurality of parts on the second observation point; a first path deflection waveform calculation unit that calculates a deflection waveform at the third observation point, generated by the plurality of parts, based on the first observation point information, the second observation point information, a predetermined coefficient, and an approximate expression of deflection at the third observation point based on a structural model of the structure, that calculates a deflection waveform at the third observation point generated by the moving object by adding the deflection waveform at the third observation point generated by the plurality of parts, and that calculates a path deflection waveform at the third observation point based on the deflection waveform at the third observation point generated by the moving object; a second path deflection waveform calculation unit that calculates a deflection waveform at the central position, generated by the plurality of parts, based on the first observation point information, the second observation point information, the predetermined coefficient, and the approximate expression of deflection at the central position based on the structural model of the structure, that calculates a deflection waveform at the central position generated by the moving object by adding the deflection waveform at the central position generated by the plurality of parts, and that calculates a path deflection waveform at the central position based on the deflection waveform at the central position generated by the moving object; a measurement waveform calculation unit that calculates a measurement waveform as a physical quantity at the third observation point based on observation information obtained by an observation device that observes the third observation point; an amplitude coefficient calculation unit that calculates an amplitude coefficient at which a difference is minimized between the measurement waveform and a waveform obtained by multiplying the path deflection waveform at the third observation point by the amplitude coefficient; and an estimation waveform calculation unit that calculates, based on the path deflection waveform at the central position and the amplitude coefficient, an estimation waveform as a physical quantity at the central position.

An aspect of a measurement system according to the present disclosure includes: the measurement device according to the first aspect; the observation device that observes the first observation point; the observation device that observes the second observation point; and the observation device that observes the third observation point.

An aspect of a measurement program according to the present disclosure causes a computer to execute: a first observation point information acquisition step of acquiring, based on observation information obtained by an observation device that observes, among a first observation point, a second observation point, and a third observation point located at a position other than a central position between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when the plurality of parts passes the second observation point and a physical quantity which is a response to an action of each of the plurality of parts on the second observation point; a first path deflection waveform calculation step of calculating a deflection waveform at the third observation point, generated by the plurality of parts, based on the first observation point information, the second observation point information, a predetermined coefficient, and an approximate expression of deflection at the third observation point based on a structural model of the structure, calculating a deflection waveform at the third observation point generated by the moving object by adding the deflection waveform at the third observation point generated by the plurality of parts, and calculating a path deflection waveform at the third observation point based on the deflection waveform at the third observation point generated by the moving object; a second path deflection waveform calculation step of calculating a deflection waveform at the central position, generated by the plurality of parts, based on the first observation point information, the second observation point information, the predetermined coefficient, and an approximate expression of deflection at the central position based on the structural model of the structure, calculating a deflection waveform at the central position generated by the moving object by adding the deflection waveform at the central position generated by the plurality of parts, and calculating a path deflection waveform at the central position based on the deflection waveform at the central position generated by the moving object; a measurement waveform calculation step of calculating, based on observation information obtained by an observation device that observes the third observation point, a measurement waveform as a physical quantity at the third observation point; an amplitude coefficient calculation step of calculating an amplitude coefficient at which a difference is minimized between the measurement waveform and a waveform obtained by multiplying the path deflection waveform at the third observation point by the amplitude coefficient; and an estimation waveform calculation step of calculating, based on the path deflection waveform at the central position and the amplitude coefficient, an estimation waveform as a physical quantity at the central position.

BRIEF DESCRIPTION OF THE DRAWINGS

FIG. 9 is a diagram showing an example of axle information.

DESCRIPTION OF EXEMPLARY EMBODIMENTS

Hereinafter, embodiments of the present disclosure will be described in detail with reference to the drawings. The embodiments described below do not in any way limit contents of the present disclosure described in the appended claims. Not all configurations described below are necessarily essential components of the present disclosure.

1. First Embodiment 1-1 Measurement System

Hereinafter, a measurement system for implementing a measurement method according to the present embodiment will be described by taking a case where a structure is a superstructure of a bridge and a moving object is a vehicle as an example. The vehicle passing through the bridge according to the present embodiment is a vehicle having a large weight such as a railroad vehicle, an automobile, a tram, a construction vehicle, or a military vehicle, and can be measured by bridge weigh in motion (BWIM). The BWIM is a technology that uses a bridge as a "scale" and that measures the weight and the number of axles of the vehicle passing through the bridge by measuring deformation of the bridge. The superstructure of the bridge, which enables analysis of the weight of the vehicle passing by based on a response such as deformation and strain, is a structure in which the BWIM functions. A BWIM system, which applies a physical process between an action on the superstructure of the bridge and the response, enables the measurement of the weight of the vehicle passing by.

Figure 1:
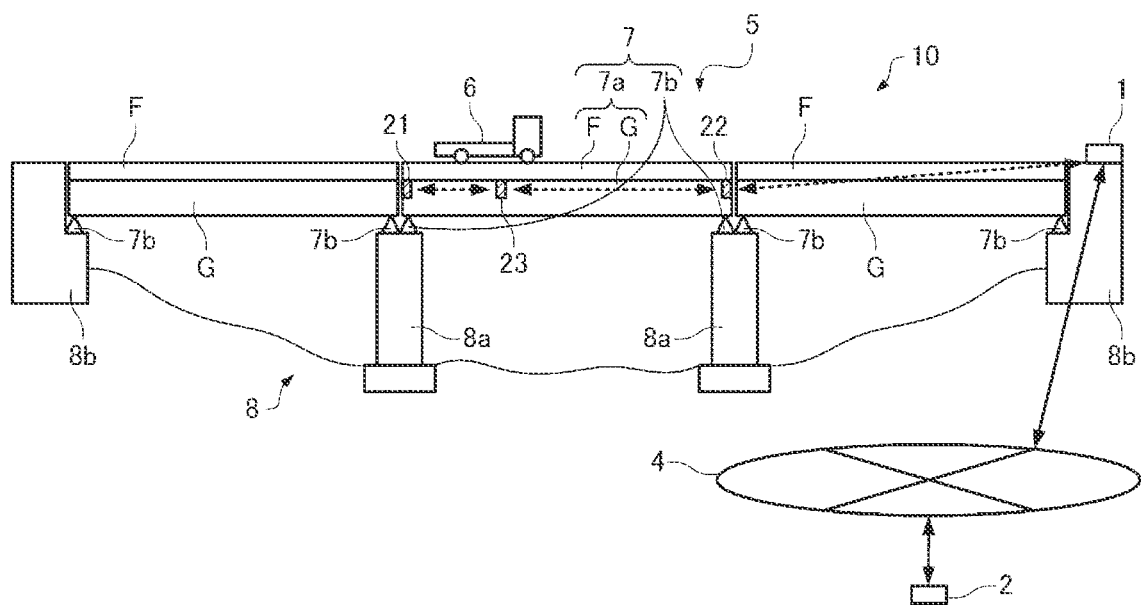
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and at least one sensor 21, at least one sensor 22, and at least one sensor 23 which are provided on a superstructure 7 of a bridge 5. The measurement system 10 may further include a server 2.

The bridge 5 is formed of the superstructure 7 and a substructure 8. The superstructure 7 includes a bridge floor 7a formed of a floor plate F, a main girder G, a cross girder which is not shown, and bearings 7b. The substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 21, 22, and 23 are coupled by, for example, a cable which is not shown and communicate with one another via a communication network such as a controller area network (CAN). Alternatively, the measurement device 1 and the sensors 21, 22, and 23 may communicate with one another via a wireless network.

For example, each sensor 21 outputs data representing an impact caused by entry of the vehicle 6 which is a moving object to the superstructure 7. Each sensor 22 outputs data representing an impact caused by exit of the vehicle 6 from the superstructure 7. For example, each sensor 23 outputs data for calculating a displacement of the superstructure 7 due to the movement of the vehicle 6 which is the moving object. In the present embodiment, each of the sensors 21, 22, and 23 is an acceleration sensor, and may be, for example, a crystal acceleration sensor or a micro electro mechanical systems (MEMS) acceleration sensor.

In the present embodiment, each sensor 21 is installed at a first end portion of the superstructure 7 in a longitudinal direction. Each sensor 22 is installed at a second end portion of the superstructure 7 which is different from the first end portion in the longitudinal direction.

Each sensor 21 detects an acceleration generated when the vehicle 6 enters the superstructure 7. Each sensor 22 detects the acceleration generated when the vehicle 6 exits the superstructure 7. That is, in the present embodiment, each sensor 21 is an acceleration sensor that detects the entry of the vehicle 6 to the superstructure 7. Each sensor 22 is an acceleration sensor that detects the exit of the vehicle 6 from the superstructure 7.

Each sensor 23 is installed at a position other than a central position between the first end portion and the second end portion of the superstructure 7 in the longitudinal direction.

The floor plate F, the main girder G, and the like of the superstructure 7 are deformed downward and bent in a vertical direction by a load of the vehicle 6 traveling on the superstructure 7. Each sensor 23 detects the acceleration of the bending of the floor plate F and the main girder G due to the load of the vehicle 6 traveling on the superstructure 7.

The measurement device 1 calculates the displacement of the bending of the superstructure 7 due to the traveling of the vehicle 6 based on acceleration data output from the sensors 21, 22, and 23.

The measurement device 1 and the server 2 can communicate with each other via, for example, a wireless network of a mobile phone and a communication network 4 such as the Internet. The measurement device 1 transmits, to the server 2, information such as a time point when the vehicle 6 travels on the superstructure 7 and the displacement of the superstructure 7 due to the traveling of the vehicle 6. The server 2 may store the information in a storage device which is not shown, and may perform, based on the information, processing such as monitoring of an overloaded vehicle or determination of an abnormality in the superstructure 7.

In the present embodiment, the bridge 5 is a road bridge, for example, a steel bridge, a girder bridge, or a reinforced-concrete (RC) bridge.

Figure 2:
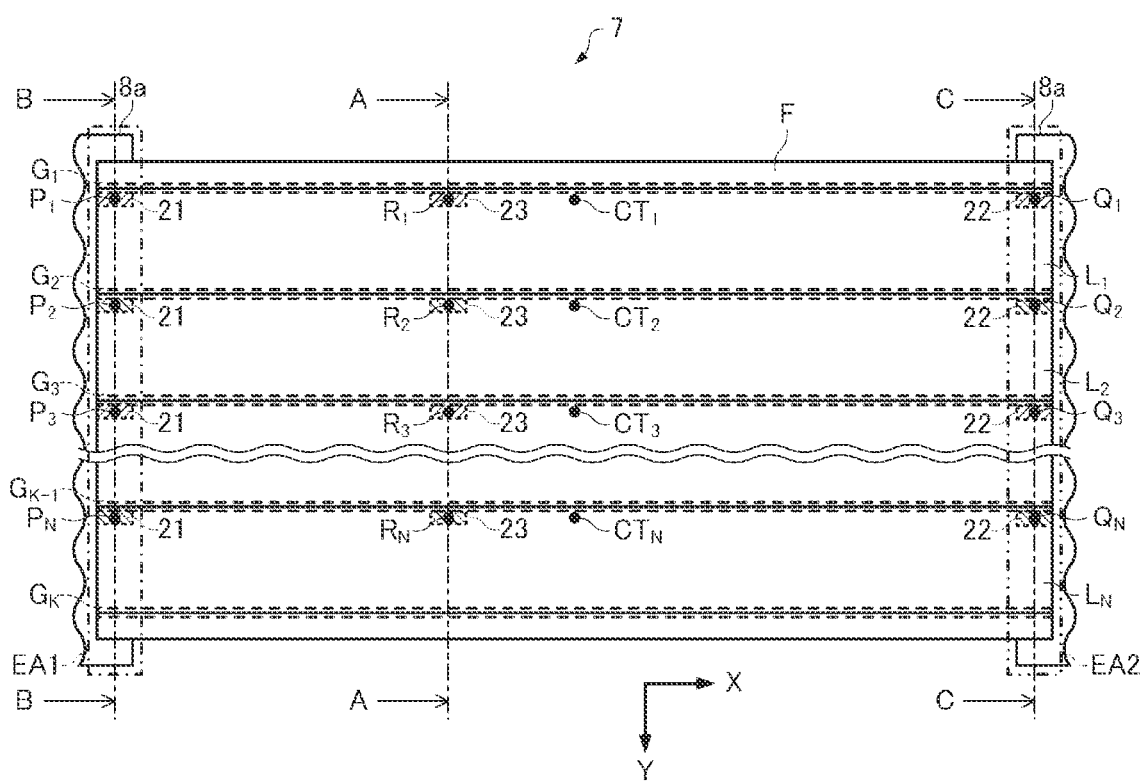
FIG. 2 is a diagram showing an arrangement example of sensors and observation points.
Figure 3:
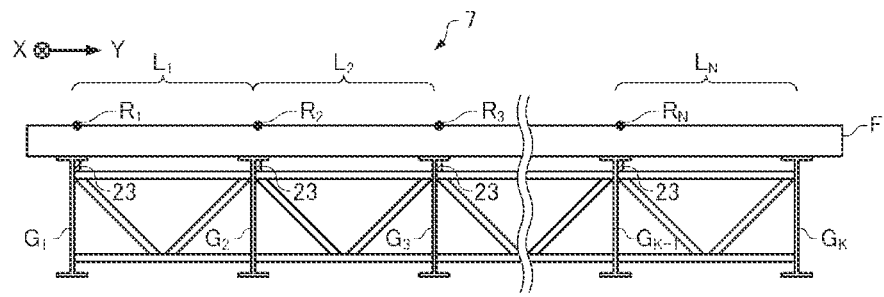
FIG. 3 is a diagram showing an arrangement example of the sensors and the observation points.
Figure 4:
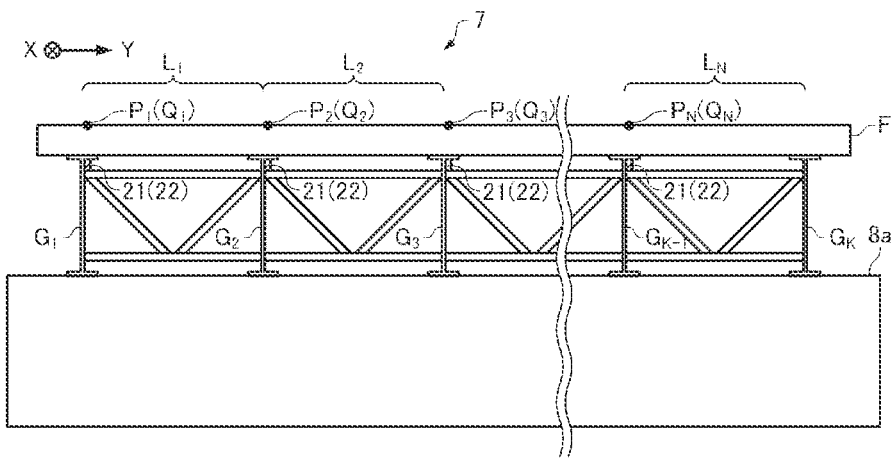
FIG. 4 is a diagram showing an arrangement example of the sensors and the observation points.

FIGS. 2, 3, and 4 are diagrams showing installation examples of the sensors 21, 22, and 23 on the superstructure 7. FIG. 2 is a diagram of the superstructure 7 as viewed from above. FIG. 3 is a cross-sectional view of FIG. 2 cut along a line A-A. FIG. 4 is a cross-sectional view of FIG. 2 cut along a line B-B line or a line C-C.

As shown in FIGS. 2, 3, and 4, the superstructure 7 has N lanes $L_1$ to $L_N$ and K main girders $G_1$ to $G_K$ as first to N-th paths through which the vehicle 6, which is the moving object, can move. Here, N and K are integers of 1 or more. In examples shown in FIGS. 2, 3, and 4, each position of the main girders $G_1$ to $G_K$ coincides with a position of each boundary between the lanes $L_1$ to $L_N$, and N=K−1. Alternatively, each position of the main girders $G_1$ to $G_K$ does not have to coincide with the position of each boundary between the lanes $L_1$ to $L_N$, and N≠K−1.

In the examples shown in FIGS. 2, 3, and 4, the sensor 21 is provided on each of the main girders $G_1$ to $G_{K-1}$ at a first end portion EA1 of the superstructure 7 in the longitudinal direction. The sensor 22 is provided on each of the main girders $G_1$ to $G_{K-1}$ at a second end portion EA2 of the superstructure 7 in the longitudinal direction. The sensor 23 is provided on each of the main girders $G_1$ to $G_{K-1}$ at a predetermined position between the first end portion EA1 and the second end portion EA2 of the superstructure 7 in the longitudinal direction. In the examples shown in FIGS. 2, 3, and 4, N=K−1, and the sensors 21, 22, and 23 are not provided on the main girder $G_K$. Alternatively, the sensors 21, 22, and 23 may be provided on the main girder $G_K$, and the sensors 21, 22, and 23 may not be provided on any one of the main girders $G_1$ to $G_{K-1}$. Alternatively, N=K, and the sensors 21, 22, and 23 may be provided on the main girders $G_1$ to $G_K$.

When the sensors 21, 22, and 23 are provided on the floor plate F of the superstructure 7, the sensors may be destroyed by a traveling vehicle, and measurement accuracy may be affected by local deformation of the bridge floor 7a. Therefore, in the examples shown in FIGS. 2, 3 and 4, the sensors 21, 22 and 23 are provided on the main girders $G_1$ to $G_{K-1}$ of the superstructure 7.

In the present embodiment, N observation points $P_1$ to $P_N$ are set in association with the N sensors 21. The observation points $P_1$ to $P_N$ are N observation points of the superstructure 7 arranged along a second direction intersecting a first direction in which the vehicle 6 moves along any one of the lanes $L_1$ to $L_N$ of the superstructure 7. In the examples shown in FIGS. 2, 3 and 4, for each integer j of 1 or more and N or less, an observation point $P_j$ is set at a position on a surface of the floor plate F in a vertically upward direction of the sensor 21 provided on a main girder $G_j$ at the first end portion EA1. That is, the sensor 21 provided on the main girder $G_j$ is an observation device that observes the observation point $P_j$. The sensor 21 that observes the observation point $P_j$ may be provided at a position where the acceleration generated at the observation point $P_j$ due to the traveling of the vehicle 6 can be detected, and it is desirable that the sensor 21 is provided at a position close to the observation point $P_j$. In this way, the observation points $P_1$ to $P_N$ have a one-to-one relationship with the N sensors 21.

In the present embodiment, N observation points $Q_1$ to $Q_N$ are set in association with the N sensors 22. The observation points $Q_1$ to $Q_N$ are N observation points of the superstructure 7 arranged along a third direction intersecting the first direction in which the vehicle 6 moves along any one of the lanes $L_1$ to $L_N$. In the examples shown in FIGS. 2, 3 and 4, for each integer j or 1 more and N or less, an observation point $Q_j$ is set at a position on the surface of the floor plate F in a vertically upward direction of the sensor 22 provided on the main girder $G_j$ at the second end portion EA2. That is, the sensor 22 provided on the main girder $G_j$ is an observation device that observes the observation point $Q_j$. The sensor 22 that observes the observation point $Q_j$ may be provided at a position where the acceleration generated at the observation point $Q_j$ due to the traveling of the vehicle 6 can be detected, and it is desirable that the sensor 22 is provided at a position close to the observation point $Q_j$. In this way, the observation points $Q_1$ to $Q_N$ have a one-to-one relationship with the N sensors 22.

In the present embodiment, N observation points $R_1$ to $R_N$ are set in association with the N sensors 23. The observation points $R_1$ to $R_N$ are N observation points of the superstructure 7 arranged along a fourth direction intersecting the first direction in which the vehicle 6 moves along any one of the lanes $L_1$ to $L_N$.

In the examples shown in FIGS. 2, 3 and 4, for each integer j of 1 or more and N or less, an observation point $R_j$ is set at a position on the surface of the floor plate F in a vertically upward direction of the sensor 23 provided on the main girder $G_j$ at a position other than a central position $CT_j$ between the observation point $P_j$ and the observation point $Q_j$. That is, the sensor 23 provided on the main girder $G_j$ is an observation device that observes the observation point $R_j$. The sensor 23 that observes the observation point $R_j$ may be provided at the position other than the central position $CT_j$ between the observation point $P_j$ and the observation point $Q_j$ and at a position where the acceleration generated at the observation point $R_j$ due to the traveling of the vehicle 6 can be detected, and it is desirable that the sensor 23 is provided at a position close to the observation point $R_j$. In this way, the observation points $R_1$ to $R_N$ have a one-to-one relationship with the N sensors 23.

The central position $CT_j$ is a position equidistant from the observation point $P_j$ and the observation point $Q_j$ in the lane $L_j$.

In the present embodiment, N observation points $P_1$ to $P_N$ are associated with the lanes $L_1$ to $L_N$, respectively. Similarly, the N observation points $Q_1$ to $Q_N$ are associated with the lanes $L_1$ to $L_N$. Similarly, the N observation points $R_1$ to $R_N$ are associated with the lanes $L_1$ to $L_N$. For each integer j of 1 or more and N or less, the observation point $P_j$, the observation point $Q_j$, and the observation point $R_j$ between the observation point $P_j$ and the observation point $Q_j$, which are set in association with the lane $L_j$, are arranged along the first direction in which the vehicle 6 moves along the lane $L_j$ of the superstructure 7.

In the examples shown in FIGS. 2, 3 and 4, the first direction is an X direction along the lanes $L_1$ to $L_N$ of the superstructure 7, that is, the longitudinal direction of the superstructure 7. The second direction, the third direction, and the fourth direction are a Y direction orthogonal to the X direction in a traveling surface of the superstructure 7 on which the vehicle 6 travels, that is, a width direction of the superstructure 7. However, when the lanes $L_1$ to $L_N$ are curved, the second direction, the third direction, and the fourth direction do not have to coincide with one another. The second direction, the third direction, and the fourth direction do not have to be orthogonal to the first direction. For example, a distance from an end of the superstructure 7 on a side where the vehicle 6 enters to the observation points $P_1$ to $P_N$ and a distance from an end of the superstructure 7 on a side where the vehicle 6 exits to the observation points $Q_1$ to $Q_N$ may be different. For example, distances from one end of the superstructure 7 to the observation points $R_1$ to $R_N$ may be different. For each integer j of 1 or more and N or less, the observation point $P_j$ is an example of a "first observation point", the observation point $Q_j$ is an example of a "second observation point", and the observation point $R_j$ is an example of a "third observation point".

The number and installation positions of the N sensors 21, 22 and 23 are not limited to the examples shown in FIGS. 2, 3 and 4, and various modifications can be made.

Figure 5:
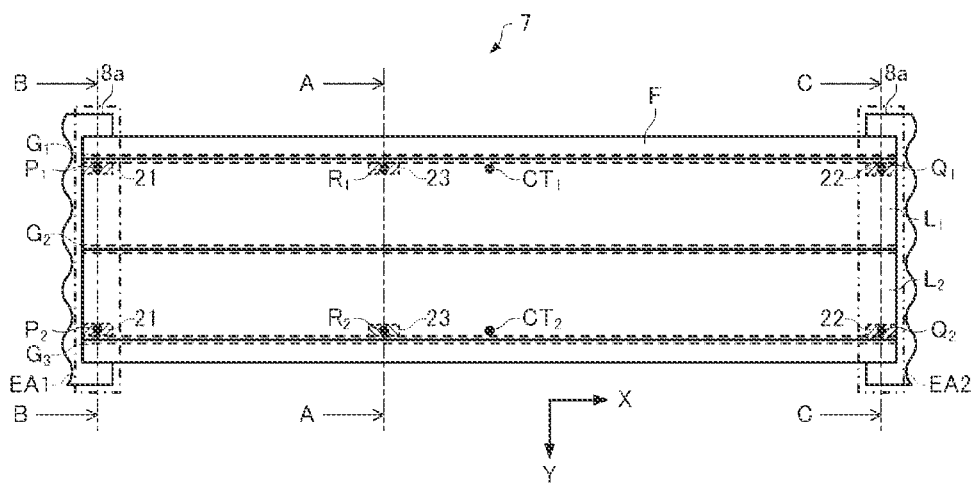
FIG. 5 is a diagram showing an arrangement example of the sensors and the observation points.
Figure 6:
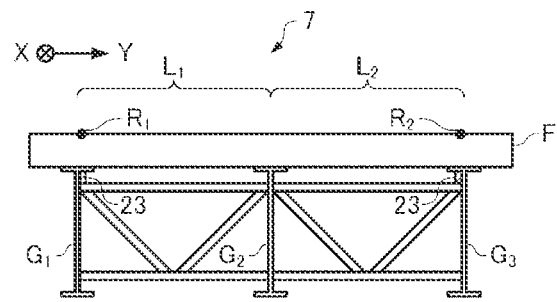
FIG. 6 is a diagram showing an arrangement example of the sensors and the observation points.
Figure 7:
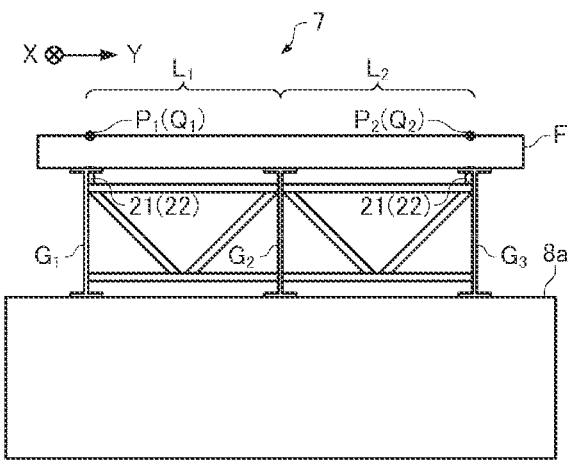
FIG. 7 is a diagram showing an arrangement example of the sensors and the observation points.

As an example, FIGS. 5, 6 and 7 show arrangement examples of the sensors 21, 22, and 23 and observation points $P_1$, $P_2$, $Q_1$, $Q_2$, $R_1$, and $R_2$ when N=2.

FIG. 5 is a diagram of the superstructure 7 as viewed from above. FIG. 6 is a cross-sectional view of FIG. 5 cut along a line A-A. FIG. 7 is a cross-sectional view of FIG. 5 cut along a line B-B line or a line C-C. In the examples shown in FIGS. 5, 6, and 7, two sensors 21 are provided on the main girders $G_1$ and $G_3$ at the first end portion EA1 of the superstructure 7. Two sensors 22 are provided on the main girders $G_1$ and $G_3$ at the second end portion EA2 of the superstructure 7. Two sensors 23 are provided on the main girders $G_1$ and $G_3$ at positions other than central positions $CT_1$ and $CT_2$.

The observation points $P_1$, $Q_1$ and $R_1$ corresponding to the lane $L_1$ are set at the positions on the surface of the floor plate F in the vertically upward direction of the sensors 21, 22 and 23 provided on the main girder $G_1$, respectively. The observation points $P_2$, $Q_2$ and $R_2$ corresponding to the lane $L_2$ are set at the positions on the surface of the floor plate F in the vertically upward direction of the sensors 21, 22 and 23 provided on the main girder $G_3$, respectively.

The sensor 21 provided on the main girder $G_1$ observes the observation point $P_1$. The sensor 21 provided on the main girder $G_3$ observes the observation point $P_2$. The sensor 22 provided on the main girder $G_1$ observes the observation point $Q_1$. The sensor 22 provided on the main girder $G_3$ observes the observation point $Q_2$. The sensor 23 provided on the main girder $G_1$ observes the observation point $R_1$. The sensor 23 provided on the main girder $G_3$ observes the observation point $R_2$.

The measurement device 1 acquires, based on the acceleration data output from each of the sensors 21, 22, and 23, an acceleration in a fifth direction which intersects the X direction, which is the first direction, and the Y direction, which is the second direction, the third direction, and the fourth direction. The observation points $P_1$ to $P_N$ and $Q_1$ to $Q_N$ are displaced by the impact in a direction orthogonal to the X and Y directions, and the observation points $R_1$ to $R_N$ bend in the direction orthogonal to the X and Y directions. Therefore, in order to accurately calculate a magnitude of the impact and a magnitude of the acceleration of the bending, it is desirable for the measurement device 1 to acquire the acceleration in the fifth direction orthogonal to the X and Y directions, that is, in a normal direction of the floor plate F.

Figure 8:
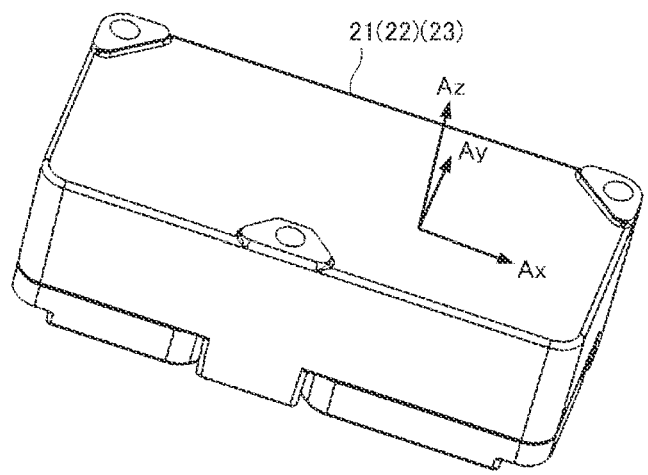
FIG. 8 is a diagram illustrating an acceleration detected by an acceleration sensor.

FIG. 8 is a diagram illustrating the acceleration detected by the sensors 21, 22, and 23. The sensors 21, 22, and 23 are acceleration sensors that detect the accelerations generated in three axes orthogonal to one another.

In order to detect the impact applied to the observation points $P_1$ to $P_N$ due to the entry of the vehicle 6 to the superstructure 7, each sensor 21 is installed such that one of three detection axes, which are an x axis, a y axis, and a z axis, intersects the first direction and the second direction. Similarly, in order to detect the impact applied to the observation points $Q_1$ to $Q_N$ due to the exit of the vehicle 6 from the superstructure 7, each sensor 22 is installed such that one of the three detection axes, which are the x axis, the y axis, and the z axis, intersects the first direction and the third direction. In order to detect the acceleration of the bending at the observation points $R_1$ to $R_N$ due to the traveling of the vehicle 6, each sensor 23 is installed such that one of the three detection axes, which are the x axis, the y axis, and the z axis, intersects the first direction and the fourth direction. In the examples shown in FIGS. 2, 3, and 4, since the first direction is the X direction, the second direction, the third direction, and the fourth direction are the Y direction, the sensors 21, 22, and 23 are installed such that one axis intersects the X direction and the Y direction. The observation points $P_1$ to $P_N$ and $Q_1$ to $Q_N$ are displaced by the impact in the direction orthogonal to the X direction and the Y direction. Therefore, in order to accurately detect the magnitude of the impact, ideally, the sensors 21 and 22 are installed such that one axis is in the direction orthogonal to the X direction and the Y direction, that is, the normal direction of the floor plate F. Further, the observation points $R_1$ to $R_N$ bend in the direction orthogonal to the X direction and the Y direction. Therefore, in order to accurately detect the acceleration of the bending, ideally, the sensors 23 are installed such that one axis is in the direction orthogonal to the X direction and the Y direction, that is, the normal direction of the floor plate F.

When the sensors 21, 22, and 23 are installed on the superstructure 7, an installation location may be inclined. In the measurement device 1, even if one of the three detection axes of each of the sensors 21, 22, and 23 is not installed in the normal direction of the floor plate F, since the direction is substantially oriented in the normal direction, an error is small and thus can be ignored. The measurement device 1 can correct a detection error due to the inclination of the sensors 21, 22, and 23 by a three-axis combined acceleration that combines the accelerations in the x axis, the y axis, and the z axis even if one of the three detection axes of each of the sensors 21, 22, and 23 is not installed in the normal direction of the floor plate F. Each of the sensors 21, 22 and 23 may be a one-axis acceleration sensor that detects the acceleration generated in a direction at least substantially parallel to the vertical direction or the acceleration in the normal direction of the floor plate F.

In the measurement method according to the present embodiment, the measurement device 1 estimates, based on the accelerations detected by the sensors 21, 22, and 23, the displacement at the central position $CT_j$ between the observation point $P_j$ and the observation point $Q_j$ for each lane $L_j$. Hereinafter, details of the measurement method according to the present embodiment executed by the measurement device 1 will be described.

1-2. Generation of Axle Information

In the present embodiment, the measurement device 1 acquires, based on the acceleration data, which is observation information obtained by the N sensors 21 as the observation device, first observation point information including a time point when each of a plurality of parts of the vehicle 6 which is the moving object passes the observation point $P_j$ and a physical quantity which is a response to an action of each of the plurality of parts on the observation point $P_j$. Similarly, in the present embodiment, the measurement device 1 acquires, based on the acceleration data, which is observation information by the N sensors 22 as the observation device, second observation point information including a time point when each of the plurality of parts of the vehicle 6 passes the observation point $Q_j$ and a physical quantity which is a response to an action of each of the plurality of parts on the observation point $Q_j$. Here, j is an integer of 1 or more and N or less.

In the present embodiment, it is considered that the load generated by a plurality of axles or wheels of the vehicle 6 is applied to the superstructure 7. Accordingly, each of the plurality of parts for which the first observation point information and the second observation point information are to be acquired is an axle or a wheel. Hereinafter, in the present embodiment, it is assumed that each of the plurality of parts is an axle.

In the present embodiment, each sensor 21, which is the acceleration sensor, detects the acceleration due to the action of each of the plurality of axles on the observation point $P_j$. Similarly, each sensor 22, which is the acceleration sensor, detects the acceleration due to the action of each of the plurality of axles on the observation point $Q_j$.

In the present embodiment, as shown in FIG. 2, the observation points $P_1$ to $P_N$ are set at the first end portion EA1, and the observation points $Q_1$ to $Q_N$ are set at the second end portion EA2. Therefore, the time point when each of the plurality of axles of the vehicle 6 passes the observation point $P_j$ can be regarded as an entry time point of each axle to the superstructure 7 and, more specifically, an entry time point to the lane $L_j$. The time point when each of the plurality of axles of the vehicle 6 passes the observation point $Q_j$ can be regarded as an exit time point of each axle from the superstructure 7, and more specifically, an exit time point from the lane $L_j$.

Therefore, in the present embodiment, the first observation point information includes an entry time point of each axle of the vehicle 6 to the lane $L_j$ and acceleration intensity as a physical quantity that is the response to the action when each axle enters the lane $L_j$. The second observation point information includes an exit time point of each axle of the vehicle 6 from the lane $L_j$ and acceleration intensity as a physical quantity that is the response to the action when each axle exits the lane $L_j$.

Further, since the entry and the exit of each axle of the vehicle 6 correspond to each other, the first observation point information and the second observation point information can be stratified. The first observation point information, the second observation point information, and stratified information thereof are collectively referred to as axle information.

That is, in addition to the first observation point information and the second observation point information, the axle information includes correspondence information on the entry time point to the lane $L_j$ and the acceleration intensity at the time of entry, the exit time point from the lane $L_j$ and the acceleration intensity at the time of exit for each axle, and correspondence information between the vehicle 6 and the above corresponding information for each axle. Therefore, with the axle information, for each vehicle 6 passing through the superstructure 7, the time points when each axle passes the lane $L_j$ and the observation points $P_j$ and $Q_j$, and the acceleration intensities at the time of passing are identified.

FIG. 9 shows an example of the axle information. In the example in FIG. 9, information in first to fourth rows is information related to the vehicle 6 whose vehicle number is 1. Information in the first row is information related to a leading axle whose axle number is 1. Information in the second row is information related to a second axle whose axle number is 2. Information in the third row is information related to a third axle whose axle number is 3. Information in the fourth row is information related to a fourth axle whose axle number is 4. For example, the correspondence information in the first row shows that, for the leading axle, whose axle number is 1, of the vehicle 6 whose vehicle number is 1, the entry time point to the lane $L_2$ is ti11, the acceleration intensity at the time of the entry is pai11, the exit time point from the lane $L_2$ is to11, and the acceleration intensity at the time of the exit is pao11.

Information in fifth and sixth rows is information related to the vehicle 6 whose vehicle number is 2. The information in the fifth row is the correspondence information related to the leading axle whose axle number is 1. The information in the sixth row is the correspondence information related to the second axle whose axle number is 2. For example, the correspondence information in the fifth row shows that, for the leading axle, whose axle number is 1, of the vehicle 6 whose vehicle number is 2, the entry time point to the lane $L_1$ is ti21, the acceleration intensity at the time of the entry is pai21, the exit time point from the lane $L_1$ is to21, and the acceleration intensity at the time of the exit is pao21.

Information in seventh and eighth rows is information related to the vehicle 6 whose vehicle number is 3. The information in the seventh row is the correspondence information related to the leading axle whose axle number is 1. The information in the eighth row is the correspondence information related to the second axle whose axle number is 2. For example, the correspondence information in the seventh row shows that, for the leading axle, whose axle number is 1, of the vehicle 6 whose vehicle number is 3, the entry time point to the lane $L_1$ is ti31, the acceleration intensity at the time of the entry is pai31, the exit time point from the lane $L_1$ is to31, and the acceleration intensity at the time of the exit is pao31.

As an example, in the case of the arrangement examples shown in FIGS. 5, 6, and 7, a procedure of generating the axle information by the measurement device 1 will be described.

In order to generate the axle information, the measurement device 1 converts the acceleration at each time point detected by each of the sensors 21 and 22 into an amplitude, and acquires the acceleration intensity. The acceleration detected by each sensor 22 is not used for acquiring the axle information.

Figure 10:
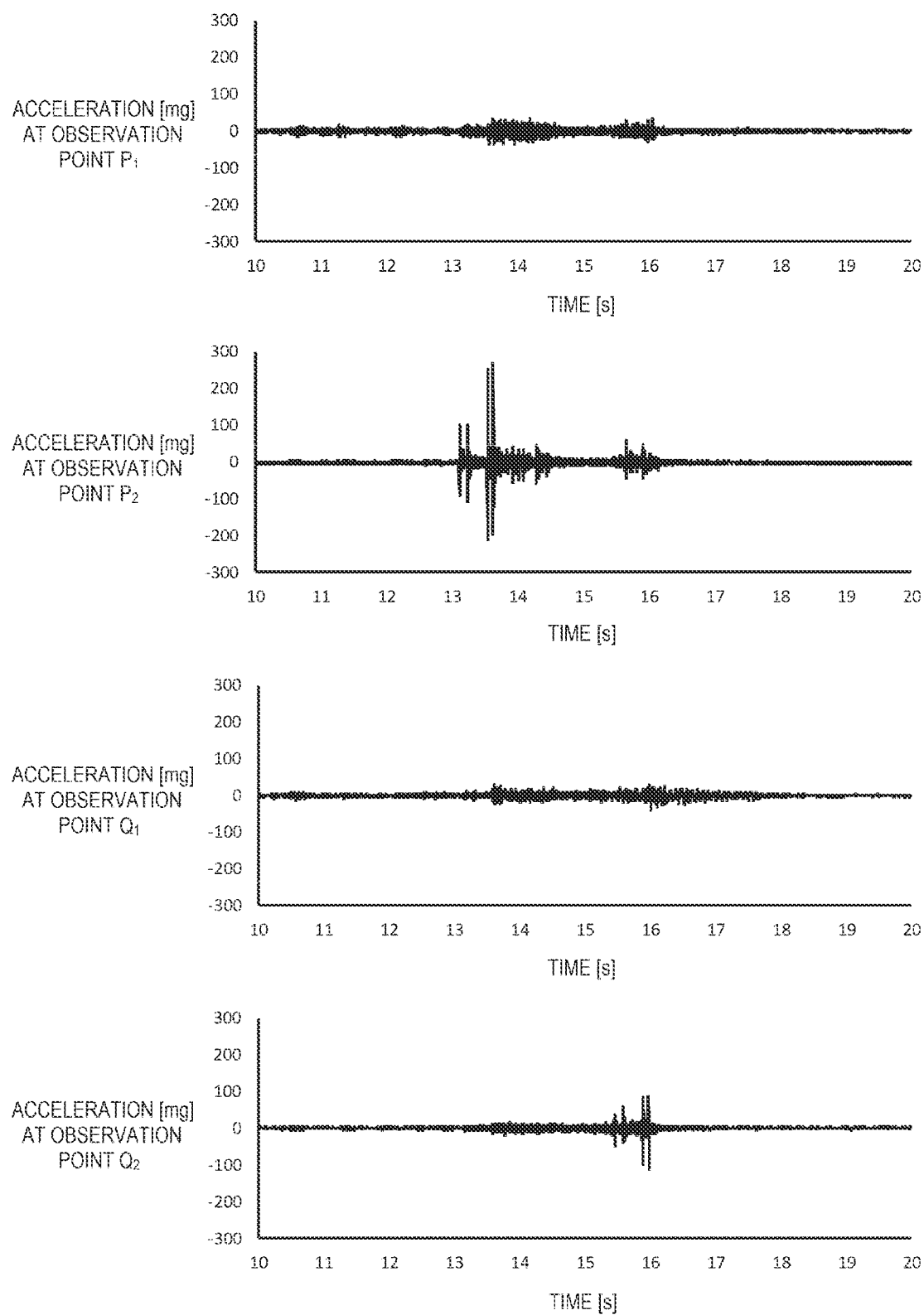
FIG. 10 shows diagrams showing examples of an acceleration detected with respect to an observation point.
Figure 11:
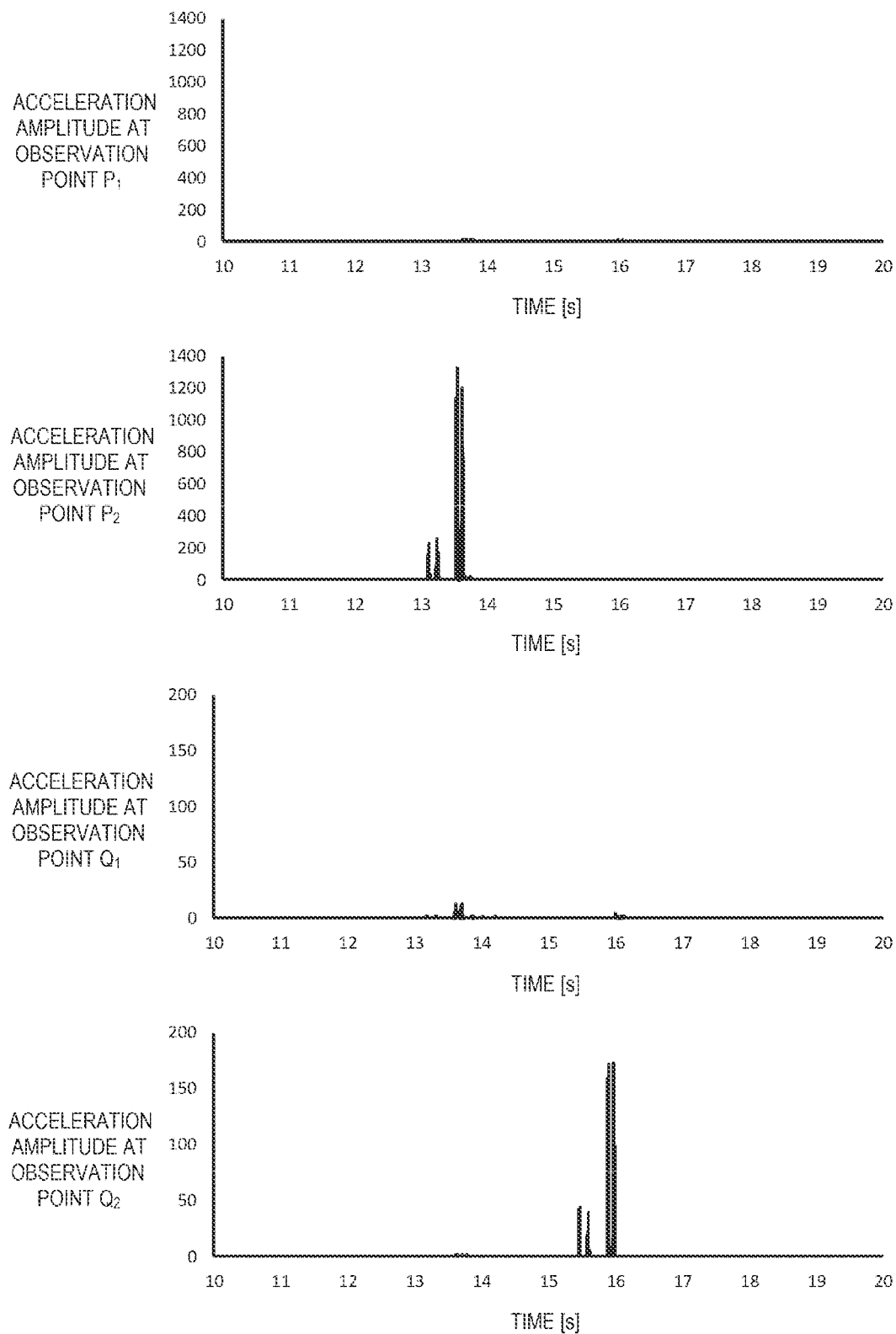
FIG. 11 shows diagrams in which an acceleration amplitude at each time point in FIG. 10 is converted into an acceleration intensity.

FIG. 10 shows diagrams showing examples of the acceleration detected for the observation points $P_1$, $P_2$, $Q_1$ and $Q_2$ when the vehicle 6 having four axles travels on the lane $L_2$. FIG. 11 shows diagrams in which the acceleration amplitude at each time point in FIG. 10 is converted into the acceleration intensity. In the examples in FIGS. 10 and 11, since the vehicle 6 is traveling on the lane $L_2$, a large acceleration intensity is acquired at the time point when each of the four axles of the vehicle 6 passes the observation points $P_2$ and $Q_2$. The acceleration intensity acquired at the time point when each of the four axles passes the observation point $P_2$ is included in the first observation point information. The acceleration intensity acquired at the time point when each of the four axles passes the observation point $Q_2$ is included in the second observation point information.

The measurement device 1 acquires a time point when the acquired acceleration intensity exceeds a predetermined threshold value as time points when the leading axle and subsequent axles successively pass the observation points $P_2$ and $Q_2$, that is, the entry time point of each axle to the lane $L_2$ and the exit time point of each axle from the lane $L_2$.

Figure 12:
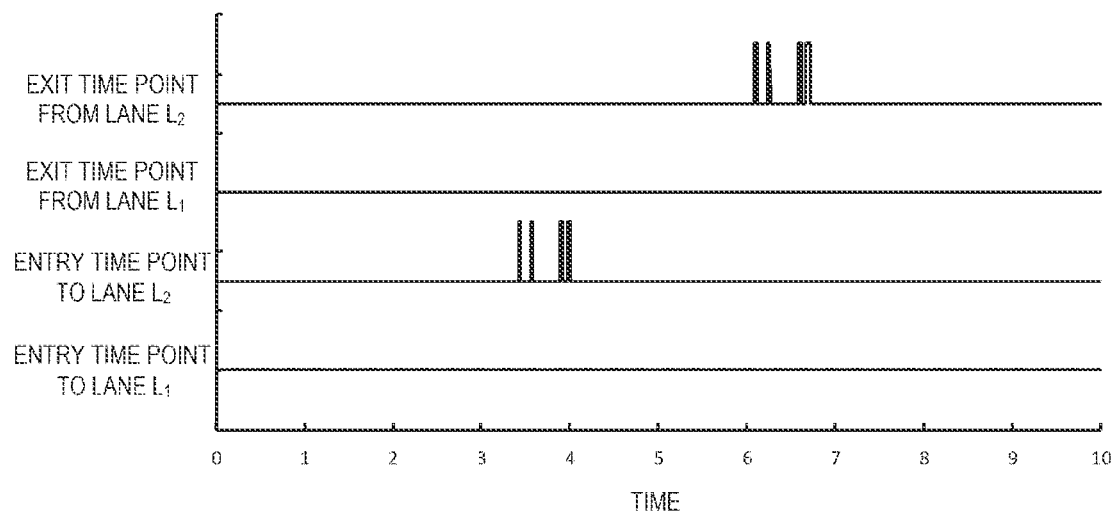
FIG. 12 is a diagram obtained by binarizing the acceleration intensity in FIG. 11 with a predetermined threshold value.

FIG. 12 is a diagram obtained by binarizing the acceleration intensities in FIG. 11 with the predetermined threshold value. In the example in FIG. 12, the entry time point of each of the four axles to the lane $L_2$ and the exit time point of each of the four axles from the lane $L_2$ are acquired. The entry time point of each of the four axles to the lane $L_2$ is included in the first observation point information. Further, the exit time of each of the four axles from the lane $L_2$ is included in the second observation point information.

Further, the measurement device 1 compares a pattern 1 of the entry time point of each of the four axles to the lane $L_2$ and a pattern 2 of the exit time point of each of the four axles from the lane $L_2$, and determines whether the two patterns are generated by the passage of the same vehicle 6. Since intervals among the four axles do not change, if the vehicle 6 travels on the superstructure 7 at a constant speed, the patterns 1 and 2 coincide with each other. For example, the measurement device 1 slides one of the time points of the patterns 1 and 2 so as to coincide the entry time point and the exit time point of the leading axle. When a difference between the entry time point and the exit time point of each of the second to fourth axles is less than or equal to a predetermined threshold value, the measurement device 1 determines that the patterns 1 and 2 are generated by the passage of the same vehicle 6. When the difference is greater than the predetermined threshold value, the measurement device 1 determines that the patterns 1 and 2 are generated by the passage of two vehicles 6. When two vehicles 6 continuously travel on one lane at the same speed, an erroneous determination that the plurality of axles of a preceding vehicle 6 and the plurality of axles of a rear vehicle 6 all belong to the axles of one vehicle 6 may occur. In order to avoid the erroneous determination, when an interval between the entry time point and the exit time point of two adjacent axles is a time difference more than or equal to a predetermined time, the measurement device 1 may distinguish that the entry time point and the exit time point of the two axles belong to two vehicles 6.

Figure 13:
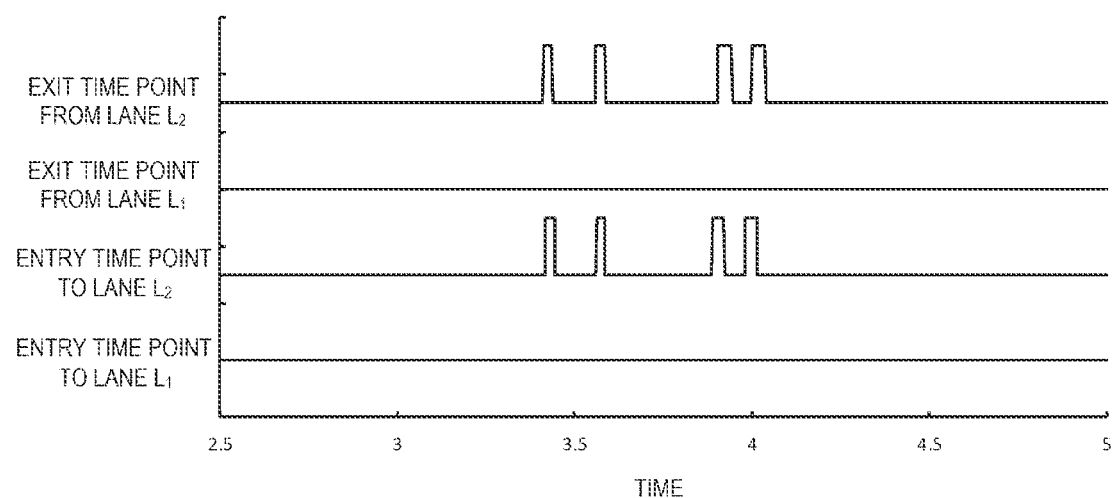
FIG. 13 is a diagram in which a pattern at an exit time point is slid with respect to FIG. 12.

FIG. 13 is a diagram in which the pattern 2 showing the exit time point from the lane $L_2$ of each of the four axles is slid so as to coincide the entry time point and the exit time point of the leading axle with respect to FIG. 12. FIG. 13 is enlarged in a horizontal axis direction with respect to FIG. 12. In the example in FIG. 13, the pattern 1 showing the entry time point of each of the four axles to the lane $L_2$ and the pattern 2 showing the exit time point of each of the four axles from the lane $L_2$ are substantially the same. It is determined that the patterns 1 and 2 are generated by the passage of the same vehicle 6.

Then, by associating the four entry time points to the lane $L_2$ shown in FIG. 12 and peak values of the four acceleration intensities at the observation point $P_2$ shown in FIG. 11, the four exit time points from the lane $L_2$ shown in FIG. 12, and peak values of the four acceleration intensities at the observation point $Q_2$ shown in FIG. 11 with one another in order from the leading axle, the measurement device 1 acquires the correspondence information of the leading axle, the correspondence information of the second axle, the correspondence information of the third axle, and the correspondence information of the fourth axle. Further, the measurement device 1 acquires the correspondence information in which the vehicle 6 traveling on the lane $L_2$ and the correspondence information of the four axles are associated with each other. These pieces of information are included in the axle information together with the first observation point information and the second observation point information.

Based on the axle information, the measurement device 1 can identify, for any vehicle 6 passing through the lane $L_j$ of the superstructure 7, the entry time point of each axle of the vehicle 6 to the observation point $P_j$, the acceleration intensity at the observation point $P_j$ by each axle, the exit time point of each axle from the observation point $Q_j$, and the acceleration intensity at the observation point $Q_j$ by each axle.

1-3. Calculation of Deflection Waveform at Central Position of Bridge Floor

Figure 14:
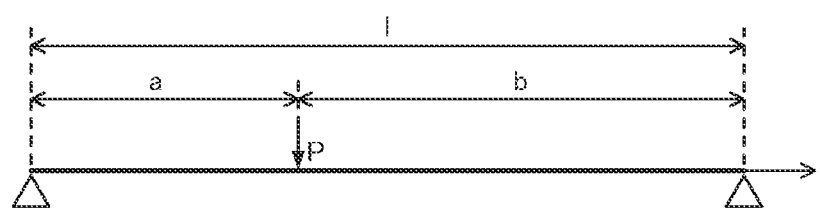
FIG. 14 is a diagram illustrating a structural model of a superstructure of a bridge.

In the present embodiment, considering that in the superstructure 7 of the bridge 5, one or more bridge floors 7a constituted by the floor plate F and the main girders $G_1$ to $G_K$ are continuously arranged, the measurement device 1 calculates a displacement of one bridge floor 7a as a displacement at the central position in the longitudinal direction. The load applied to the bridge floor 7a moves from one end to the other end of the bridge floor 7a. At this time, a position of the load on the bridge floor 7a and a load amount can be used to express a deflection amount, which is the displacement at the central position of the bridge floor 7a. In the present embodiment, in order to express, as a trajectory of a deflection amount due to the movement on a beam with a one-point load, the deflection deformation when the axles of the vehicle 6 move on the bridge floor 7a, a structural model shown in FIG. 14 is considered. In the structural model, the deflection amount at the central position is calculated. In FIG. 14, P is the load. a is a load position from an end of the bridge floor 7a on a side where the vehicle 6 enters. b is a load position from an end of the bridge floor 7a on a side where the vehicle 6 exits. I is a distance between both ends of the bridge floor 7a. The structural model shown in FIG. 14 is a simple beam that supports both ends with both ends as fulcrums.

In the structural model shown in FIG. 14, when the position of the end of the bridge floor 7a on the side where the vehicle 6 enters is zero and the observation position for the deflection amount is x, a bending moment M of the simple beam is expressed by Equation (1).

$$M = \frac{b}{l}Px - PH_a(x-a) \tag{1}$$

In Equation (1), a function $H_a$ is defined as in Equation (2).

$$H_a = \begin{cases} 0 & (\text{if } x \le a) \\ 1 & (\text{if } x > a) \end{cases} \tag{2}$$

Equation (3) is obtained by transforming Equation $$-\frac{Ml}{P} = -bx + H_a l(x-a) \tag{3}$$

Meanwhile, the bending moment M is expressed by Equation (4). In Equation (4), θ is an angle, I is a secondary moment, and E is a Young's modulus.

$$-M = EI\frac{d\theta}{dx} \tag{4}$$

Equation (4) is substituted into Equation (3), and Equation (5) is obtained.

$$\frac{EIl}{P}\frac{d\theta}{dx} = -bx + H_a l(x-a) \tag{5}$$

Equation (6) is obtained by integrating Equation (5) with respect to the observation position x, and Equation (7) is obtained by calculating Equation (6). In Equation (7), $C_1$ is an integral constant.

$$\int \frac{EIl}{P}\frac{d\theta}{dx}dx = \int (-bx + H_a l(x-a))dx \tag{6}$$

$$\frac{EIl}{P}\theta = -\frac{bx^2}{2} + H_a \frac{l(x-a)^2}{2} + C_1 \tag{7}$$

Further, Equation (8) is obtained by integrating Equation (7) with respect to the observation position x, and Equation (9) is obtained by calculating Equation (8). In Equation (9), $C_2$ is an integral constant.

$$\int \frac{EIl}{P}\theta dx = \int \left\{-\frac{bx^2}{2} + H_a \frac{l(x-a)^2}{2} + C_1\right\}dx \tag{8}$$

$$\frac{EIl}{P}\theta x = -\frac{bx^3}{6} + H_a \frac{l(x-a)^3}{6} + C_1 x + C_2 \tag{9}$$

In Equation (9), θx represents a deflection amount. Equation (10) is obtained by replacing θx with a deflection amount w.

$$\frac{EIl}{P}w = -\frac{bx^3}{6} + H_a \frac{l(x-a)^3}{6} + C_1 x + C_2 \tag{10}$$

Based on FIG. 14, since b=l−a, Equation (10) is transformed as Equation (11).

$$\frac{EIl}{P}w = -\frac{(l-a)x^3}{6} + H_a \frac{l(x-a)^3}{6} + C_1 x + C_2 \tag{11}$$

Since the deflection amount w=0 when x=0, and $H_a$=0 based on x≤a, Equation (12) is obtained by substituting x=w=$H_a$=0 into Equation (11).

$$C_2 = 0 \tag{12}$$

Since the deflection amount w=0 when x=l, and $H_a$=1 based on x>a, Equation (13) is obtained by substituting x=l, w=0, and $H_a$=1 into Equation (11).

$$C_1 = \frac{a(l-a)(a+2(l-a))}{6} \tag{13}$$

Equation (14) is obtained by substituting b=l−a into Equation (13).

$$C_1 = \frac{ab(a+2b)}{6} \tag{14}$$

Equation (15) is obtained by substituting the integral constant $C_1$ in Equation (12) and the integral constant $C_2$ in Equation (13) into Equation (10).

$$\frac{EIl}{P}w = -\frac{bx^3}{6} + H_a \frac{l(x-a)^3}{6} + \frac{ab(a+2b)}{6}x \tag{15}$$

Equation (15) is transformed and the deflection amount w at the observation position x when the load P is applied to the position a is expressed by Equation (16).

$$w = \frac{P}{6EIl}\{-bx^3 + H_a l(x-a)^3 + ab(a+2b)x\} \tag{16}$$

Figure 15:
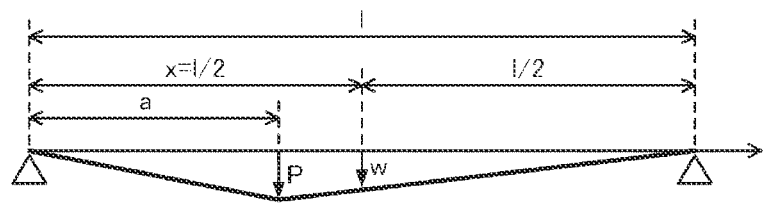
FIG. 15 is a diagram illustrating the structural model of the superstructure of the bridge.

FIG. 15 shows a state in which the load P moves from one end to the other end of the simple beam under a condition that the observation position x of the deflection amount is fixed at the central position of the simple beam, that is, when x=½.

When the load position a is on the left side of the observation position x=½, since $H_a$=1 based on x>a, Equation (17) is obtained by substituting x=½ and $H_a$=1 into Equation (16).

$$w = \frac{P}{6EIl}\left\{-b\left(\frac{l}{2}\right)^3 + l\left(\left(\frac{l}{2}\right)-a\right)^3 + ab(a+2b)\left(\frac{l}{2}\right)\right\} \tag{17}$$

Equation (18) is obtained by substituting l=a+b into Equation (17).

$$w = \frac{P}{48EI} a\left(-a^2 + 3\left((a+b)^2 - a^2\right)\right) \quad (18)$$

Substituting a+b=l into Equation (18), a deflection amount $w_L$, at the observation position x when the position of the load P is on the left side of the central observation position x=l/2 is as shown in Equation (19).

$$w_L = \frac{P}{48EI}\left(3al^2 - 4a^3\right) \quad (19)$$

On the other hand, when the load position a is on the right side of the observation position x=l/2, since $H_a=0$ based on x≤a, Equation (20) is obtained by substituting x=l/2 and $H_a=0$ into Equation (16).

$$w = \frac{P}{6EIl}\left\{-b\left(\frac{l}{2}\right)^3 + ab(a+2b)\left(\frac{l}{2}\right)\right\} \quad (20)$$

Substituting l=a+b into Equation (20), a deflection amount $w_R$ at the observation position x when the position of the load P is on the right side of the central observation position x=l/2 is as shown in Equation (21).

$$w_R = \frac{P}{48EI}\left\{3a^2b + 6ab^2 - b^3\right\} \quad (21)$$

On the other hand, when the load position a is the same as the observation position x=l/2, since $H_a=0$ based on x≤a, Equation (22) is obtained by substituting $H_a=0$ and a=b=l/2 into Equation (16).

$$w = \frac{P}{6EIl} 2a^4 \quad (22)$$

Further, substituting a=l/2 into Equation (22), the deflection amount w at the observation position x when the position of the load P is the same as the central observation position is as shown in Equation (23).

$$w = \frac{P}{48EI} l^3 \quad (23)$$

In the simple beam with the fulcrums at both ends, a maximum deflection displacement is obtained when the load P is in the center. Therefore, according to Equation (23), a maximum deflection amount $w_{max}$ is expressed by Equation (24).

$$w_{max} = w = \frac{P}{48EI} l^3 \quad (24)$$

When the deflection amount $w_L$, at the observation position x when the position of the load P is on the left side of the central observation position x=l/2 is divided by the maximum deflection amount $w_{max}$ and normalized by the maximum deflection amount $w_{max}$, Equation (25) is obtained based on Equation (19) and Equation (24).

$$\frac{w_L}{w_{max}} = \frac{\frac{P}{48EI}(3al^2 - 4a^3)P}{\frac{P}{48EI}l^3} = \frac{3a}{l} - \frac{4a^3}{l^3} \quad (25)$$

Equation (26) is obtained by setting a/l=r in Equation (25).

$$\frac{w_L}{w_{max}} = 3r - 4r^3 \quad (26)$$

On the other hand, when the deflection amount $w_R$ at the observation position x when the position of the load P is on the right side of the central observation position x=l/2 is divided by the maximum deflection amount $w_{max}$ and normalized by the maximum deflection amount $w_{max}$, Equation (27) is obtained based on Equation (21) and Equation (24).

$$\frac{w_R}{w_{max}} = \frac{\frac{P}{48EI}(3a^2b + 6ab^2 - b^3)}{\frac{P}{48EI}l^3} = \frac{3b}{l} - \frac{4b^3}{l^3} \quad (27)$$

Here, since b=l×(1−r) based on a/l=r and a+b=l, Equation (28) is obtained by substituting b=l×(1−r) into Equation (27).

$$\frac{w_R}{w_{max}} = 3(1-r) - 4(1-r)^3 \quad (28)$$

By summarizing Equation (25) and Equation (27), a normalized deflection amount $w_{stdB}$ normalized by the maximum deflection amount observed at the central position of the beam when the load P moves on the simple beam is expressed by Equation (29).

$$w_{stdB} = \frac{w}{w_{max}} = \begin{cases} 3r - 4r^3 & \left(\text{if } a < \frac{l}{2}\right) \\ 3(1-r) - 4(1-r)^3 & \left(\text{if } \frac{l}{2} < a\right) \end{cases} \quad (29)$$

In Equation (29), r=a/l and 1−r=b/l indicate a ratio of the position of the load P to the distance l between the fulcrums of the simple beam, and a variable R is defined as shown in Equation (30).

$$R = \begin{cases} \frac{a}{l} & \left(\text{if } a < \frac{l}{2}\right) \\ \frac{b}{l} & \left(\text{if } \frac{l}{2} < a\right) \end{cases} \quad (30)$$

Equation (29) is replaced by Equation (31) using Equation (30).

$$w_{stdB} = 3R - 4R^3 \quad (31)$$

Equation (30) and Equation (31) indicate that, when the observation position is in the center of the simple beam, the deflection amount is symmetrical on the right side and the left side of the center of the position of the load P.

Figure 16:
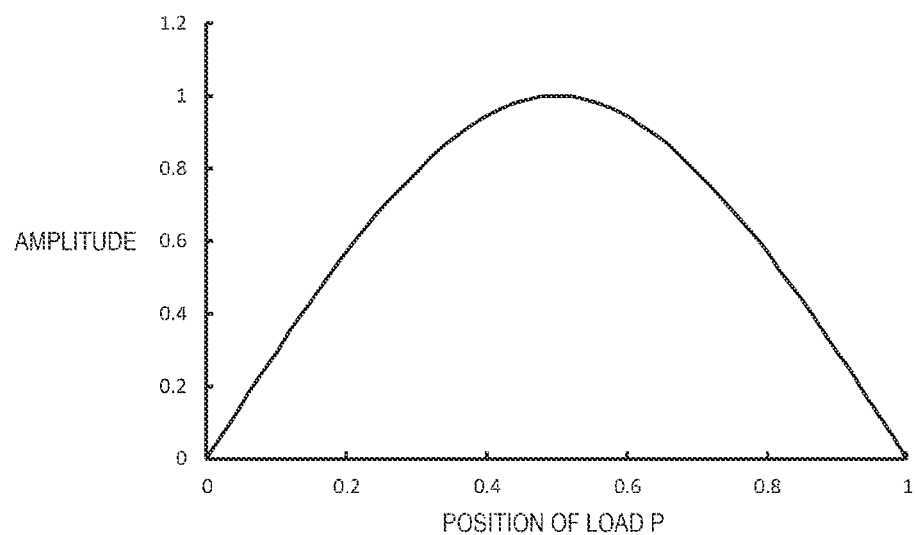
FIG. 16 is a diagram showing an example of a normalized deflection amount waveform at a central observation position.

FIG. 16 shows an example of a waveform of the normalized deflection amount $w_{stdB}$ in the case of the observation position x=½. In FIG. 16, the horizontal axis represents the position of the load P, and the vertical axis represents the amplitude. In the example in FIG. 16, the distance l between the fulcrums of the simple beam is 1.

The above-described axle information includes the entry time point of each axle of the vehicle 6 to the lane $L_j$ and the exit time point of each axle of the vehicle 6 from the lane $L_j$, that is, the time points when the vehicle 6 passes the positions at both ends of the bridge floor 7a. Therefore, the positions at both ends of the bridge floor 7a correspond to the entry time point and the exit time point of the axle, and the load positions a and b are replaced with time. It is assumed that the speed of the vehicle 6 is constant and the position and the time point are proportional.

When the load position at the left end of the bridge floor 7a corresponds to an entry time point $t_i$, and the load position at the right end of the bridge floor 7a corresponds to an exit time point $t_o$, the load position a from the left end is replaced with an elapsed time point $t_p$ from the entry time point $t_i$. The elapsed time point $t_p$ is expressed by Equation (32).

$$t_p = t - t_i \quad (32)$$

The distance l between the fulcrums is replaced by a time $t_s$ from the entry time point $t_i$ to the exit time point $t_o$. The time $t_s$ is expressed by Equation (33).

$$t_s = t_o - t_i \quad (33)$$

Since the speed of the vehicle 6 is constant, a time point $t_c$ when the load position a is in the center of the bridge floor 7a is expressed by Equation (34).

$$t_c = \frac{t_i + t_o}{2} \quad (34)$$

By replacing the position with the time as described above, the position of the load P is expressed by Equation (35) and Equation (36).

$$\frac{a}{l} = r = \frac{t_p}{t_s} \quad (35)$$

$$1 - r = 1 - \frac{t}{t_s} \quad (36)$$

Substituting Equation (35) and Equation (36) into Equation (29), the normalized deflection amount $w_{stdB}$ at the central position replaced by time is expressed by Equation (37).

$$w_{stdB} = \begin{cases} 0 \text{ (if } t < t_i) \\ 3\frac{t_p}{t_s} - 4\left(\frac{t_p}{t_s}\right)^3 \left( \text{if } t_i < t < \frac{(t_o + t_i)}{2} \right) \\ 3\left(1 - \frac{t_p}{t_s}\right) - 4\left(1 - \frac{t_p}{t_s}\right)^3 \left( \text{if } \frac{(t_o + t_i)}{2} < t < t_o \right) \\ 0 \text{ (if } t > t_o) \end{cases} \quad (37)$$

Alternatively, according to Equation (30) and Equation (31), the normalized deflection amount $w_{stdB}$ normalized by the maximum amplitude is expressed by Equation (38) by substituting the variable R with time.

$$w_{stdB} = 3R - 4R^3, \quad (38)$$

$$R = \begin{cases} 0 \text{ (if } t < t_i) \\ \frac{t_p}{t_s}\left( \text{if } t_i < t < \frac{(t_o + t_i)}{2} \right) \\ 1 - \frac{t_p}{t_s}\left( \text{if } \frac{(t_o + t_i)}{2} < t < t_o \right) \\ 0 \text{ (if } t > t_o) \end{cases}$$

Considering that a relationship between the elapse of time and the normalized deflection amount is treated as observation data, the normalized deflection amount $w_{stdB}$ is replaced with a normalized deflection amount model $w_{stdB}(t)$ at the observation position at the center of the beam due to the movement of a single concentrated load on the simple beam with the fulcrums at both ends, and Equation (38) becomes Equation (39). Equation (39) is an equation normalized by the maximum amplitude of deflection at the central position based on the structural model of superstructure 7, and a maximum value is 1.

$$w_{stdB}(t) = 3R - 4R^3, \quad (39)$$

$$R = \begin{cases} 0 \text{ (if } t < t_i) \\ \frac{t_p}{t_s}\left( \text{if } t_i < t < \frac{(t_o + t_i)}{2} \right) \\ 1 - \frac{t_p}{t_s}\left( \text{if } \frac{(t_o + t_i)}{2} < t < t_o \right) \\ 0 \text{ (if } t > t_o) \end{cases}$$

Time information required for the normalized deflection amount model $w_{stdB}(t)$ is obtained from the axle information described above. Since the normalized deflection amount model $w_{stdB}(t)$ has a maximum deflection amount $w_{max}$ at the central position of the bridge floor 7a, Equation (40) is obtained.

$$w_{max} = \max\{w_{stdB}(t)\} = w_{stdB}\left(t_i + \frac{1}{2}t_s\right) \quad (40)$$

The deflection amount w shown in the above Equation (23) is the deflection amount at the observation position x=½ when the position of the load P is the same as the central observation position. Since the deflection amount w coincides with the maximum deflection amount $w_{max}$, Equation (41) is obtained.

$$w_{max} = \frac{P}{48EI}l^3 \quad (41)$$

Figure 17:
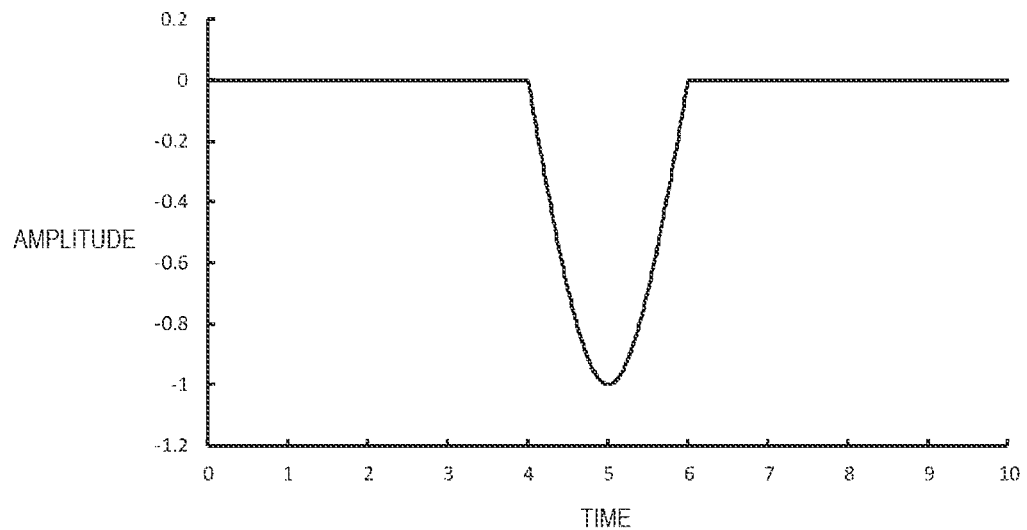
FIG. 17 is a diagram showing an example of the normalized deflection amount model at the central observation position.

FIG. 17 shows an example of the normalized deflection amount model $w_{stdB}(t)$. In the example in FIG. 17, at the time point $t_c = (t_i + t_o)/2 = 5$ in which the entry time point $t_i = 4$ and the exit time point $t_o = 6$, the normalized deflection amount model $w_{stdB}(t)$ has the maximum deflection amount $w_{max} = 1$ at the central position of the bridge floor 7a.

It can be considered that the displacement of the bridge floor 7a is deformed to be similar to the simple beam with the fulcrums at both ends, and the displacement of the bridge floor 7a is proportional to an acceleration intensity $a_p$ of the axle obtained from the axle information. Assuming that a proportional coefficient is a product of the acceleration intensity $a_p$ of the axle obtained from the axle information and a predetermined coefficient p, a deflection waveform $H_B(t)$ at the central position of the bridge floor 7a generated by each axle is obtained by Equation (42). The acceleration intensity $a_p$ may be the acceleration intensity at the time of entry, the acceleration intensity at the time of exit, which are included in the axle information, or a statistical value such as an average value of the acceleration intensity at the time of entry and the acceleration intensity at the time of exit.

$$H_B(t) = pa_p w_{stdB}(t) \tag{42}$$

Equation (39) is substituted into Equation (42), and the deflection waveform $H_B(t)$ is expressed by Equation (43).

$$H_B(t) = pa_p(3R - 4R^3), \tag{43}$$

$$R = \begin{cases} 0 & (\text{if } t < t_i) \\ \frac{t_p}{t_s}\left(\text{if } t_i < t < \frac{(t_O + t_i)}{2}\right) \\ 1 - \frac{t_p}{t_s}\left(\text{if } \frac{(t_O + t_i)}{2} < t < t_o\right) \\ 0 & (\text{if } t > t_o) \end{cases}$$

Until now, the single load P is applied to the bridge floor 7a. However, since the load from each axle of the vehicle 6 is applied to the lane $L_j$ on which the vehicle travels, Equation (43) is replaced by a deflection waveform $H_{Bjk}(t)$ as in Equation (44). In Equation (44), k is an integer indicating the axle number, and j is an integer indicating the lane number. As shown in Equation (44), the deflection waveform $H_{Bjk}(t)$ is proportional to a product of the predetermined coefficient p and an acceleration intensity $a_{pjk}$.

$$H_{Bjk}(t) = pa_{p_{jk}} w_{stdB}(t) = pa_{p_{jk}}(3R - 4R^3), \tag{44}$$

$$R = \begin{cases} 0 & (\text{if } t < t_i) \\ \frac{t_p}{t_s}\left(\text{if } t_i < t < \frac{(t_O + t_i)}{2}\right) \\ 1 - \frac{t_p}{t_s}\left(\text{if } \frac{(t_O + t_i)}{2} < t < t_o\right) \\ 0 & (\text{if } t > t_o) \end{cases}$$

The deflection waveform $H_{Bjk}(t)$ has a steep slope at both ends at which the deflection waveform $H_{Bjk}(t)$ is zero. However, when a displacement meter is actually installed at the observation position and the displacement is measured during a vehicle load test, a base of the displacement waveform changes gently. Therefore, in order to make the deflection waveform $H_{Bjk}(t)$ closer to the actual displacement waveform, the normalized deflection amount model $w_{stdB}(t)$ part is squared to improve the normalized deflection amount $w_{std}$. That is, the improved deflection waveform $H_{Bjk}(t)$ is obtained by Equation (45).

$$H_{Bjk}(t) = pa_{p_{jk}}(3R - 4R^3), \tag{45}$$

$$R = \begin{cases} 0 & (\text{if } t < t_i) \\ \frac{t_p}{t_s}\left(\text{if } t_i < t < \frac{(t_O + t_i)}{2}\right) \\ 1 - \frac{t_p}{t_s}\left(\text{if } \frac{(t_O + t_i)}{2} < t < t_o\right) \\ 0 & (\text{if } t > t_o) \end{cases}$$

The deflection waveform $H_{Bjk}(t)$ obtained by the squared Equation (45) has an increased kurtosis. Therefore, by improving this, the entry time point $t_i$ and the exit time point $t_o$ are adjusted by Equation (46) such that the deflection waveform $H_{Bjk}(t)$ is closer to the displacement waveform. In Equation (46), $t_{is}$ is the adjusted entry time point and $t_{os}$ is the adjusted exit time point. In addition, $t_{i\_offset}$ is an adjustment amount of the entry time point, and $t_{o\_offset}$ is an adjustment amount of the exit time point.

$$t_{is} = t_i + t_{i\_offset}$$

$$t_{os} = t_o + t_{o\_offset} \tag{46}$$

The deflection waveform $H_{Bjk}(t)$ is expressed by Equation (47) by respectively replacing $t_i$ and $t_o$ with $t_{is}$ and $t_{os}$ in Equation (45).

$$H_{Bjk}(t) = pa_{p_{jk}}(3R - 4R^3), \tag{47}$$

$$R = \begin{cases} 0 & (\text{if } t < t_{is}) \\ \frac{t_p}{t_s}\left(\text{if } t_{is} < t < \frac{(t_{Os} + t_{is})}{2}\right) \\ 1 - \frac{t_p}{t_s}\left(\text{if } \frac{(t_O + t_i)}{2} < t < t_{os}\right) \\ 0 & (\text{if } t > t_{os}) \end{cases}$$

Figure 18:
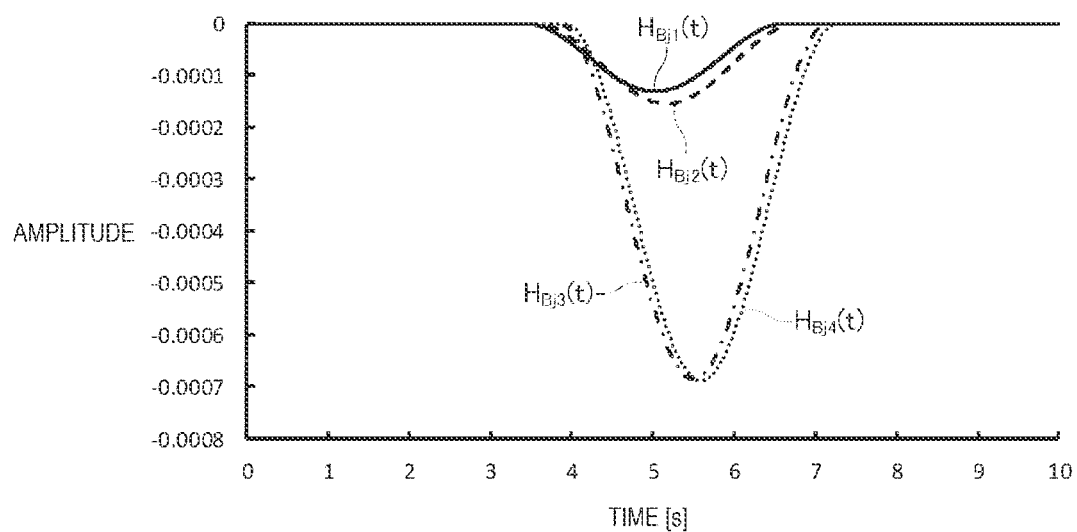
FIG. 18 is a diagram showing an example of a deflection waveform of the bridge generated by each axle.

FIG. 18 shows an example of the deflection waveform of the bridge floor 7a generated by each axle included in the vehicle 6 traveling on the lane $L_j$. In the example in FIG. 18, the vehicle 6 is a four-axle vehicle, and four deflection waveforms $H_{Bj1}(t)$, $H_{Bj2}(t)$, $H_{Bj3}(t)$, and $H_{Bj4}(t)$ are shown. In the example in FIG. 18, since the loads generated by the first and second axles are relatively small and the loads generated by the third and fourth axles are relatively large, maximum amplitudes of the deflection waveforms $H_{Bj1}(t)$ and $H_{Bj2}(t)$ are relatively small, and maximum amplitudes of the deflection waveforms $H_{Bj3}(t)$ and $H_{Bj4}(t)$ are relatively large.

As shown in Equation (48), a vehicle deflection waveform $CP_{Bjm}(t)$, which is the deflection waveform at the central position of the bridge floor 7a generated by the vehicle 6 traveling on the lane $L_j$ is obtained by adding the deflection waveform $H_{Bjk}(t)$ of the bridge floor 7a generated by each axle. In Equation (48), m is an integer indicating the vehicle number, k is an integer indicating the axle number, and j is an integer indicating the lane number.

$$CP_{Bjm}(t) = \sum_k H_{Bjk}(t) \tag{48}$$

Figure 19:
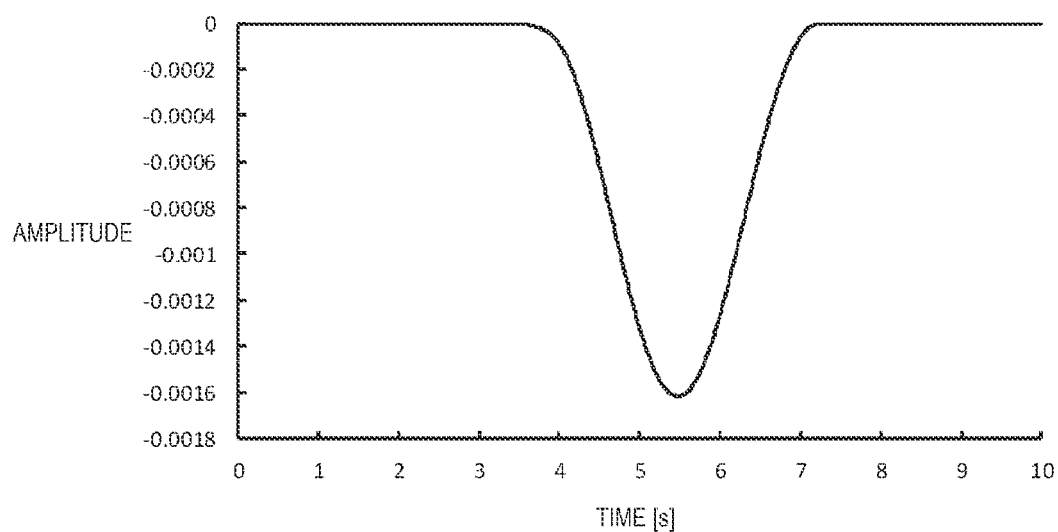
FIG. 19 is a diagram showing an example of a vehicle deflection waveform.

FIG. 19 shows the vehicle deflection waveform $CP_{Bjm}(t)$ obtained by adding the four deflection waveforms $H_{Bj1}(t)$, $H_{Bj2}(t)$, $H_{BJ3}(t)$, and $H_{Bj4}(t)$ shown in FIG. 18.

It is assumed that M vehicles 6 travel on the lane $L_j$ in an integral interval, as shown in Equation (49), a sum of the vehicle deflection waveforms $CP_{Bj1}(t)$ to $CP_{BjM}(t)$ is defined as a path deflection waveform $CP_{Bj}(t)$, which is the deflection waveform at the central position $CT_j$ of the lane $L_j$. M is an integer of 1 or more.

$$CP_{Bj}(t) = \sum_{m=1}^{M} CP_{Bjm}(t) \tag{49}$$

Figure 20:
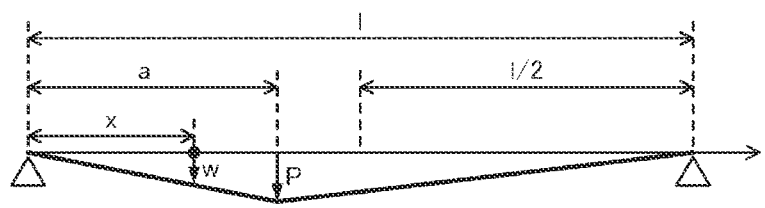
FIG. 20 is a diagram illustrating the structural model of the superstructure of the bridge.

1-4. Calculation of Deflection Waveform at any Position Other than Central Position of Bridge Floor Next, a case where the observation position x for the deflection amount is any position other than the central position of the simple beam is considered. FIG. 20 shows a state in which the load P moves from one end to the other end of the simple beam under a condition that the observation position x for the deflection amount is fixed at any position of the simple beam.

In a case where the observation position x is any position, when the load position a is on the left side of any observation position x, since $H_a=1$ based on x>a, Equation (50) is obtained by substituting $H_a=1$ into the above Equation (16).

$$w = \frac{P}{6EIl}\{-bx^3 + l(x-a)^3 + ab(a+2b)x\} \quad (50)$$

The deflection amount w at any observation position x expressed by Equation (50) is divided by the maximum deflection amount $w_{max}$ when the observation position is the central position, expressed by the above Equation (24), and a normalized deflection amount $w_{stdA}$ which is normalized by the maximum deflection amount $w_{max}$ observed at the central position of the beam when the load P moves on the simple beam is expressed by Equation (51).

$$w_{stdA} = \frac{w}{w_{max}} = \frac{8}{l^4}\{ax^3 - 3alx^2 + (3a^2l + abl + ab^2)x - a^3l\} \quad (51)$$

Substituting a+b=l into Equation (51), the normalized deflection amount $w_{stdA}$ at the observation position x when the position of the load P is on the left side of any observation position x is as shown in Equation (52).

$$w_{stdA} = \frac{8}{l^4}\{ax^3 - 3alx^2 + 3a^2lx + al^2x - a^2lx + al^2x - 2a^2lx + a^3x - a^3l\} \quad (52)$$

When Equation (52) is expressed using a ratio r=a/l of the position of the load P to the distance l between the fulcrums of the simple beam, Equation (53) is obtained.

$$w_{stdA} = \frac{8}{l}\left\{xr^3 + \left(\frac{x^3}{l^2} + 2x\right)r\right\} - \frac{8}{l}\left(lr^3 + \frac{3x^2}{l}r\right) \quad (53)$$

On the other hand, when the load position a is on the right side of any observation position x, since $H_a=0$ based on x<a, Equation (54) is obtained by substituting $H_a=0$ into Equation (16).

$$w = \frac{P}{6EIl}\{-bx^3 + ab(a+2b)x\} \quad (54)$$

The deflection amount w at any observation position x expressed by Equation (54) is divided by the maximum deflection amount $w_{max}$ expressed by the above Equation (24), and the normalized deflection amount $w_{stdA}$ which is normalized by the maximum deflection amount $w_{max}$ observed at the central position of the beam when the load P moves on the simple beam is expressed by Equation (55).

$$w_{stdA}\left(=\frac{w}{w_{max}}\right) = \frac{8}{l^4}\{-bx^3 + ab(l+b)x\} \quad (55)$$

Substituting a+b=l and r=a/l into Equation (55), the normalized deflection amount $w_{stdA}$ at the observation position x when the position of the load P is on the right side of any observation position x is as shown in Equation (56).

$$w_{stdA} = \frac{8}{l}\left\{xr^3 + \left(\frac{x^3}{l^2} + 2x\right)r\right\} - \frac{8}{l}\left(3xr^2 + \frac{x^3}{l^2}\right) \quad (56)$$

By summarizing Equation (53) and Equation (56), the normalized deflection amount $w_{stdA}$ observed at any observation position x other than the central position when the load P moves on the simple beam is expressed by Equation (57).

$$w_{stdA} = \frac{8}{l}\left\{xr^3 + \left(\frac{x^3}{l^2} + 2x\right)r - R(r)\right\} \quad (57)$$

In Equation (57), a variable R(r) is defined by Equation (58).

$$R(r) = \begin{cases} lr^3 + \dfrac{3x^2}{l}r & \text{(if } x > lr) \\ 3xr^2 + \dfrac{x^3}{l^2} & \text{(if } x \leq lr) \end{cases} \quad (58)$$

Figure 21:
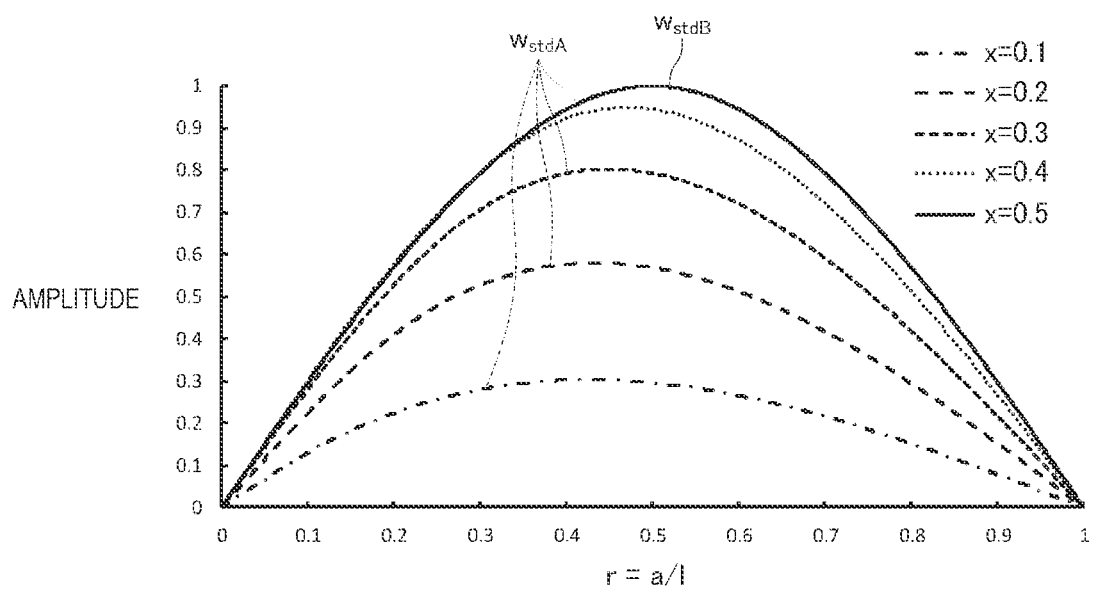
FIG. 21 is a diagram showing an example of a normalized deflection amount waveform at any position.

FIG. 21 shows a waveform of the normalized deflection amount $w_{stdA}$ when the observation position x is each of 0.1, 0.2, 0.3, and 0.4. FIG. 21 also shows a waveform of the normalized deflection amount $w_{stdB}$ when the observation position x=0.5, that is, when the observation position is the central position. In FIG. 21, the horizontal axis represents r=a/l, and the vertical axis represents the amplitude. For the four normalized deflection amounts $w_{stdA}$ and the normalized deflection amounts $w_{stdB}$ shown in FIG. 21, FIG. 22 shows a relationship between the observation position and the maximum amplitude, and FIG. 23 shows a relationship between the observation position and r=a/l which is the position of the load P at the maximum amplitude.

Figure 22:
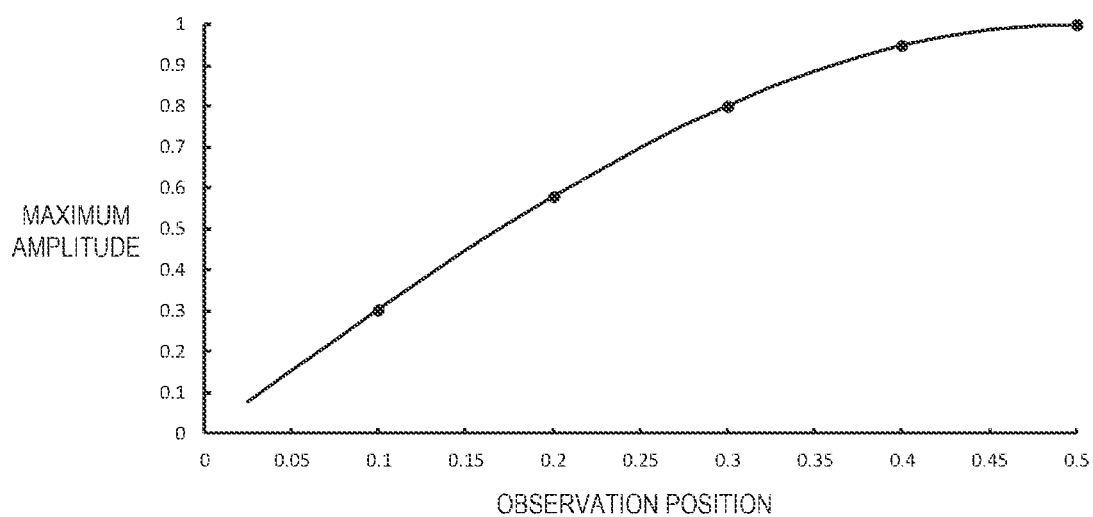
FIG. 22 is a diagram showing a relationship between an observation position and a maximum amplitude.

As shown in FIGS. 21 and 22, the normalized deflection amount $w_{stdB}$ when the observation position is the central position has the maximum amplitude of 1 when the position of the load P coincides with the observation position x, that is, when r=0.5. In contrast, the normalized deflection amount $w_{stdA}$ at each of the observation positions x=0.1, 0.2, 0.3, and 0.4 has a maximum amplitude smaller than 1 when the load P is in a predetermined position between the observation position and the central position. The maximum amplitude decreases as the observation position moves away from the central position.

Figure 23:
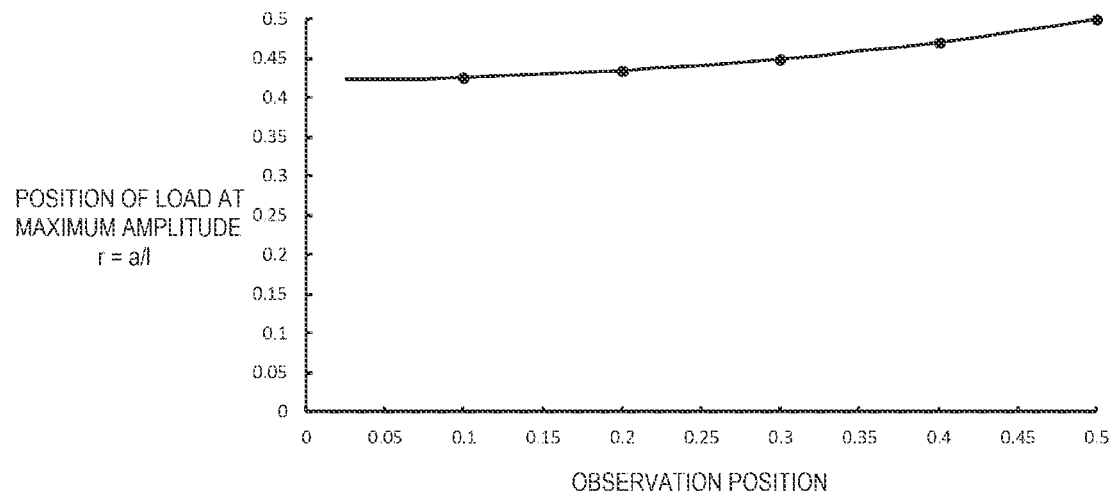
FIG. 23 is a diagram showing a relationship between the observation position and a position of a load at a maximum amplitude.

As shown in FIGS. 21 and 23, the position of the load P at which the normalized deflection amount $w_{stdB}$ has the maximum amplitude of 1 when the observation position is the central position coincides with the central position. In contrast, the position of the load P at which the normalized deflection amount $w_{stdA}$ at each of the observation positions x=0.1, 0.2, 0.3, and 0.4 has the maximum amplitude is located before the central position. As the observation position moves away from the central position, the position of the load P at which the normalized deflection amount $w_{stdA}$ has the maximum amplitude is farther away from the central position.

Assuming that the speed of the vehicle 6 is constant and the position and the time point are proportional to each other, any observation position x is replaced by a time $t_{xx}$ from the entry time point $t_i$ to a time point $t_x$ when the vehicle 6 passes the observation position x. The time $t_{xx}$ is expressed by Equation (59).

$$t_{xx} = t_x - t_i \qquad (59)$$

Since a ratio x/l of the observation position x to the distance l between the fulcrums is equal to a ratio $t_{xx}/t_s$ of the time $t_{xx}$ expressed by Equation (59) to the time $t_s$ expressed by the above Equation (33), the time $t_{xx}$ is expressed by Equation (60).

$$t_{xx} = t_s \frac{x}{l} \qquad (60)$$

Substituting Equation (60) into Equation (57), the normalized deflection amount $w_{stdA}$ at any observation position x other than the central position replaced by time is expressed by Equation (61).

$$w_{stdA} = \frac{8t_{xx}(t-t_i)}{t_s^3}\left\{\frac{(t-t_i)^2 + t_{xx}^2 + 2t_s^2}{t_s} - R(t)\right\} \qquad (61)$$

In Equation (61), a variable R(t) is defined by Equation (62) obtained from Equation (58).

$$R(t) = \begin{cases} \dfrac{(t-t_i)^2 + 3t_{xx}^2}{t_{xx}} & (\text{if } t_x > t) \\ \dfrac{3(t-t_i)^2 + t_{xx}^2}{(t-t_i)} & (\text{if } t_x \leq t) \end{cases} \qquad (62)$$

Considering that a relationship between the elapse of time and the normalized deflection amount is treated as observation data, the normalized deflection amount $w_{stdA}$ is replaced with a normalized deflection amount model $w_{stdA}(t)$ at any observation position x due to the movement of a single concentrated load on the simple beam with fulcrums at both ends, and Equation (61) becomes Equation (63). Equation (63) is an equation normalized by the maximum amplitude of deflection at the central position based on the structural model of superstructure 7, and the maximum value is smaller than 1.

$$w_{stdA}(t) = \frac{8t_{xx}(t-t_i)}{t_s^3}\left\{\frac{(t-t_i)^2 + t_{xx}^2 + 2t_s^2}{t_s} - R(t)\right\} \qquad (63)$$

Similar to the above Equation (42), a deflection waveform $H_A(t)$ at any position x of the bridge floor 7a generated by each axle is obtained from Equation (64).

$$H_A(t) = Pa_p w_{stdA}(t) \qquad (64)$$

Substituting Equation (63) into Equation (64), a deflection waveform $H_A(t)$ is expressed by Equation (65).

$$H_A(t) = pa_p \frac{8t_{xx}(t-t_i)}{t_s^3}\left\{\frac{(t-t_i)^2 + t_{xx}^2 + 2t_s^2}{t_s} - R(t)\right\}, \qquad (65)$$

$$R(t) = \begin{cases} \dfrac{(t-t_i)^2 + 3t_{xx}^2}{t_{xx}} & (\text{if } t_x > t) \\ \dfrac{3(t-t_i)^2 + t_{xx}^2}{(t-t_i)} & (\text{if } t_x \leq t) \end{cases}$$

Since the load generated by each axle of the vehicle 6 is applied to the lane $L_j$ on which the vehicle 6 travels, Equation (62) is replaced by a deflection waveform $H_{Ajk}(t)$ as in Equation (66). In Equation (66), k is an integer indicating the axle number, and j is an integer indicating the lane number. As shown in Equation (66), the deflection waveform $H_{Ajk}(t)$ is proportional to the product of the predetermined coefficient p and the acceleration intensity $a_{pjk}$.

$$H_{Ajk}(t) = pa_{p_{jk}} \frac{8t_{xx}(t-t_i)}{t_s^3}\left\{\frac{(t-t_i)^2 + t_{xx}^2 + 2t_s^2}{t_s} - R(t)\right\}, \qquad (66)$$

$$R(t) = \begin{cases} \dfrac{(t-t_i)^2 + 3t_{xx}^2}{t_{xx}} & (\text{if } t_x > t) \\ \dfrac{3(t-t_i)^2 + t_{xx}^2}{(t-t_i)} & (\text{if } t_x \leq t) \end{cases}$$

The deflection waveform $H_{Ajk}(t)$ has a steep slope at both ends at which the deflection waveform $H_{Ajk}(t)$ is zero. However, when a displacement meter is actually installed at the observation position and the displacement is measured during a vehicle load test, a base of the displacement waveform changes gently. Therefore, in order to make the deflection waveform $H_{Ajk}(t)$ closer to the actual displacement waveform, the normalized deflection amount model $w_{stdA}(t)$ part is squared to improve the normalized deflection amount $w_{std}$. That is, the improved deflection waveform $H_{Ajk}(t)$ is obtained by Equation (67).

$$H_{Ajk}(t) = pa_{p_{jk}} \left[\frac{8t_{xx}(t-t_i)}{t_s^3}\left\{\frac{(t-t_i)^2 + t_{xx}^2 + 2t_s^2}{t_s} - R(t)\right\}\right]^2, \qquad (67)$$

$$R(t) = \begin{cases} \dfrac{(t-t_i)^2 + 3t_{xx}^2}{t_{xx}} & (\text{if } t_x > t) \\ \dfrac{3(t-t_i)^2 + t_{xx}^2}{(t-t_i)} & (\text{if } t_x \leq t) \end{cases}$$

The deflection waveform $H_{Ajk}(t)$ obtained by the squared Equation (67) has an increased kurtosis. Therefore, by improving this, the entry time point $t_i$ and the exit time point $t_o$ are adjusted by Equation (68) such that the deflection waveform $H_{Ajk}(t)$ is closer to the displacement waveform. In Equation (68), $t_{is}$ is the adjusted entry time point and $t_{os}$ is the adjusted exit time point. In addition, $t_{i\_offset}$ is an adjustment amount of the entry time point, and $t_{o\_offset}$ is an adjustment amount of the exit time point.

$$t_{is} = t_i + t_{i\_offset}$$

$$t_{os} = t_o + t_{o\_offset}$$

$$t_{ss} = t_{os} - t_{is} \qquad (68)$$

The deflection waveform $H_{Ajk}(t)$ is expressed by Equation (69) by respectively replacing $t_i$, $t_o$, and $t_s$ with $t_{is}$, $t_{os}$, and $t_{ss}$ in Equation (67).

$$H_{Ajk}(t) = pa_{p_{jk}} \left[ \frac{8t_{xx}(t-t_{is})}{t_{ss}^3} \left\{ \frac{(t-t_{is})^2 + t_{xx}^2 + 2t_{ss}^2}{t_{ss}} - R(t) \right\} \right]^2, \quad (69)$$

$$R(t) = \begin{cases} \dfrac{(t-t_{is})^2 + 3t_{xx}^2}{t_{xx}} & (\text{if } t_x > t) \\ \dfrac{3(t-t_{is})^2 + t_{xx}^2}{(t-t_{is})} & (\text{if } t_x \leq t) \end{cases}$$

As shown in Equation (70), a vehicle deflection waveform $CP_{Ajm}(t)$, which is the deflection waveform at any position of the bridge floor 7a generated by the vehicle 6 traveling on the lane $L_j$, is obtained by adding the deflection waveform $H_{Ajk}(t)$ of the bridge floor 7a generated by each axle. In Equation (70), m is an integer indicating the vehicle number, k is an integer indicating the axle number, and j is an integer indicating the lane number.

$$CP_{Ajm}(t) = \sum_k H_{Ajk}(t) \quad (70)$$

It is assumed that M vehicles 6 travel on the lane $L_j$ in an integral interval, as shown in Equation (71), a sum of the vehicle deflection waveforms $CP_{Aj1}(t)$ to $CP_{AjM}(t)$ is defined as a path deflection waveform $CP_{Aj}(t)$, which is the deflection waveform at any position of the lane $L_j$. M is an integer of 1 or more.

$$CP_{Aj}(t) = \sum_{m=1}^{M} CP_{Ajm}(t) \quad (71)$$

1-5. Calculation of Estimation Waveform at Central Position of Bridge Floor

Figure 24:
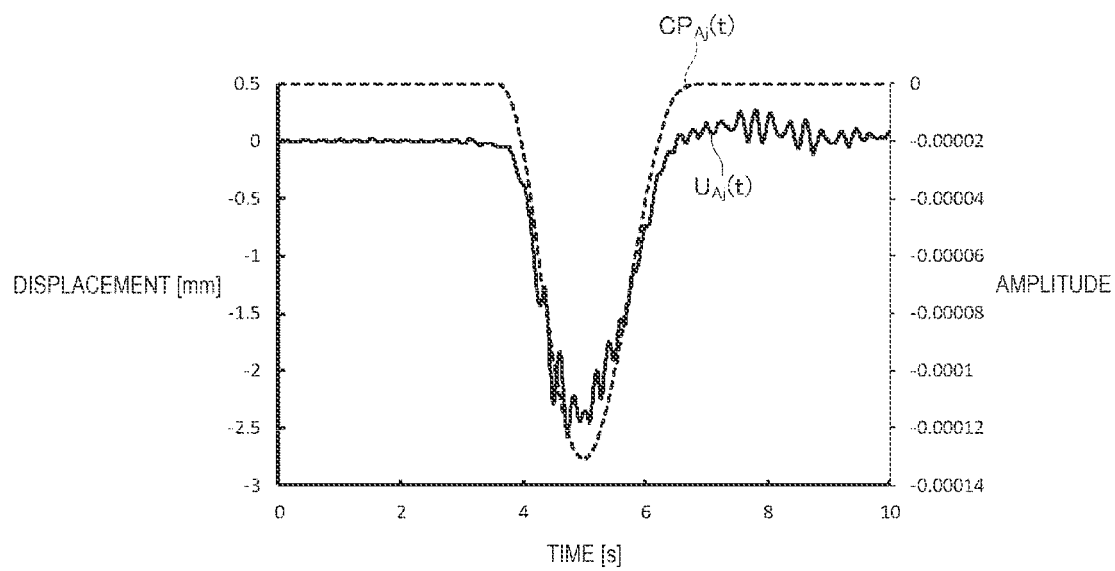
FIG. 24 is a diagram showing an example of a displacement waveform $U_{Aj}(t)$ and a path deflection waveform $CP_{Aj}(t)$.

A displacement waveform $U_{Aj}(t)$, which is a measurement waveform of the displacement at the observation point $R_j$, is obtained by double-integrating the acceleration detected by the sensor 23 observing the observation point $R_j$ after low-pass filtering processing. The observation point $R_j$, located at a position other than the central position $CT_j$ between the observation point $P_j$ and the observation point $Q_j$ set at both ends of the lane $L_j$. Therefore, when the observation point $P_j$ and the observation point $Q_j$ correspond to both ends of the simple beam and the observation point R corresponds to the observation position x, the above Equation (63) is an approximate expression of deflection at the observation point $R_j$ based on the structural model of the superstructure 7 which is a structure. The deflection waveform at the observation point $R_j$ of the lane $L_j$ is calculated as the path deflection waveform $CP_{Aj}(t)$ expressed by the above Equation (71). Since the path deflection waveform $CP_{Aj}(t)$ is calculated based on Equation (63), which is an approximate expression of deflection at the observation point $R_j$ based on the structural model of superstructure 7, it is considered that the maximum amplitude is different from but similar to the displacement waveform $U_{Aj}(t)$ at the observation point $R_j$. FIG. 24 is a diagram showing an example of the displacement waveform $U_{Aj}(t)$ and the path deflection waveform $CP_{Aj}(t)$. In FIG. 24, a solid line represents the displacement waveform $U_{Aj}(t)$, and a broken line represents the path deflection waveform $CP_{Aj}(t)$.

A relationship between the displacement waveform $U_{Aj}(t)$ and the path deflection waveform $CP_{Aj}(t)$ is expressed as in Equation (72) using an amplitude coefficient $D_{Aj}$, which corresponds to a ratio of the maximum amplitudes of the displacement waveform $U_{Aj}(t)$ and the path deflection waveform $CP_{Aj}(t)$.

$$U_{Aj}(t) = D_{Aj} CP_{Aj}(t) + e_j(t) \quad (72)$$

In Equation (72), the amplitude coefficient $D_{Aj}$ at which a difference $e_j(t)$ is minimized between the displacement waveform UA (t) and a waveform $D_{Aj} CP_{Aj}(t)$ obtained by multiplying the path deflection waveform $CP_{Aj}(t)$ by the amplitude coefficient $D_{Aj}$ can be obtained by, for example, a least square method as follows. First, when both sides of Equation (72) are squared and transformed, Equation (73) is obtained.

$$U_{Aj}(t)^2 - 2U_{Aj}(t)D_{Aj}CP_{Aj}(t) + D_{Aj}^2 CP_{Aj}(t)^2 = e_j(t)^2 \quad (73)$$

Equation (73) is differentiated by the amplitude coefficient $D_{Aj}$ to obtain Equation (74).

$$\frac{d}{dD_{Aj}} e_j(t)^2 = -2U_{Aj}(t)CP_{Aj}(t) + 2D_{Aj}CP_{Aj}(t)^2 \quad (74)$$

The right side of Equation (74) is set to zero, and the amplitude coefficient $D_{Aj}$ is obtained from Equation (75).

$$D_{Aj} = \frac{U_{Aj}(t)CP_{Aj}(t)}{CP_{Aj}(t)^2} \quad (75)$$

Figure 25:
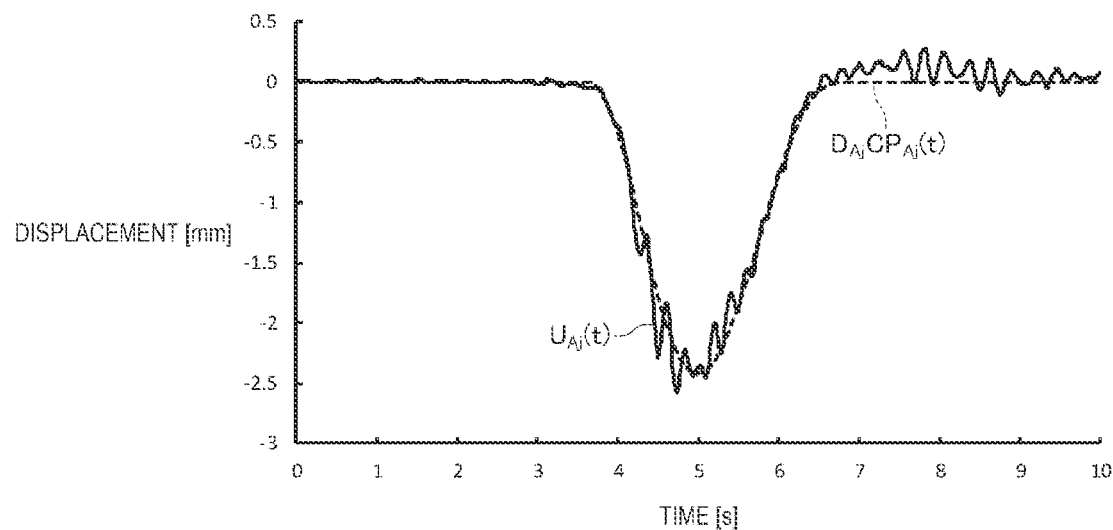
FIG. 25 is a diagram showing an example of the displacement waveform $U_{Aj}(t)$ and a waveform $D_{Aj}CP_{Aj}(t)$.

FIG. 25 shows an example of the displacement waveform $U_{Aj}(t)$ and the waveform $D_{Aj}CP_{Aj}(t)$ obtained by multiplying the path deflection waveform $CP_{Aj}(t)$ by the amplitude coefficient $D_{Aj}$ obtained by the least square method. In FIG. 25, the horizontal axis represents the time and the vertical axis represents the displacement. As shown in FIG. 25, since noise such as environmental noise and random noise generated inside the sensor 23 is superimposed on the actually measured displacement waveform $U_{Aj}(t)$, the noise is included in the difference $e_j(t)$ between the displacement waveform $U_{Aj}(t)$ and the waveform $D_{Aj}CP_{Aj}(t)$. However, the maximum amplitude of the displacement waveform $U_{Aj}(t)$ and the maximum amplitude of the waveform $D_{Aj}CP_{Aj}(t)$ are substantially the same.

As described above, in the present embodiment, since the sensor that observes the central position $CT_j$ of each lane $L_j$ is not provided, the displacement at the central position $CT_j$ cannot be calculated directly based on the output data of the sensor. On the other hand, when the observation position $P_j$ and the observation point $Q_j$ correspond to both ends of the simple beam and the central position $CT_j$ corresponds to the observation position x, the above Equation (39) is an approximate expression of deflection at the central position $CT_j$ based on the structural model of the superstructure 7 which is a structure. The deflection waveform at the central position $CT_j$ of the lane $L_j$ is calculated as the path deflection waveform $CP_{Bj}(t)$ expressed by the above Equation (49). Since the path deflection waveform $CP_{Bj}(t)$ is calculated based on Equation (39), which is the approximate expression of deflection at the central position $CT_{Bj}$ based on the structural model of superstructure 7, it is considered that the maximum amplitude is different from but similar to the displacement waveform $U_{Bj}(t)$ at the central position $CT_j$. Therefore, assuming that the ratio of the maximum amplitudes of the displacement waveform $U_{Bj}(t)$ and the path deflection waveform $CP_{Bj}(t)$ is similar to the amplitude coefficient DA by multiplying the path deflection waveform $CP_{Bj}(t)$ by the amplitude coefficient $D_{Aj}$, as in Equation (76), an estimation waveform $U_{estBj}(t)$ of displacement at the central position CT is obtained.

$$U_{estBj}(t)=D_{Aj}CP_{Bj}(t) \quad (76)$$

Figure 26:
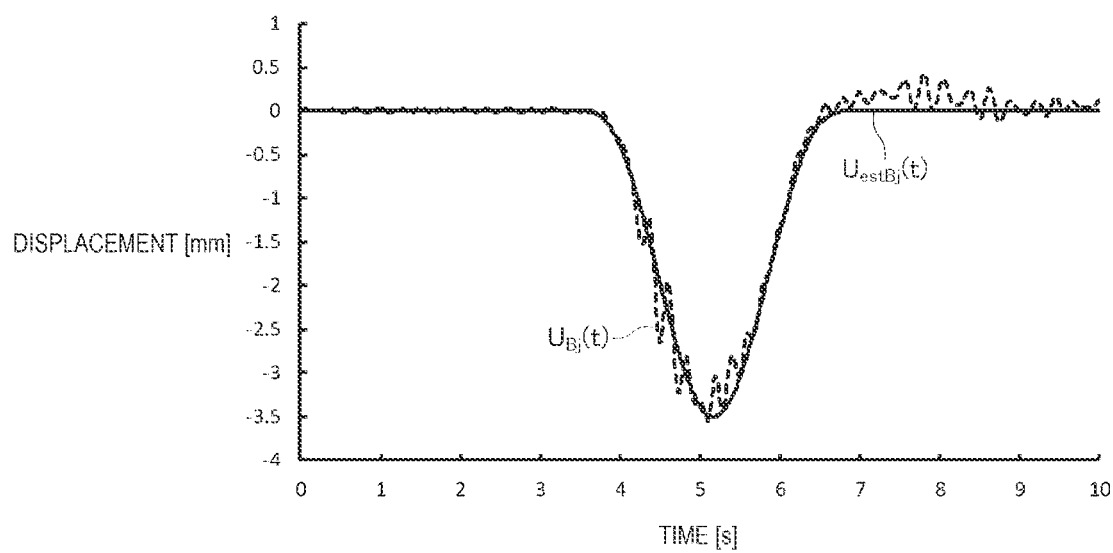
FIG. 26 is a diagram showing an example of an estimation waveform $U_{estBj}(t)$.

FIG. 26 shows, with a solid line, an example of the estimation waveform $U_{estBj}(t)$ calculated according to Equation (76). FIG. 26 also shows, with a broken line, the displacement waveform $U_{Bj}(t)$ experimentally measured by installing a displacement meter at the central position $CT_j$. In FIG. 26, the horizontal axis represents the time and the vertical axis represents the displacement. As shown in FIG. 26, although the noise such as the environmental noise and the random noise generated inside the sensor 23 is superimposed on the actually measured displacement waveform $U_{Bj}(t)$, the estimation waveform $U_{estBj}(t)$ is similar to the actually measured displacement waveform $U_{Bj}(t)$.

In this way, according to Equation (76) and based on the acceleration detected by the sensor 21 that observes the observation point P at the first end portion EA1, the acceleration detected by the sensor 22 that observes the observation point $Q_j$ at the second end portion EA2, and the acceleration detected by the sensor 23 that observes the observation point $R_j$ at a position other than the central position $CT_j$ for each lane $L_j$, the measurement device 1 can estimate the displacement at the central position $CT_j$ generated by the traveling of the vehicle 6.

$$e_j(t)=U_{Aj}(t)-D_{Aj}CP_{Aj}(t) \quad (77)$$

1-6. Measurement Method

Figure 27:
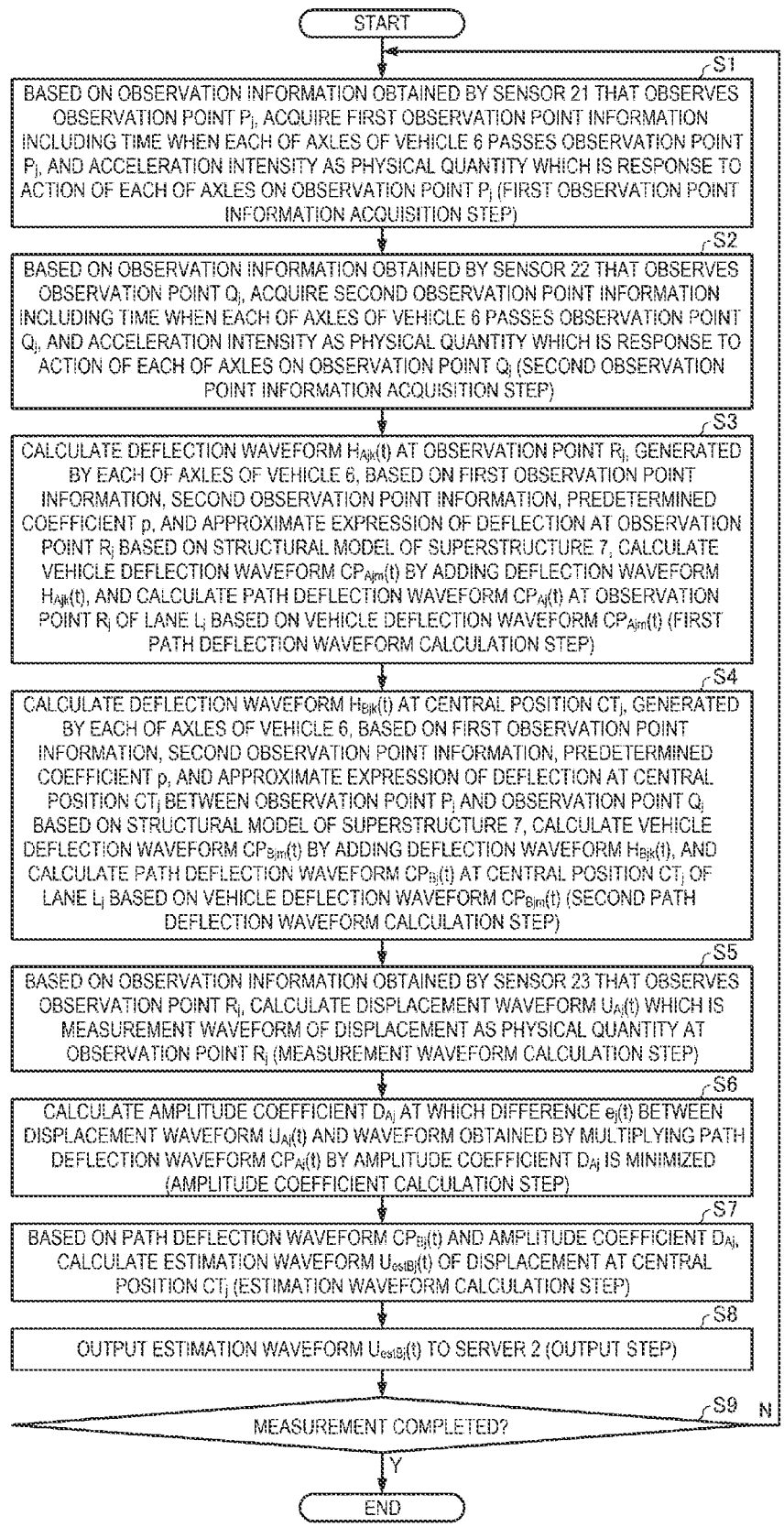
FIG. 27 is a flowchart showing an example of a procedure of a measurement method.

FIG. 27 is a flowchart showing an example of a procedure of the measurement method according to the first embodiment. In the present embodiment, the measurement device 1 executes the procedure shown in FIG. 27.

As shown in FIG. 27, first, for each integer j of or more and N or less, and based on the observation information obtained by the sensor 21 that observes the observation point $P_j$, the measurement device 1 acquires the first observation point information including the time point when each of the plurality of axles of the vehicle 6 passes the observation point $P_j$, and the acceleration intensity as the physical quantity which is the response to the action of each of the plurality of axles on the observation point $P_j$ (step S1). As described above, the sensor 21 that observes the observation point $P_j$ is an acceleration sensor. The observation information obtained by the sensor 21 is detection information on the acceleration generated at the observation point $P_j$. The measurement device 1 acquires the first observation point information based on the acceleration detected by each of the sensors 21. The step S1 is a first observation point information acquisition step.

Next, for each integer j of 1 or more and N or less, and based on the observation information obtained by the sensor 22 that observes the observation point $Q_j$ the measurement device 1 acquires the second observation point information including the time point when each of the plurality of axles of the vehicle 6 passes the observation point $Q_j$ and the acceleration intensity as the physical quantity which is the response to the action of each of the plurality of axles on the observation point $Q_j$ (step S2). As described above, the sensor 22 that observes the observation point $Q_j$ is an acceleration sensor. The observation information obtained by the sensor 22 is detection information on the acceleration generated at the observation point $Q_j$. The measurement device 1 acquires the second observation point information based on the acceleration detected by each of the sensors 22. The step S2 is a second observation point information acquisition step.

Next, for each integer j of 1 or more and N or less, the measurement device 1 calculates the deflection waveform $H_{Ajk}(t)$ at the observation point $R_j$, generated by each of the plurality of axles of the vehicle 6, based on the first observation point information acquired in step S1, the second observation point information acquired in step S2, a predetermined coefficient p, and an approximate expression of deflection at the observation point $R_j$ based on the structural model of the superstructure 7, calculates the vehicle deflection waveform $CP_{Ajm}(t)$ by adding the deflection waveform $H_{Ajk}(t)$, and calculates the path deflection waveform $CP_{Aj}(t)$ at the observation point $R_j$ of the lane $L_j$ based on the vehicle deflection waveform $CP_{Ajm}(t)$ (step S3). Specifically, the measurement device 1 generates the above described axle information using the first observation point information and the second observation point information, and calculates the deflection waveform $H_{Ajk}(t)$ at the observation point $R_j$ generated by each axle of the vehicle 6 according to the above Equation (69) and using the axle information and the predetermined coefficient p. Then, the measurement device 1 calculates the vehicle deflection waveform $CP_{Ajm}(t)$ according to the above Equation (70), and calculates the path deflection waveform $CP_{Aj}(t)$ according to the above Equation (71). The step S3 is a first path deflection waveform calculation step.

Next, for each integer j of 1 or more and N or less, the measurement device 1 calculates the deflection waveform $H_{Bjk}(t)$ at the central position $CT_j$ generated by each of the plurality of axles of the vehicle 6, based on the first observation point information acquired in step S1, the second observation point information acquired in step S2, the predetermined coefficient p, and the approximate expression of deflection at the central position $CT_j$ between the observation point $P_j$ and the observation point $Q_j$ based on the structural model of the superstructure 7, calculates the vehicle deflection waveform $CP_{Bjm}(t)$ by adding the deflection waveform $H_{Bjk}(t)$, and calculates the path deflection waveform $CP_{Bj}(t)$ at the central position $CT_j$ of the lane $L_j$ based on the vehicle deflection waveform $CP_{Bjm}(t)$ (step S4). Specifically, the measurement device 1 calculates the deflection waveform $H_{Bjk}(t)$ at the central position $CT_j$ generated by each axle of the vehicle 6 according to the above Equation (47) and using the axle information and the predetermined coefficient p. Then, the measurement device 1 calculates the vehicle deflection waveform $CP_{Bjm}(t)$ according to the above Equation (48), and calculates the path deflection waveform $CP_{Bj}(t)$ according to the above Equation (49). The step S4 is a second path deflection waveform calculation step.

Next, for each integer j of 1 or more and N or less, and based on the observation information obtained by the sensor 23 that observes the observation point $R_j$ the measurement device 1 calculates the displacement waveform $U_{Aj}(t)$ which is the measurement waveform of the displacement as the physical quantity at the observation point $R_j$ (step S5). As described above, the sensor 23 that observes the observation point $R_j$, an acceleration sensor. The observation information obtained by the sensor 23 is detection information on the acceleration generated at the observation point $R_j$. The measurement device 1 calculates the displacement waveform $U_{Aj}(t)$ by double-integrating the acceleration detected by the sensor 23 after low-pass filtering processing. The step S5 is a measurement waveform calculation step.

Next, for each integer j of 1 or more and N or less, the measurement device 1 calculates the amplitude coefficient $D_{Aj}$ at which the difference $e_j(t)$ is minimized between the displacement waveform $UA_j(t)$ calculated in step S5 and the waveform $DA_jCP_{Aj}(t)$ obtained by multiplying the path deflection waveform $CP_{Aj}(t)$ calculated in step S3 by the amplitude coefficient $D_{Aj}$ (step S6). The step S6 is an amplitude coefficient calculation step.

Next, for each integer j of 1 or more and N or less, and based on the path deflection waveform $CP_{Bj}(t)$ calculated in step S4 and the amplitude coefficient $D_{Aj}$ calculated in step S6, the measurement device 1 calculates the estimation waveform $U_{estBj}(t)$ of displacement at the central position $CT_j$ (step S7). The step S7 is an estimation waveform calculation step.

Next, for each integer j of 1 or more and N or less, the measurement device 1 outputs the estimation waveform $U_{estBj}(t)$ calculated in step S7 to the server 2 (step S8). The step S8 is an output step.

The measurement device 1 repeats the processing in steps S1 to S8 until the measurement is completed (N in step S9).

Figure 28:
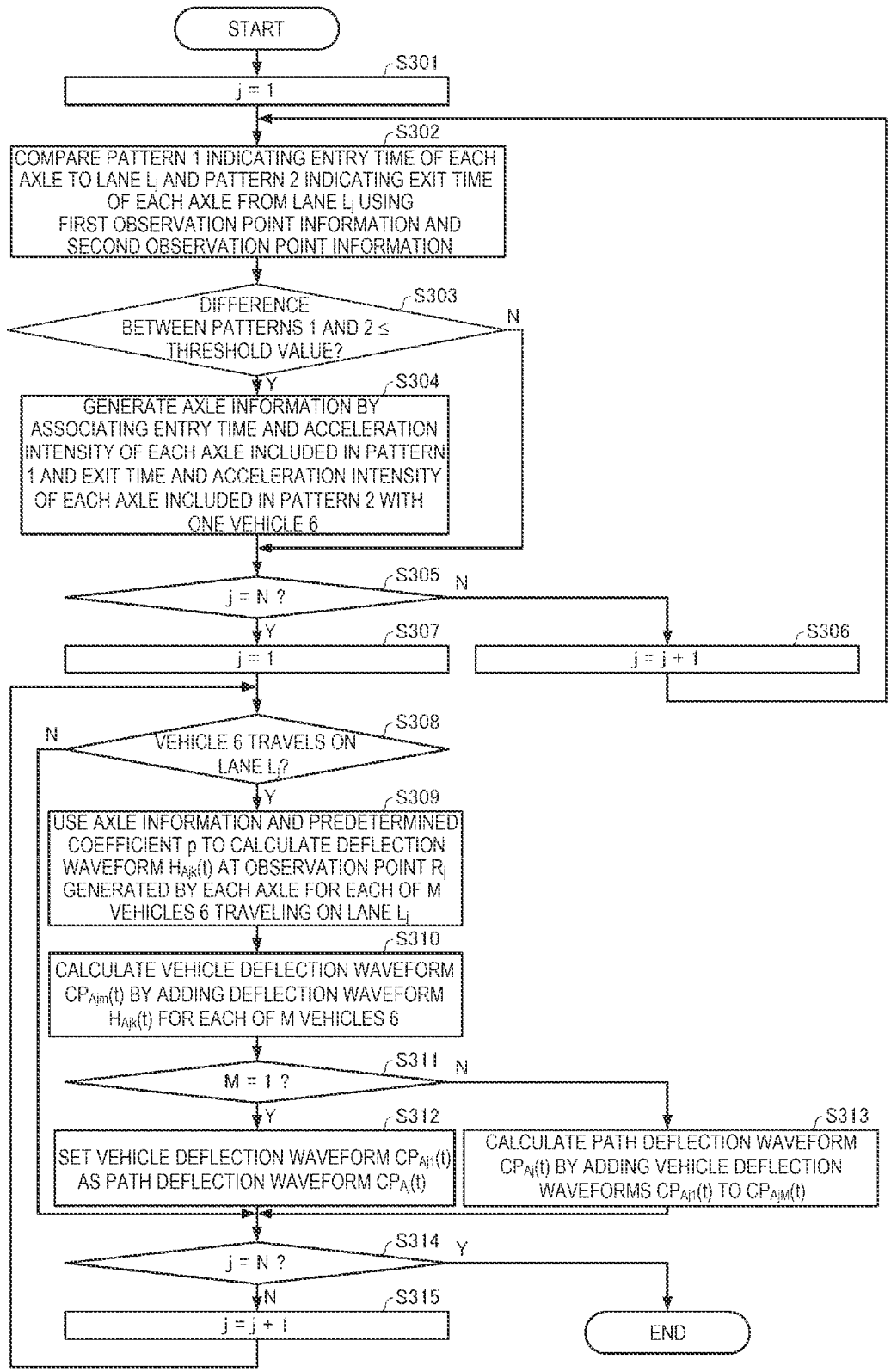
FIG. 28 is a flowchart showing an example of a procedure of a first path deflection waveform calculation step.

FIG. 28 is a flowchart showing an example of a procedure of the first path deflection waveform calculation step, which is step S3 in FIG. 27.

As shown in FIG. 28, first, the measurement device 1 sets the integer j to 1 (step S301), and compares the pattern 1 indicating the entry time point of each axle to the lane $L_j$ and the pattern 2 indicating the exit time point of each axle from the lane $L_j$ using the first observation point information and the second observation point information (step S302).

Then, when a difference between the entry time point of each axle included in pattern 1 and the exit time point of each axle included in the pattern 2 is less than or equal to a threshold value (Y in step S303), the measurement device 1 generates the axle information by associating the entry time point and the acceleration intensity of each axle included in the pattern 1 and the exit time point and the acceleration intensity of each axle included in the pattern 2 with one vehicle 6 (step S304).

When the difference between the entry time point of each axle included in the pattern 1 and the exit time of each axle included in the pattern 2 is greater than the threshold value (N in step S303), the measurement device 1 does not perform the processing in step S304.

When the integer j is not N (N in step S305), the measurement device 1 adds 1 to the integer j (step S306), and repeats the processing in steps S301 to S304.

Then, when the integer j is N (Y in step S305), the measurement device 1 set the integer j to 1 (step S307). When there is a vehicle 6 traveling on the lane $L_j$ (Y in step S308), the measurement device 1 calculates, using the axle information generated in step S304 and the predetermined coefficient p, the deflection waveform $H_{Ajk}(t)$ at the observation point R generated by each axle for each of M vehicles 6 traveling on the lane $L_j$ (step S309).

Next, the measurement device 1 calculates the vehicle deflection waveform $CP_{Ajm}(t)$ by adding the deflection waveform $H_{Ajk}(t)$ for each of the M vehicles 6 (step S310).

Next, when M is 1 (Y in step S311), the measurement device 1 sets the vehicle deflection waveform $CP_{Aj1}(t)$ as the path deflection waveform $CP_{Aj}(t)$ (step S312).

Next, when M is not 1 (N in step S311), the measurement device 1 calculates the path deflection waveform $CP_{Aj}(t)$ by adding vehicle deflection waveforms $CP_{Aj1}(t)$ to $CP_{AjM}(t)$ (step S313).

When there is no vehicle 6 traveling on the lane $L_j$ (N in step S308), the measurement device 1 does not perform the processing in steps S309 to S313.

When the integer j is not N (N in step S314), the measurement device 1 adds 1 to the integer j (step S315), and repeats the processing in steps S308 to S313.

Then, when the integer j is N (Y in step S314), the measurement device 1 ends the processing in the first path deflection waveform calculation step.

Figure 29:
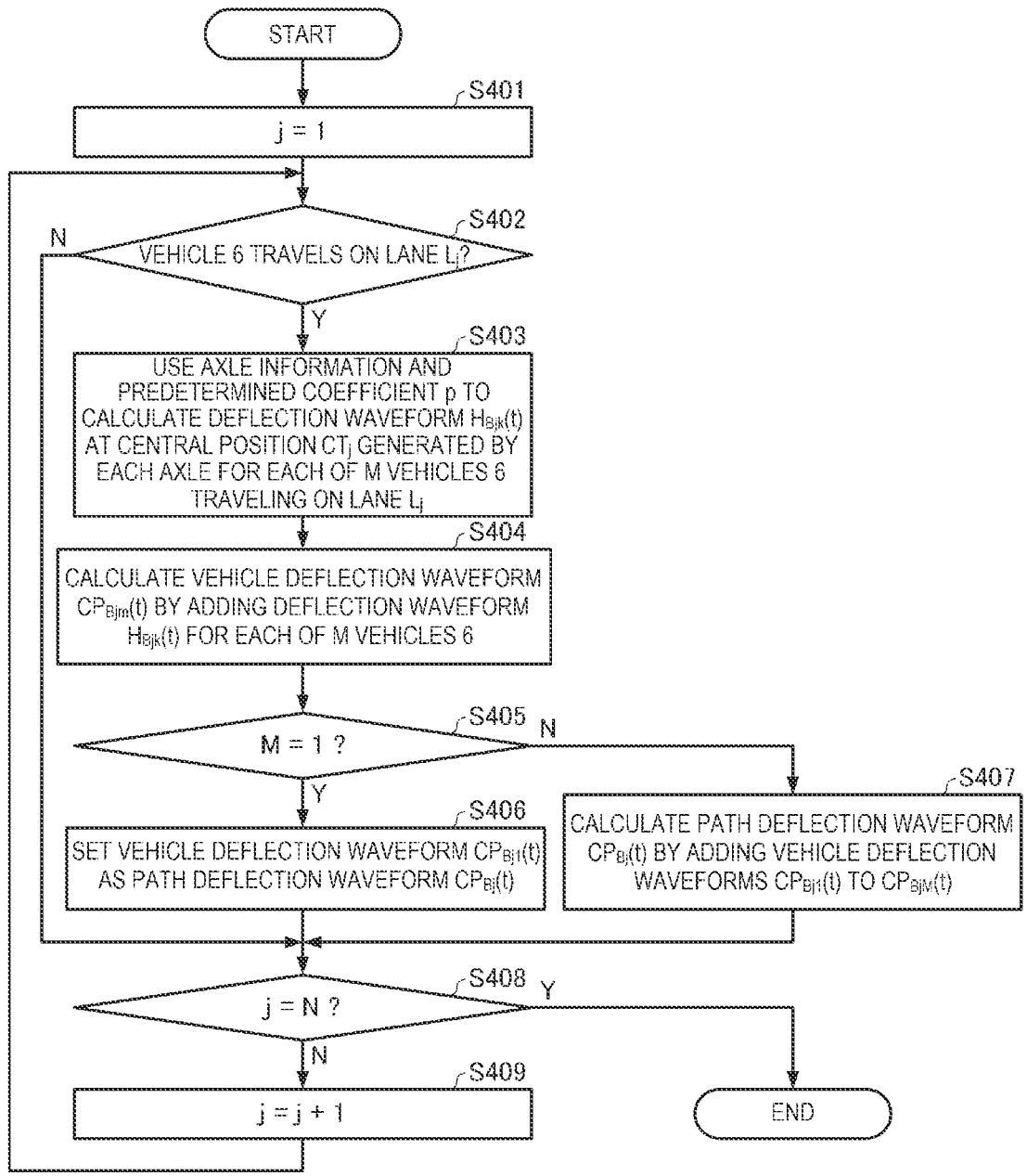
FIG. 29 is a flowchart showing an example of a procedure of a second path deflection waveform calculation step.

FIG. 29 is a flowchart showing an example of a procedure of the second path deflection waveform calculation step, which is step S4 in FIG. 27.

As shown in FIG. 29, first, the measurement device 1 sets the integer j to 1 (step S401). When there is a vehicle 6 traveling on the lane $L_j$ (Y in step S402), the measurement device 1 calculates, using the axle information generated in step S304 in FIG. 28 and the predetermined coefficient p, the deflection waveform $H_{Bjk}(t)$ at the central position $CT_j$ generated by each axle for each of the M vehicles 6 traveling on the lane $L_j$ (step S403).

Next, the measurement device 1 calculates the vehicle deflection waveform $CP_{Bjm}(t)$ by adding the deflection waveform $H_{Bjk}(t)$ for each of the M vehicles 6 (step S404).

Next, when M is 1 (Y in step S405), the measurement device 1 sets the vehicle deflection waveform $CP_{Bj1}(t)$ as the path deflection waveform $CP_{Bj}(t)$ (step S406).

Next, when M is not 1 (N in step S405), the measurement device 1 calculates the path deflection waveform $CP_{Bj}(t)$ by adding vehicle deflection waveforms $CP_{Bj1}(t)$ to $CP_{BjM}(t)$ (step S407).

When there is no vehicle 6 traveling on the lane $L_j$ (N in step S402), the measurement device 1 does not perform the processing in steps S403 to S407.

When the integer j is not N (N in step S408), the measurement device 1 adds 1 to the integer j (step S409), and repeats the processing in steps S402 to S407.

Then, when the integer j is N (Y in step S408), the measurement device 1 ends the processing in the second path deflection waveform calculation step.

Figure 30:
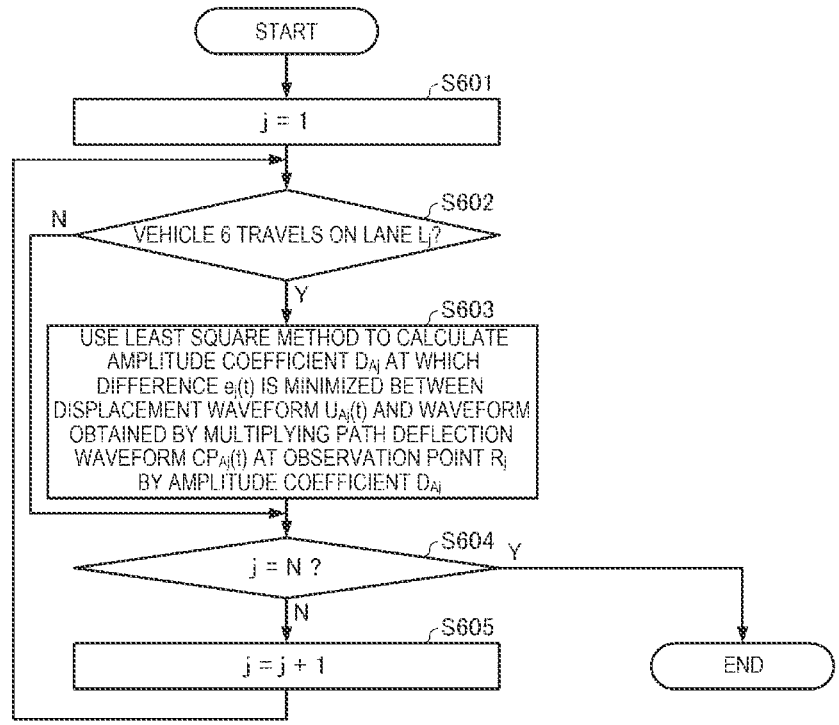
FIG. 30 is a flowchart showing an example of a procedure of an amplitude coefficient calculation step.

FIG. 30 is a flowchart showing an example of a procedure of the amplitude coefficient calculation step, which is step S6 in FIG. 27.

As shown in FIG. 30, first, the measurement device 1 sets the integer j to 1 (step S601). When there is a vehicle 6 traveling on the lane $L_j$ (Y in step S602), the measurement device 1 calculates, using the least square method, the amplitude coefficient $D_{Aj}$ at which the difference $e_j(t)$ is minimized between the displacement waveform $U_{Aj}(t)$ and the waveform obtained by multiplying the path deflection waveform $CP_{Aj}(t)$ at the observation point $R_j$ by the amplitude coefficient $D_{Aj}$ (step S603).

When there is no vehicle 6 traveling on the lane $L_j$ (N in step S602), the measurement device 1 does not perform the processing in step S603.

When the integer j is not N (N in step S604), the measurement device 1 adds 1 to the integer j (step S605), and repeats the processing in steps S602 and S603.

Then, when the integer j is N (Y in step S604), the measurement device 1 ends the processing in the amplitude coefficient calculation step.

Figure 31:
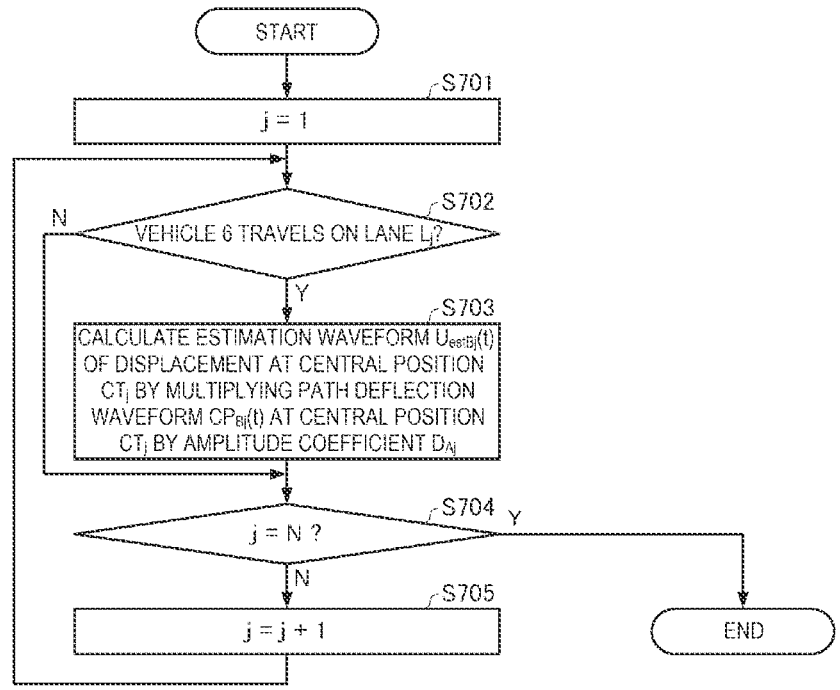
FIG. 31 is a flowchart showing an example of a procedure of an estimation waveform calculation step.

FIG. 31 is a flowchart showing an example of a procedure of the estimation waveform calculation step, which is step S7 in FIG. 27.

As shown in FIG. 31, first, the measurement device 1 sets the integer j to 1 (step S701). When there is a vehicle 6 traveling on the lane $L_j$ (Y in step S702), the measurement device 1 calculates the estimation waveform $U_{estBj}(t)$ of displacement at the central position $CT_j$ by multiplying the path deflection waveform $CP_{Bj}(t)$ at the central position $CT_j$ by the amplitude coefficient $D_{Aj}$ (step S703).

When there is no vehicle 6 traveling on the lane $L_j$ (N in step S702), the measurement device 1 does not perform the processing in step S703.

When the integer j is not N (N in step S704), the measurement device 1 adds 1 to the integer j (step S705), and repeats the processing in steps S702 and S703.

Then, when the integer j is N (Y in step S704), the measurement device 1 ends the processing in the estimation waveform calculation step.

1-7. Configuration of Measurement Device

Figure 32:
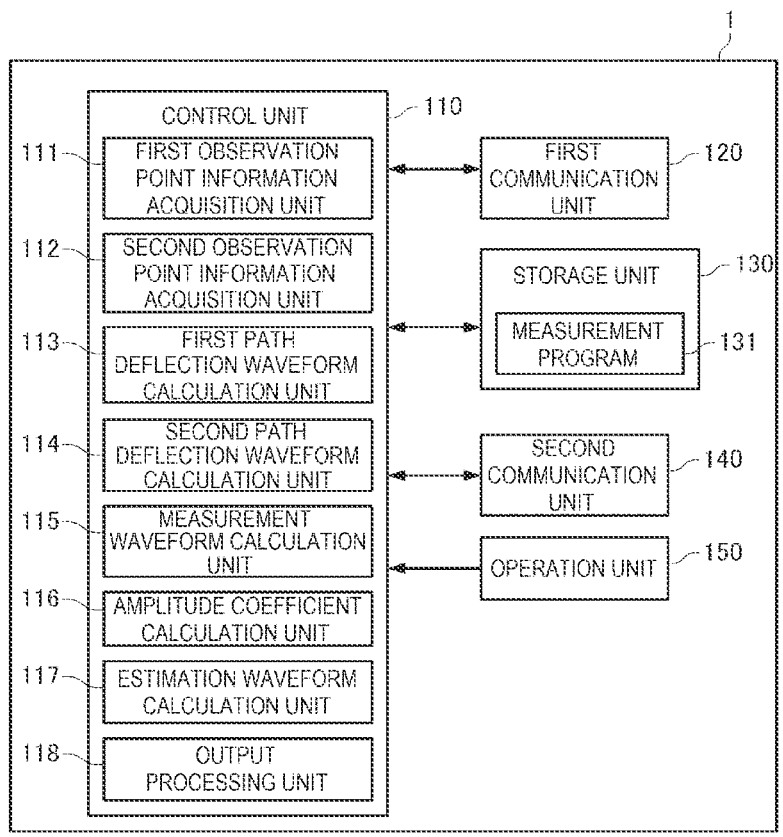
FIG. 32 is a diagram showing a configuration example of a measurement device.

FIG. 32 is a diagram showing a configuration example of the measurement device 1 according to the first embodiment. As shown in FIG. 32, the measurement device 1 includes a control unit 110, a first communication unit 120, a storage unit 130, a second communication unit 140, and an operation unit 150.

The control unit 110 calculates the displacement or the like of the bridge floor 7a based on the acceleration data output from each of the sensors 21, 22, and 23 installed in the superstructure 7.

The first communication unit 120 receives the acceleration data from each of the sensors 21, 22, and 23. The acceleration data output from each of the sensors 21, 22, and 23 is, for example, a digital signal. The first communication unit 120 outputs to the control unit 110 the acceleration data received from each of the sensors 21, 22, and 23.

The storage unit 130 is a memory that stores a program, data, and the like for the control unit 110 to perform calculation processing and control processing. In addition, the storage unit 130 stores a program, data, and the like for the control unit 110 to implement a predetermined application function. The storage unit 130 is implemented by, for example, various integrated circuit (IC) memories such as a read only memory (ROM), a flash ROM, and a random access memory (RAM), and a recording medium such as a hard disk and a memory card.

The storage unit 130 includes a non-volatile information storage device that is a device or a medium that can be read by a computer. Various programs, data, and the like may be stored in the information storage device. The information storage device may be an optical disk such as an optical disk DVD or a CD, a hard disk drive, or various types of memories such as a card-type memory or a ROM. In addition, the control unit 110 may receive various programs, data, and the like via the communication network 4 and store the programs, the data, and the like in the storage unit 130.

The second communication unit 140 transmits information such as a calculation result of the control unit 110 to the server 2 via the communication network 4.

The operation unit 150 acquires operation data from the user and transmits the operation data to the control unit 110.

The control unit 110 includes a first observation point information acquisition unit 111, a second observation point information acquisition unit 112, a first path deflection waveform calculation unit 113, a second path deflection waveform calculation unit 114, a measurement waveform calculation unit 115, an amplitude coefficient calculation unit 116, an estimation waveform calculation unit 117, and an output processing unit 118.

For each integer j of 1 or more and N or less, and based on the observation information obtained by the sensor that observes the observation point $P_j$, the first observation point information acquisition unit 111 performs processing of acquiring the first observation point information including the time point when each of the plurality of axles of the vehicle 6 passes the observation point $P_j$, and the acceleration intensity as the physical quantity which is the response to the action of each of the plurality of axles on the observation point $P_j$. That is, the first observation point information acquisition unit 111 performs the processing of the first observation point information acquisition step in FIG. 27. The first observation point information acquired by the first observation point information acquisition unit 111 is stored in the storage unit 130.

For each integer j of 1 or more and N or less, and based on the observation information obtained by the sensor that observes the observation point $Q_j$, the second observation point information acquisition unit 112 performs processing of acquiring the second observation point information including the time point when each of the plurality of axles of the vehicle 6 passes the observation point $Q_j$ and the acceleration intensity as the physical quantity which is the response to the action of each of the plurality of axles on the observation point $Q_j$. That is, the second observation point information acquisition unit 112 performs the processing of the second observation point information acquisition step in FIG. 27. The second observation point information acquired by the second observation point information acquisition unit 112 is stored in the storage unit 130.

For each integer j of 1 or more and N or less, the first path deflection waveform calculation unit 113 performs processing of calculating the deflection waveform $H_{Ajk}(t)$ at the observation point $R_j$, generated by each of the plurality of axles of the vehicle 6, based on the first observation point information acquired by the first observation point information acquisition unit 111, the second observation point information acquired by the second observation point information acquisition unit 112, the predetermined coefficient p, and the approximate expression of deflection at the observation point $R_j$ based on the structural model of the superstructure 7, calculating the vehicle deflection waveform $CP_{Ajm}(t)$ by adding the deflection waveform $H_{Ajk}(t)$, and calculating the path deflection waveform $CP_{Aj}(t)$ at the observation point $R_j$ of the lane $L_j$ based on the vehicle deflection waveform $CP_{Ajm}(t)$. That is, the first path deflection waveform calculation unit 113 performs the processing of the first path deflection waveform calculation step in FIG. 27. The path deflection waveforms $CP_{A1}(t)$ to $CP_{AN}(t)$ calculated by the first path deflection waveform calculation unit 113 are stored in the storage unit 130. The predetermined coefficient p and the approximate expression of deflection at the observation point $R_j$ are previously stored in the storage unit 130.

For each integer j of 1 or more and N or less, the second path deflection waveform calculation unit 114 performs processing of calculating the deflection waveform $H_{Bjk}(t)$ at the central position $CT_j$, generated by each of the plurality of axles of the vehicle 6, based on the first observation point information acquired by the first observation point information acquisition unit 111, the second observation point information acquired by the second observation point information acquisition unit 112, the predetermined coefficient p, and the approximate expression of deflection at the central position $CT_j$ between the observation point $P_j$ and the observation point $Q_j$ based on the structural model of the superstructure 7, calculating the vehicle deflection waveform $CP_{Bjm}(t)$ by adding the deflection waveform $H_{Bjk}(t)$, and calculating the path deflection waveform $CP_{Bj}(t)$ at the central position $CT_j$ of the lane $L_j$ based on the vehicle deflection waveform $CP_{Bjm}(t)$. That is, the second path deflection waveform calculation unit 114 performs the processing of the second path deflection waveform calculation step in FIG. 27. The path deflection waveforms $CP_{B1}(t)$ to $CP_{BN}(t)$ calculated by the second path deflection waveform calculation unit 114 are stored in the storage unit 130. The approximate expression of deflection at the central position $CT_j$ is previously stored in the storage unit 130.

For each integer j of 1 or more and N or less, and based on the observation information obtained by the sensor 23 that observes the observation point $R_j$, the measurement waveform calculation unit 115 performs processing of calculating the displacement waveform $U_{Aj}(t)$ which is the measurement waveform of the displacement as the physical quantity at the observation point $R_j$ That is, the measurement waveform calculation unit 115 performs the processing of the measurement waveform calculation step in FIG. 27. The displacement waveforms $U_{A1}(t)$ to $U_{AN}(t)$ calculated by the measurement waveform calculation unit 115 are stored in the storage unit 130.

For each integer j of 1 or more and N or less, the amplitude coefficient calculation unit 116 performs processing of calculating the amplitude coefficient $D_{Aj}$ at which the difference $e_j(t)$ is minimized between the displacement waveform $U_{Aj}(t)$ at the observation point $R_j$ calculated by the measurement waveform calculation unit 115 and the waveform $D_{Aj}CP_{Aj}(t)$ obtained by multiplying the path deflection waveform $CP_{Aj}(t)$ at the observation point $R_j$ calculated by the first path deflection waveform calculation unit 113 by the amplitude coefficient $D_{Aj}$ That is, the amplitude coefficient calculation unit 116 performs the processing of the amplitude coefficient calculation step in FIG. 27. The amplitude coefficients $D_{A1}$ to $D_{AN}$ calculated by the amplitude coefficient calculation unit 116 are stored in the storage unit 130.

For each integer j of 1 or more and N or less, and based on the path deflection waveform $CP_{Bj}(t)$ at the central position $CT_j$ calculated by the second path deflection waveform calculation unit 114 and the amplitude coefficient DA calculated by the amplitude coefficient calculation unit 116, the estimation waveform calculation unit 117 performs processing of calculating the estimation waveform $U_{estBj}(t)$ of displacement as the physical quantity at the central position $CT_j$. That is, the estimation waveform calculation unit 117 performs the processing of the estimation waveform calculation step in FIG. 27. Specifically, for each integer j of 1 or more and N or less, the estimation waveform calculation unit 117 calculates the estimation waveform $U_{estBj}(t)$ by multiplying the path deflection waveform $CP_{Bj}(t)$ by the amplitude coefficient $D_{Aj}$. The estimation waveforms $U_{estB1}(t)$ to $U_{estBN}(t)$ calculated by the estimation waveform calculation unit 117 are stored in the storage unit 130.

For each integer j of 1 or more and N or less, the output processing unit 118 performs processing of outputting the estimation waveform $U_{estBj}(t)$ calculated by the estimation waveform calculation unit 117 to the server 2 via the second communication unit 140. That is, the output processing unit 118 performs the processing of the output step in FIG. 27.

In the present embodiment, the control unit 110 is a processor that executes various programs stored in the storage unit 130. By executing a measurement program 131 stored in the storage unit 130, each function of the first observation point information acquisition unit 111, the second observation point information acquisition unit 112, the first path deflection waveform calculation unit 113, the second path deflection waveform calculation unit 114, the measurement waveform calculation unit 115, the amplitude coefficient calculation unit 116, the estimation waveform calculation unit 117, and the output processing unit 118 is implemented. In other words, the measurement program 131 is a program that causes the measurement device 1 as a computer to execute each procedure in the flowchart shown in FIG. 27.

In the processor, for example, functions of each part may be implemented by individual hardware, or the functions of each part may be implemented by integrated hardware. For example, the processor may include hardware. The hardware may include at least one of a circuit for processing the digital signal and a circuit for processing an analog signal. The processor may be a central processing unit (CPU), a graphics processing unit (GPU), a digital signal processor (DSP), or the like. The control unit 110 is implemented as a custom integrated circuit (IC) such as an application specific integrated circuit (ASIC), and may implement the functions of each part, or may implement the functions of each part by the CPU and the ASIC.

1-8. Operation Effects

In the measurement method according to the first embodiment described above, the measurement device 1 acquires, based on the observation information obtained by each sensor 21 that observes the observation point $P_j$ the first observation point information including the time point and the acceleration intensity when each of the plurality of axles of the vehicle 6 passes the observation point $P_j$ The measurement device 1 acquires, based on the observation information obtained by each sensor 22 that observes the observation point $Q_j$, the second observation point information including the time point and the acceleration intensity when each of the plurality of axles of the vehicle 6 passes the observation point $Q_j$. The measurement device calculates the deflection waveform $H_{Ajk}(t)$ at the observation point $R_j$ generated by each axle, according to Equation (69) and based on the first observation point information, the second observation point information, the predetermined coefficient p, and the approximate expression (63) of deflection at the observation point $R_j$ based on the structural model of the superstructure 7 of the bridge 5, calculates the vehicle deflection waveform $CP_{Ajm}(t)$ by adding the deflection waveform $H_{Ajk}(t)$ at the observation point $R_j$ according to Equation (70), and calculates the path deflection waveform $CP_{Aj}(t)$ at the observation point $R_j$ of the lane $L_j$ based on the vehicle deflection waveform $CP_{Ajm}(t)$ and according to Equation (71). The measurement device 1 calculates the deflection waveform $H_{Bjk}(t)$ at the central position $CT_j$ generated by each axle, according to Equation (47) and based on the first observation point information, the second observation point information, the predetermined coefficient p, and the approximate expression (39) of deflection at the central position $CT_j$ between the observation point $P_j$ and the observation point $Q_j$ based on the structural model of the superstructure 7 of the bridge 5, calculates the vehicle deflection waveform $CP_{Bjm}(t)$ by adding the deflection waveform $H_{Bjk}(t)$ at the central position CT according to Equation (48), and calculates the path deflection waveform $CP_{Bj}(t)$ at the central position $CT_j$ of the lane $L_j$ based on the vehicle deflection waveform $CP_{Bjm}(t)$ and according to Equation (49). Further, the measurement device 1 calculates the displacement waveform $U_{Aj}$ at the observation point $R_j$ based on the observation information obtained by the sensor 23 that observes the observation point $R_j$, and calculates, according to Equation (75), the amplitude coefficient $D_{Aj}$ at which the difference $e_j(t)$ is minimized between the displacement waveform $U_{Aj}(t)$ and the waveform obtained by multiplying the path deflection waveform $CP_{Aj}(t)$ at the observation point $R_j$ calculated by the amplitude coefficient $D_{Aj}$. Then, based on the path deflection waveform $CP_{Bj}(t)$ at the central position $CT_j$ and the calculated amplitude coefficient $D_{Aj}$, the measurement device 1 calculates the estimation waveform $U_{estBj}(t)$ of displacement at the central position $CT_j$. Specifically, the measurement device 1 calculates, according to Equation (76), the estimation waveform $U_{estBj}(t)$ by multiplying the path deflection waveform $CP_{Bj}(t)$ by the amplitude coefficient $D_{Aj}$. Therefore, according to the measurement method in the first embodiment, the measurement device 1 can estimate the displacement at the central position $CT_j$ for each lane $L_j$ without observing the central position $CT_j$ between the observation point $P_j$ and the observation point $Q_j$ associated with each lane $L_j$ of the superstructure 7 of the bridge 5 on which the vehicle 6 moves. Therefore, for example, even when it is difficult to provide a sensor at the central position $CT_j$ due to some reason such as the structure of the bridge 5 or the installation location, the measurement device 1 can estimate the displacement at the central position $CT_j$.

According to the measurement method in the first embodiment, since the measurement device 1 can estimate the displacement at the central position $CT_j$ by using the sensors 21, 22, and 23, which are acceleration sensors that have higher degree of freedom in installation than a displacement meter and a strain gauge and that can be easily installed, cost of the measurement system 10 can be reduced.

According to the measurement method in the first embodiment, since the measurement device 1 can calculate the displacement waveform which is the deformation of the superstructure 7 due to the axle load of the vehicle 6 passing through the superstructure 7, sufficient information can be provided for maintenance and management of the bridge 5 to predict the damage of the superstructure 7.

2. Second Embodiment

In a measurement method according to a second embodiment, calculation accuracy for the estimation waveform $U_{estBj}(t)$ of displacement at the central position $CT_j$ is improved with respect to the first embodiment by further using a difference $e_j(t)$ between the displacement waveform $U_{Aj}(t)$ at the observation point $R_j$ and the path deflection waveform $CP_{Aj}(t)$ at the observation point $R_j$ of the lane $L_j$. Hereinafter, the same components as those in the first embodiment will be denoted by the same reference numerals for the measurement method according to the second embodiment, and the description repeated with the first embodiment will be omitted or simplified, and different contents from the first embodiment will be mainly described.

In the present embodiment, the measurement device 1 substitutes the amplitude coefficient $D_{Aj}$ into Equation (77) which is transformed from the above Equation (72), and calculates the difference $e_j(t)$ between the displacement waveform $U_{Aj}(t)$ at the observation point $R_j$ and the path deflection waveform $CP_{Aj}(t)$ at the observation point $R_j$ of the lane $L_j$.

$$e_j(t)=U_{Aj}(t)-D_{Aj}CP_{Aj}(t) \qquad (77)$$

Figure 33:
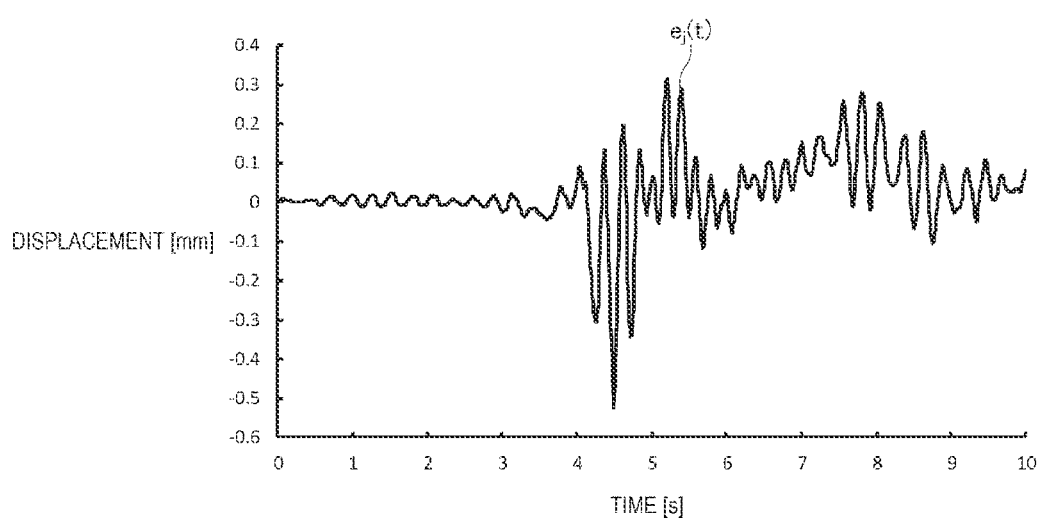
FIG. 33 is a diagram showing an example of a difference $e_j(t)$ between the displacement waveform $U_{Aj}(t)$ and the path deflection waveform $CP_{Aj}(t)$.

FIG. 33 shows an example of the difference $e_j(t)$ calculated according to Equation (77). In FIG. 33, the horizontal axis represents the time and the vertical axis represents the displacement. The difference $e_j(t)$ shown in FIG. 33 is a difference between the displacement waveform $U_{Aj}(t)$ and the path deflection waveform $CP_{Aj}(t)$ shown in FIG. 24.

The measurement device 1 adds the difference $e_j(t)$ to a waveform obtained by multiplying a path deflection waveform $CP_{Bj}(t)$ at the central position $CT_j$ of the lane $L_j$ by the amplitude coefficient $D_{Aj}$ as in Equation (78), and thus calculates the estimation waveform $U_{estBj}(t)$ of displacement at the central position $CT_j$.

$$U_{estBj}(t)=D_{Aj}CP_{Bj}(t)+e_j(t) \qquad (78)$$

Figure 34:
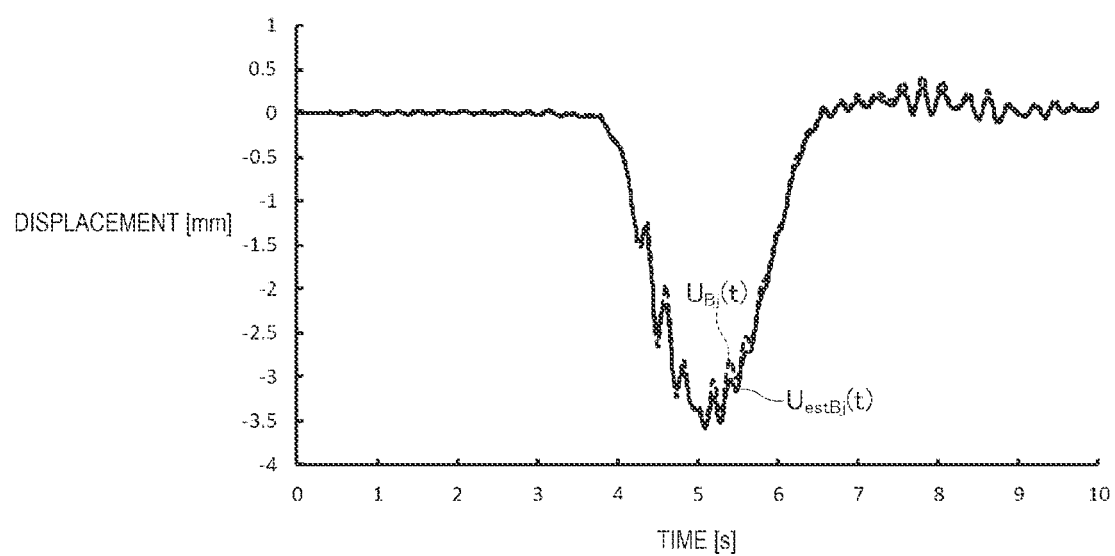
FIG. 34 is a diagram showing an example of an estimation waveform $U_{estBj}(t)$ according to a second embodiment.

FIG. 34 shows, with a solid line, an example of a waveform of the estimation waveform $U_{estBj}(t)$ calculated according to Equation (78). FIG. 34 also shows, with a broken line, the displacement waveform $U_{Bj}(t)$ experimentally measured by installing a displacement meter at the central position $CT_j$. In FIG. 34, the horizontal axis represents the time and the vertical axis represents the displacement. The estimation waveform $U_{estBj}(t)$ shown in FIG. 34 is a waveform obtained by adding a waveform $D_{Aj}(t)CP_{Bj}(t)$ equal to the estimation waveform $U_{estBj}(t)$ shown in FIG. 26 and the difference $e_j(t)$ shown in FIG. 33. As shown in FIG. 34, the estimation waveform $U_{estBj}(t)$ also includes a noise component, and is very similar to the actually measured displacement waveform $U_{Bj}(t)$.

Figure 35:
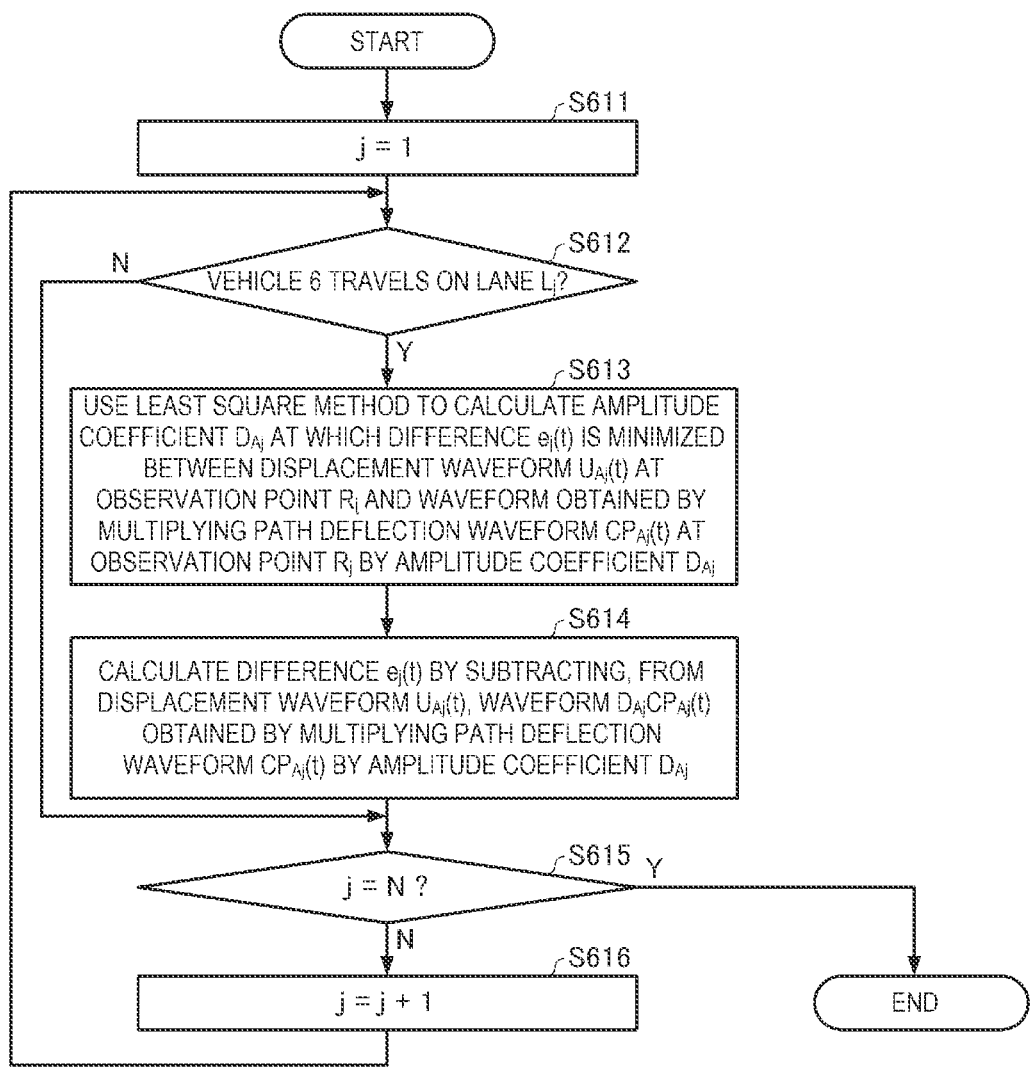
FIG. 35 is a flowchart showing an example of a procedure of an amplitude coefficient calculation step according to the second embodiment.

FIG. 35 is a flowchart showing an example of a procedure of an amplitude coefficient calculation step in the second embodiment, which is step S6 in FIG. 27.

As shown in FIG. 35, first, the measurement device 1 sets the integer j to 1 (step S611). When there is a vehicle 6 traveling on the lane $L_j$ (Y in step S612), the measurement device 1 calculates, using a least square method, the amplitude coefficient DA at which the difference $e_j(t)$ is minimized between the displacement waveform $U_{Aj}(t)$ at the observation point $R_j$ and the waveform obtained by multiplying the path deflection waveform $CP_{Aj}(t)$ at the observation point $R_j$ by the amplitude coefficient $D_{Aj}$ (step S613).

The measurement device 1 calculates the difference $e_j(t)$ by subtracting, from the displacement waveform UA (t), the waveform $D_{Aj}CP_{Aj}(t)$ obtained by multiplying the path deflection waveform $CP_{Aj}(t)$ by the amplitude coefficient $D_{Aj}$ (step S614).

When there is no vehicle 6 traveling on the lane $L_j$ (N in step S612), the measurement device 1 does not perform the processing in steps S613 and S614.

When the integer j is not N (N in step S615), the measurement device 1 adds 1 to the integer j (step S616), and repeats the processing in steps S612 to S614.

Then, when the integer j is N (Y in step S615), the measurement device 1 ends the processing in the amplitude coefficient calculation step.

Figure 36:
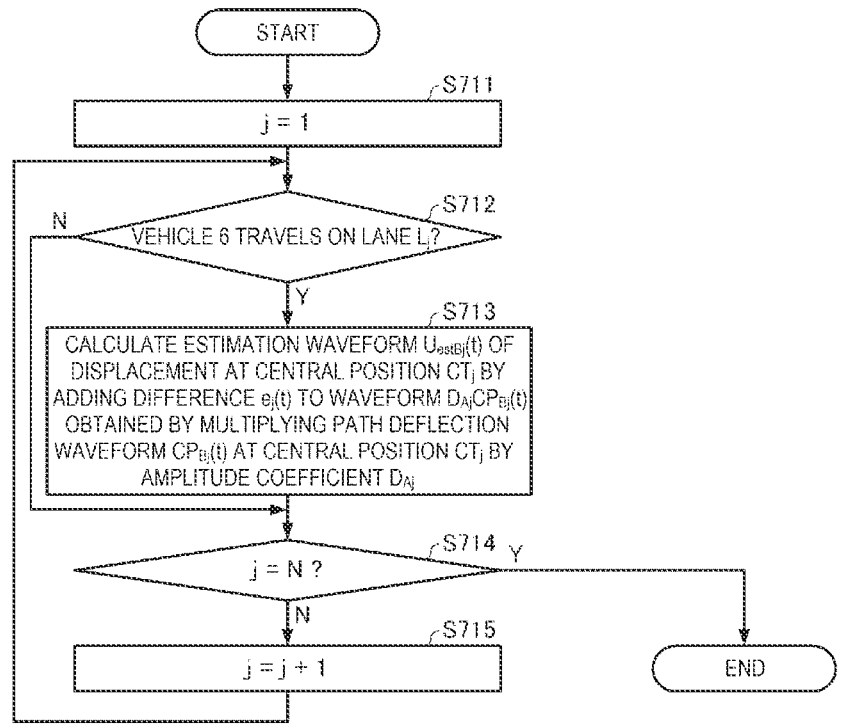
FIG. 36 is a flowchart showing an example of a procedure of an estimation waveform calculation step according to the second embodiment.

FIG. 36 is a flowchart showing an example of a procedure of an estimation waveform calculation step in the second embodiment, which is step S7 in FIG. 27.

As shown in FIG. 36, first, the measurement device 1 sets the integer j to 1 (step S711). When there is a vehicle 6 traveling on the lane $L_j$ (Y in step S712), the measurement device 1 calculates the estimation waveform $U_{estBj}(t)$ of displacement at the central position $CT_j$ by adding the difference $e_j(t)$ calculated in step S614 in FIG. 35 to a waveform $D_{Aj}CP_{Bj}(t)$ obtained by multiplying the path deflection waveform $CP_{Bj}(t)$ at the central position $CT_j$ by the amplitude coefficient $D_{Aj}$ (step S713).

When there is no vehicle 6 traveling on the lane $L_j$ (N in step S712), the measurement device 1 does not perform the processing in step S713.

When the integer j is not N (N in step S714), the measurement device 1 adds 1 to the integer j (step S715), and repeats the processing in steps S712 and S713.

Then, when the integer j is N (Y in step S714), the measurement device 1 ends the processing in the estimation waveform calculation step.

In the present embodiment, for each integer j of 1 or more and N or less, the amplitude coefficient calculation unit 116 calculates the difference $e_j(t)$ and the amplitude coefficient $D_{Aj}$ at which the difference $e_j(t)$ is minimized between the displacement waveform $UA_j(t)$ at the observation point $R_j$ calculated by the measurement waveform calculation unit 115 and the waveform $D_{Aj}CP_{Aj}(t)$ obtained by multiplying the path deflection waveform $CP_{Aj}(t)$ at the observation point $R_j$ calculated by the first path deflection waveform calculation unit 113 by the amplitude coefficient $D_{Aj}$. The amplitude coefficients $D_{A1}$ to $D_{AN}$ and the differences $e_1(t)$ to $e_N(t)$ calculated by the amplitude coefficient calculation unit 116 are stored in the storage unit 130.

For each integer j of 1 or more and N or less, the estimation waveform calculation unit 117 performs processing of adding the waveform $D_{Aj}CP_{Bj}(t)$ obtained by multiplying the path deflection waveform $CP_{Bj}(t)$ at the central position $CT_j$ calculated by the second path deflection waveform calculation unit 114 by the amplitude coefficient $D_{Aj}$ calculated by the amplitude coefficient calculation unit 116, and calculating the estimation waveform $U_{estBj}(t)$ of displacement as a physical quantity at the central position $CT_j$. The estimation waveforms $U_{estB1}(t)$ to $U_{estBN}(t)$ calculated by the estimation waveform calculation unit 117 are stored in the storage unit 130.

Other configurations of the measurement device 1 are the same as those of the first embodiment, and description thereof will be omitted.

In the measurement method according to the second embodiment described above, the measurement device 1 calculates the amplitude coefficient $D_{Aj}$ at the difference $e_j(t)$ is minimized between the displacement waveform $U_{Aj}(t)$ at the observation point $R_j$ and the waveform obtained by multiplying the path deflection waveform $CP_{Aj}(t)$ at the observation point $R_j$ by the amplitude coefficient $D_{Aj}$ according to Equation (75), and calculates the difference $e_j(t)$ according to Equation (77). Then, the measurement device 1 calculates, according to Equation (78), the estimation waveform $U_{estBj}(t)$ by adding the difference $e_j(t)$ to the waveform obtained by multiplying the path deflection waveform $CP_{Bj}(t)$ at the central position $CT_j$ by the amplitude coefficient $D_{Aj}$. Therefore, according to the measurement method in the second embodiment, for example, even when it is difficult to provide a sensor at the central position $CT_j$, the measurement device 1 can estimate the displacement at the central position $CT_j$ without observing the central position $CT_j$. Further, according to the measurement method in the second embodiment, since the difference $e_j(t)$ includes environmental noise caused by vibration and the like of the superstructure 7, the measurement device 1 can accurately estimate the displacement at the central position $CT_j$ including the environmental noise.

In addition, according to the measurement method in the second embodiment, the same effects as those of the first embodiment can be obtained.

3. Third Embodiment

In a measurement method according to the third embodiment, a plurality of observation points $R_j$ are set for each lane $L_j$ to improve calculation accuracy for the estimation waveform $U_{estBj}(t)$ of displacement at the central position $CT_j$. Hereinafter, the same components as those of the first embodiment or the second embodiment will be denoted by the same reference numerals for the measurement method according to the third embodiment, and description repeated with the first embodiment or the second embodiment will be omitted or simplified, and different contents from the first embodiment and second embodiment will be mainly described.

Figure 37:
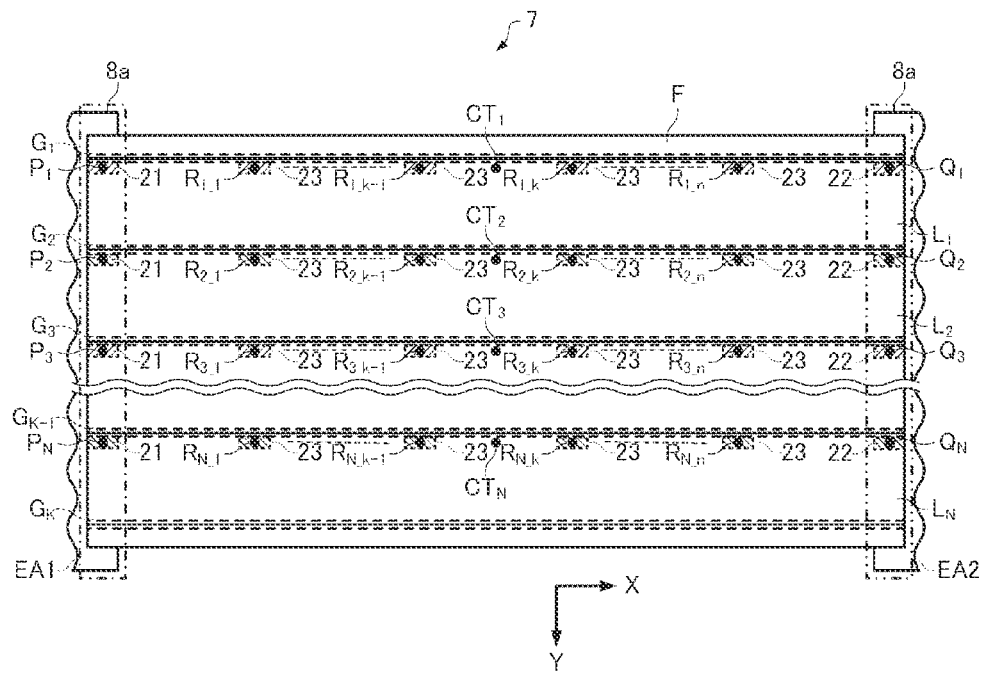
FIG. 37 is a diagram showing an arrangement example of sensors and observation points according to a third embodiment.

FIG. 37 is a diagram showing an installation example of each of the sensors 21, 22, and 23 on the superstructure 7. FIG. 37 is a diagram of the superstructure 7 as viewed from above. In FIG. 37, the arrangement of the sensors 21 and 22 is the same as that in FIG. 2, and thus the description thereof will be omitted.

In the example in FIG. 37, n sensors 23 are provided on each of the main girders $G_1$ to $G_{K-1}$ at predetermined positions between the first end portion EA1 and the second end portion EA2 of the superstructure 7 in the longitudinal direction. n is an integer of 2 or more. In the example shown in FIG. 37, each position of the main girders $G_1$ to $G_K$ coincides with a position of each boundary between the lanes $L_1$ to $L_N$, and N=K−1. The superstructure 7 is provided with N×n sensors 23. Each position of the main girders $G_1$ to $G_K$ does not have to coincide with the position of each boundary between the lanes $L_1$ to $L_N$, and N≠K−1.

In the example shown in FIG. 37, n observation points $R_{j\_1}$ to $R_{j\_n}$ are set in association with the n sensors 23 provided on the main girder $G_j$. The n observation points $R_{j\_1}$ to $R_{j\_n}$ are set at positions on the surface of the floor plate F in a vertically upward direction of the n sensors 23 provided on the main girder $G_j$ at positions other than the central position $CT_j$ between the observation point $P_j$ and the observation point $Q_j$. That is, the n sensors 23 provided on the main girder $G_j$ are observation devices that observe the n observation points $R_{j\_1}$ to $R_{j\_n}$. The n sensors 23 that observe the observation points $R_{j\_1}$ to $R_{j\_n}$ may be at positions which are positions other than the central position $CT_j$ between the observation point $P_j$ and the observation point $Q_j$ and where the acceleration generated at the observation points $R_{j\_1}$ to $R_{j\_n}$ due to the traveling of the vehicle 6 can be detected, and it is desirable that the n sensors 23 are provided at positions close to the observation points $R_{j\_1}$ to $R_{j\_n}$. In this way, the observation points $R_{j\_1}$ to $R_{j\_n}$ have a one-to-one relationship with the n sensors 23.

For each integer i of 1 or more and n or less, the observation points $R_{j\_1}$ to $R_{j\_n}$ may be arranged along a fourth direction intersecting the first direction in which the vehicle 6 travels along any one of the lanes $L_1$ to $L_N$, that is, the width direction of the superstructure 7.

In the present embodiment, for each integer j of 1 or more and N or less, the n observation points $R_{j\_1}$ to $R_{j\_n}$ are associated with the lane $L_j$. The observation point $P_j$, the observation point $Q_j$, and the n observation points $R_{j\_1}$ to $R_{j\_n}$ between the observation point $P_j$ and the observation point $Q_j$, which are set in association with the lane $L_j$, are arranged along the first direction in which the vehicle 6 moves along the lane L of the superstructure 7, that is, the X direction which is the longitudinal direction of the superstructure 7.

For each integer j of 1 or more and N or less, the n observation points $R_{j\_1}$ to $R_{j\_n}$ are examples of "third to (n+2)th observation points".

The number and installation positions of N sensors 21, 22 and the number and installation positions of N×n sensors 23 are not limited to the example shown in FIG. 37, and various modifications can be made.

Figure 38:
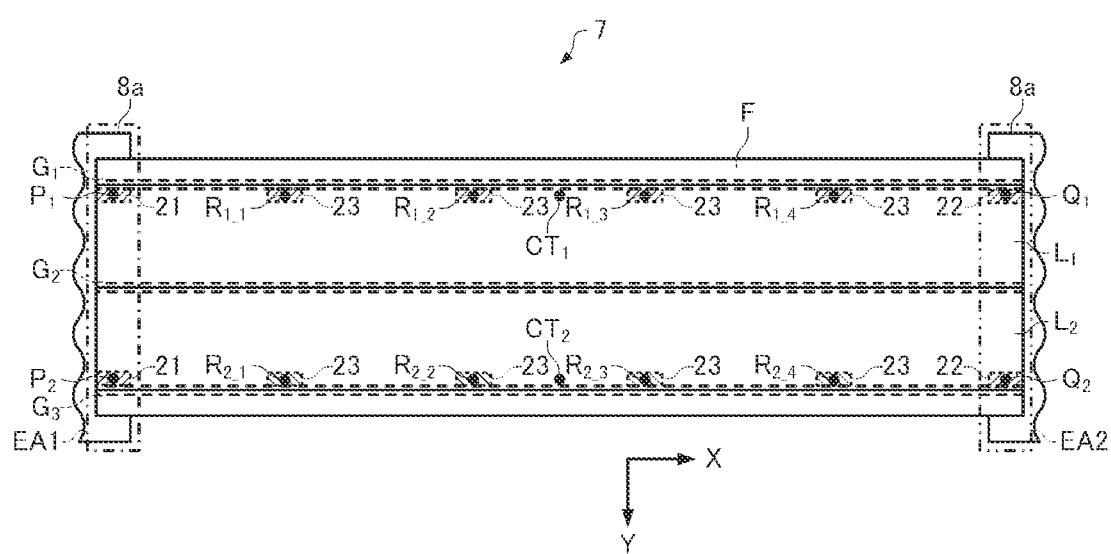
FIG. 38 is a diagram showing an arrangement example of the sensors and the observation points according to the third embodiment.

As an example, FIG. 38 shows an arrangement example of each of the sensors 21, 22, 23 and observation points $P_1$, $P_2$, $Q_1$, $Q_2$, $R_{1\_1}$ to $R_{1\_4}$, and $R_{2\_1}$ to $R_{2\_4}$ when N=2, and n=4. FIG. 38 is a diagram of the superstructure 7 as viewed from above. In FIG. 38, the arrangement of the sensors 21 and 22 is the same as that in FIG. 5, and thus the description thereof will be omitted.

In the example in FIG. 38, four sensors 23 are provided on the main girder $G_1$ at positions other than the central position $CT_1$. Further, four sensors 23 are provided on the main girder $G_3$ at positions other than the central position $CT_2$.

The observation points $R_{2\_1}$ i to $R_{1\_4}$ corresponding to the lane $L_1$ are set at the positions on the surface of the floor plate F in the vertically upward direction of the four sensors 23 provided on the main girder $G_1$. The observation points $R_{2\_1}$ to $R_{2\_4}$ corresponding to the lane $L_2$ are set at the positions on the surface of the floor plate F in the vertically upward direction of the four sensors 23 provided on the main girder $G_3$.

The four sensors 23 provided on the main girder $G_1$ observe the observation points $R_{1\_1}$ to $R_{1\_4}$. The four sensors 23 provided on the main girder $G_3$ observe the observation point $R_{2\_1}$ to $R_{2\_4}$.

For each integer j of 1 or more and N or less, since n observation points $R_{j\_1}$ to $R_{j\_n}$ bend in the direction orthogonal to the X and Y directions, in order to accurately calculate a magnitude of the acceleration of the bending, it is desirable for the measurement device 1 to acquire the acceleration in the fifth direction orthogonal to the X direction and the Y direction, that is, in the normal direction of the floor plate F.

In the present embodiment, for the above Equations (50) to (56), the observation position x other than the central position is made to correspond to each of n observation positions x(1) to x(n). For each integer j of 1 or more and n or less, a normalized deflection amount $w_{stdA}$ observed at the observation position x(i) other than the central position when the load P moves on the simple beam is expressed by Equation (79) by replacing x in Equation (57) with x(i).

$$w_{stdA(i)} = \frac{8}{l}\left\{x(i)r^3 + \left(\frac{x(i)^3}{l^2} + 2x(i)\right)r - R(r)\right\} \quad (79)$$

In Equation (79), a variable R(r) is defined by Equation (80) according to the above Equation (58).

$$R(r) = \begin{cases} lr^3 + \dfrac{3x(i)^2}{l}r & (\text{if } x(i) > lr) \\ 3x(i)r^2 + \dfrac{x(i)^3}{l^2} & (\text{if } x(i) \le lr) \end{cases} \quad (80)$$

Assuming that the speed of the vehicle 6 is constant and the position and time point are proportional to each other, the observation position x(i) is replaced by a time $t_{xx(i)}$ from the entry time point $t_i$ to a time point $t_{x(i)}$ when the vehicle 6 passes the observation position x(i). The time $t_{xx(i)}$ is expressed by Equation (81).

$$t_{xx(i)} = t_{x(i)} - t_i \quad (81)$$

Therefore, the normalized deflection amount model $w_{stdA(i)}(t)$ at the observation position x(i) is as shown in Equation (82) by replacing $t_{xx}$ in the above Equation (63) with $t_{xx(i)}$. Equation (82) is an equation normalized by a maximum amplitude of deflection at the central position based on the structural model of superstructure 7, and the maximum value is smaller than 1.

$$w_{stdA(i)}(t) = \frac{8t_{xx(i)}(t - t_i)}{t_s^3}\left\{\frac{(t - t_i)^2 + t_{xx(i)}^2 + 2t_s^2}{t_s} - R(t)\right\} \quad (82)$$

In Equation (82), a variable R(t) is defined by Equation (83) according to the above Equation (62).

$$R(t) = \begin{cases} \dfrac{(t - t_i)^2 + 3t_{xx(i)}^2}{t_{xx(i)}} & (\text{if } t_{x(i)} > t) \\ \dfrac{3(t - t_i)^2 + t_{xx(i)}^2}{(t - t_i)} & (\text{if } t_{x(i)} \le t) \end{cases} \quad (83)$$

By replacing $t_{xx}$ with $t_{xx(i)}$ and $t_x$ with $t_{x(i)}$ in the above Equation (66), for each lane $L_j$, a deflection waveform $H_{A(i)jk}(t)$ at the observation position x(i) generated by each axle of the vehicle 6 is as shown in Equation (84).

$$H_{A(i)jk}(t) = pa_{p_{jk}}\frac{8t_{xx(i)}(t - t_i)}{t_s^3}\left\{\frac{(t - t_i)^2 + t_{xx(i)}^2 + 2t_s^2}{t_s} - R(t)\right\}, \quad (84)$$

$$R(t) = \begin{cases} \dfrac{(t - t_i)^2 + 3t_{xx(i)}^2}{t_{xx(i)}} & (\text{if } t_{x(i)} > t) \\ \dfrac{3(t - t_i)^2 + t_{xx(i)}^2}{(t - t_i)} & (\text{if } t_{x(i)} \le t) \end{cases}$$

The deflection waveform $H_{A(i)jk}(t)$ has a steep slope at both ends at which the deflection waveform $H_{A(i)jk}(t)$ is zero. However, when a displacement meter is actually installed at the observation position and the displacement is measured during a vehicle load test, a base of the displacement waveform changes gently. Therefore, in order to make the deflection waveform $H_{A(i)jk}(t)$ closer to the actual displacement waveform, the normalized deflection amount model $w_{stdA}(t)$ part is squared to improve the normalized deflection amount $w_{std}$. That is, the improved deflection waveform $H_{A(i)jk}(t)$ is obtained by Equation (85).

$$H_{A(i)jk}(t) = pa_{p_{jk}}\left[\frac{8t_{xx(i)}(t - t_i)}{t_s^3}\left\{\frac{(t - t_i)^2 + t_{xx(i)}^2 + 2t_s^2}{t_s} - R(t)\right\}\right]^2, \quad (85)$$

$$R(t) = \begin{cases} \dfrac{(t - t_i)^2 + 3t_{xx(i)}^2}{t_{xx(i)}} & (\text{if } t_{x(i)} > t) \\ \dfrac{3(t - t_i)^2 + t_{xx(i)}^2}{(t - t_i)} & (\text{if } t_{x(i)} \le t) \end{cases}$$

The deflection waveform $H_{A(i)jk}(t)$ obtained by the squared Equation (85) has an increased kurtosis. Therefore, by improving this, the entry time point $t_i$ and the exit time point $t_o$ are adjusted by Equation (86) such that the deflection waveform $H_{A(i)jk}(t)$ is closer to the displacement waveform. In Equation (86), $t_{is}$ is the adjusted entry time point and $t_{os}$ is the adjusted exit time point. In addition, $t_{i\_offset}$ is an adjustment amount of the entry time point, and $t_{o\_offset}$ is an adjustment amount of the exit time point.

$$t_{is} = t_i + t_{i\_offset}$$

$$t_{os} = t_o + t_{o\_offset}$$

$$t_{ss} = t_{os} - t_{is} \quad (86)$$

The deflection waveform $H_{A(i)jk}(t)$ is expressed by Equation (87) by respectively replacing $t_i$, $t_o$, and $t_s$ with $t_{is}$, $t_{os}$, and $t_{ss}$ in Equation (85).

$$H_{A(i)jk}(t) = pa_{p_{jk}} \left[ \frac{8t_{xx(i)}(t-t_{is})}{t_{ss}^3} \left\{ \frac{(t-t_{is})^2 + t_{xx(i)}^2 + 2t_{ss}^2}{t_{ss}} - R(t) \right\} \right]^2, \quad (87)$$

$$R(t) = \begin{cases} \dfrac{(t-t_{is})^2 + 3t_{xx(i)}^2}{t_{xx}(i)} & \text{(if } t_{x(i)} > t) \\ \dfrac{3(t-t_{is})^2 + t_{xx(i)}^2}{(t-t_{is})} & \text{(if } t_{x(i)} \le t) \end{cases}$$

As shown in Equation (88), a vehicle deflection waveform $CP_{A(i)jm}(t)$, which is a deflection waveform at the observation position x(i) generated by the vehicle 6 traveling on the lane $L_j$, is obtained by adding the deflection waveform $H_{A(i)jk}(t)$ at the observation position x(i) generated by each axle. In Equation (88), m is an integer indicating the vehicle number, k is an integer indicating the axle number, and j is an integer indicating the lane number.

$$CP_{A(i)jm}(t) = \sum_k H_{A(i)jk}(t) \quad (88)$$

It is assumed that M vehicles 6 travel on the lane $L_j$ in an integral interval, as shown in Equation (89), a sum of the vehicle deflection waveforms $CP_{A(i)j1}(t)$ to $CPD_{A(i)jM}(t)$ is defined as a path deflection waveform $CP_{A(i)j}(t)$, which is a deflection waveform at the observation position x(i) of the lane $L_j$. M is an integer of 1 or more.

$$CP_{A(i)j}(t) = \sum_{m=1}^{M} CP_{A(i)jm}(t) \quad (89)$$

A displacement waveform $U_{A(i)j}(t)$, which is a measurement waveform of the displacement at the observation point $R_{j\_i}$ is obtained by double-integrating the acceleration detected by the sensor 23 observing the observation point $R_{j\_i}$ after low-pass filtering processing. The observation point $R_{j\_i}$ is located at a position other than the central position $CT_j$ between the observation points $P_j$ and the observation point $Q_j$ set at both ends of the lane $L_j$. Therefore, when the observation point $P_j$ and the observation point $Q_j$ correspond to both ends of the simple beam and the observation point $R_{j\_1}$ corresponds to the observation position x(i), Equation (82) is an approximate expression of deflection at the observation point $R_{j\_i}$ based on the structural model of the superstructure 7 which is a structure. The deflection waveform at the observation point $R_{j\_i}$ of the lane $L_j$ is calculated as the path deflection waveform $CP_{A(i)j}(t)$ expressed by the above Equation (89). The observation point $R_{j\_1}$ is an example of an "(i+2)th observation point".

A relationship between the displacement waveform $U_{A(1)j}(t)$ and the path deflection waveform $CP_{A(i)j}(t)$ is expressed as in Equation (90) using an amplitude coefficient $D_{A(i)j}$, which corresponds to a ratio of the maximum amplitudes of the displacement waveform $U_{A(i)j}(t)$ and the path deflection waveform $CP_{A(i)j}(t)$.

$$U_{A(i)j}(t) = D_{A(i)j} CP_{A(i)j}(t) + e_{ij}(t) \quad (90)$$

In Equation (90), the amplitude coefficient $D_{A(i)j}$ at which a difference $e_{ij}(t)$ is minimized between the displacement waveform $U_{A(i)j}(t)$ and a waveform $D_{A(i)j} CP_{A(i)j}(t)$ obtained by multiplying the path deflection waveform $CP_{A(i)j}(t)$ by the amplitude coefficient $D_{A(i)j}$ can be obtained by using, for example, a least square method as in Equation (91). The amplitude coefficient $D_{A(1)j}$ is an example of the "i-th amplitude coefficient", and the difference $e_{ij}(t)$ is an example of the "i-th difference".

$$D_{A(i)j} = \frac{U_{A(i)j}(t) CP_{A(i)j}(t)}{CP_{A(i)j}(t)^2} \quad (91)$$

An average value $D_{Aj\_avg}$ of the amplitude coefficients $D_{A(1)j}$ to $D_{A(n)j}$ obtained according to Equation (91) is obtained according to Equation (92).

$$D_{Aj\_avg} = \frac{1}{n} \sum_{i=1}^{n} D_{A(i)j} \quad (92)$$

Then, as in Equation (93), by multiplying the path deflection waveform $CP_{Bj}(t)$ at the central position $CT_j$ of the lane $L_j$ obtained according to the above Equation (49) by the average value $D_{Aj\_avg}$ obtained according to Equation (92), the estimation waveform $U_{estBj}(t)$ of displacement at the central position $CT_j$ is obtained.

$$U_{estBj}(t) = D_{Aj\_avg} CP_{Bj}(t) \quad (93)$$

Figure 39:
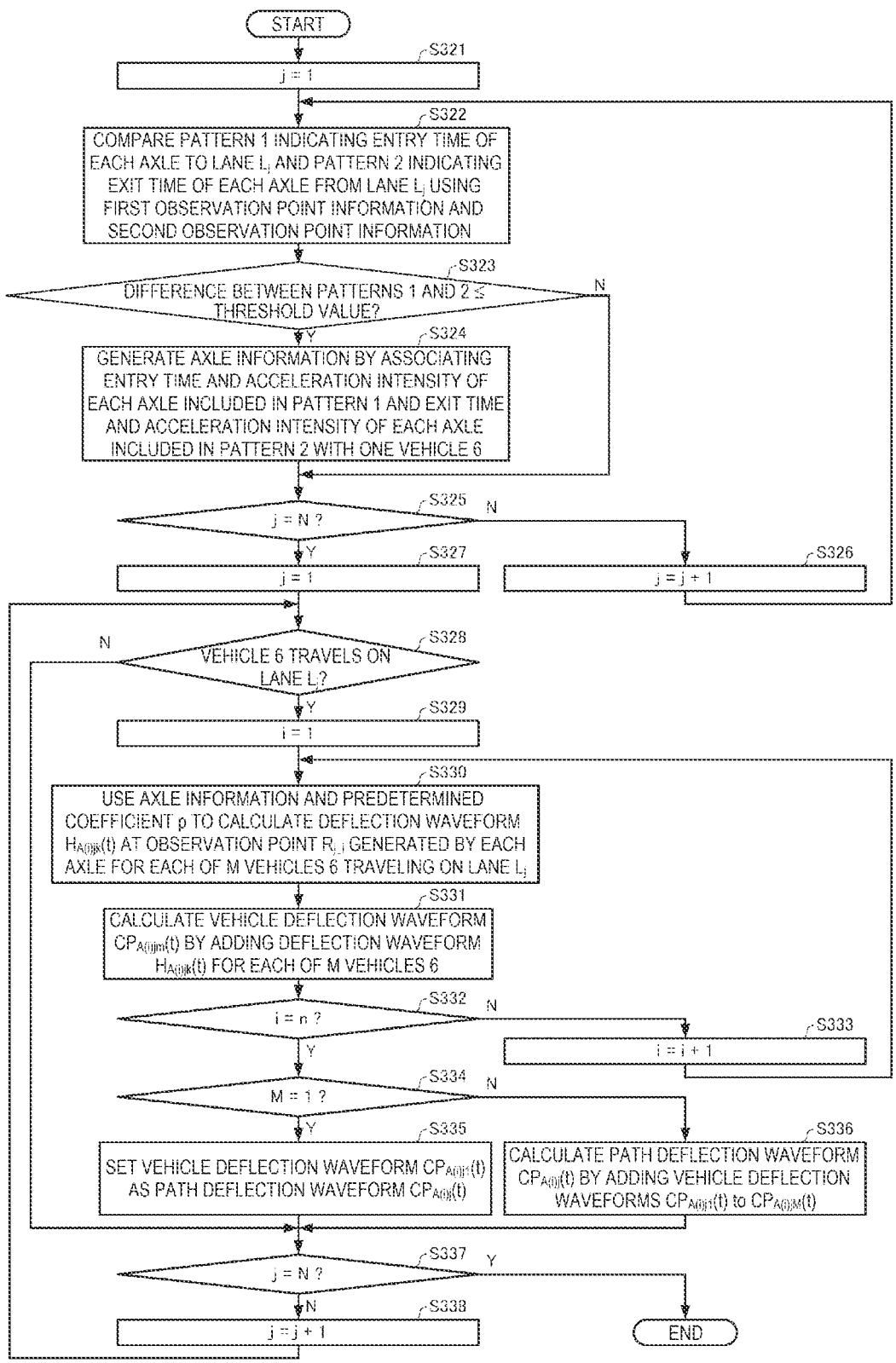
FIG. 39 is a flowchart showing an example of a procedure of a first path deflection waveform calculation step according to the third embodiment.

FIG. 39 is a flowchart showing an example of a procedure of a first path deflection waveform calculation step in the third embodiment, which is step S3 in FIG. 27.

As shown in FIG. 39, first, the measurement device 1 performs processing in steps S321 to S326, which are the same processing as steps S301 to S306 in FIG. 28.

Then, when the integer j is N (Y in step S325), the measurement device 1 set the integer j to 1 (step S327). When there is a vehicle 6 traveling on the lane $L_j$ (Y in step S328), the measurement device 1 sets the integer i to 1 (step S329), and calculates, using the axle information generated in step S324 and the predetermined coefficient p, the deflection waveform $H_{A(i)jk}(t)$ at the observation point $R_{j\_1}$ generated by each axle for each of the M vehicles 6 traveling on the lane $L_j$ (step S330).

Next, the measurement device 1 calculates a vehicle deflection waveform $CP_{A(i)jm}(t)$ by adding the deflection waveform $H_{A(i)jk}(t)$ for each of the M vehicles 6 (step S331).

When the integer i is not N (N in step S332), the measurement device 1 adds 1 to the integer i (step S333), and repeats the processing in steps S330 and S331.

Then, when the integer i is n (Y in step S332), when M is 1 (Y in step S334), the measurement device 1 sets the vehicle deflection waveform $CP_{A(i)j1}(t)$ as the path deflection waveform $CP_{A(i)j}(t)$ (step S335).

Next, when M is not 1 (N in step S334), the measurement device 1 calculates the path deflection waveform $CP_{A(i)j}(t)$ by adding vehicle deflection waveforms $CP_{A(i)j1}(t)$ to $CP_{A(i)jM}(t)$ (step S336).

When there is no vehicle 6 traveling on the lane $L_j$ (N in step S328), the measurement device 1 does not perform the processing in steps S330 to S336.

When the integer j is not N (N in step S337), the measurement device 1 adds 1 to the integer j (step S338), and repeats the processing in steps S328 and S336.

Then, when the integer j is N (Y in step S337), the measurement device 1 ends the processing in the first path deflection waveform calculation step.

Figure 40:
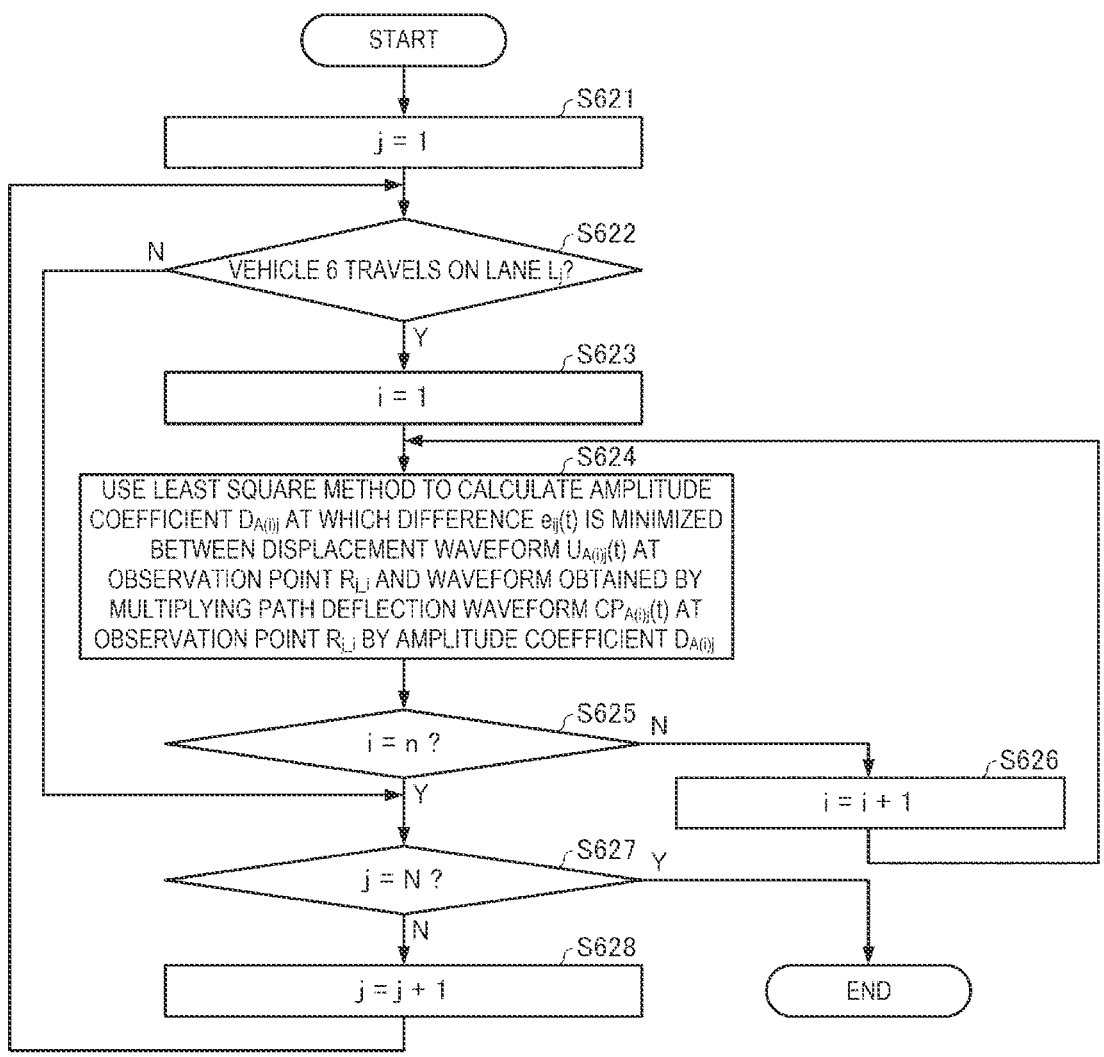
FIG. 40 is a flowchart showing an example of a procedure of an amplitude coefficient calculation step according to the third embodiment.

FIG. 40 is a flowchart showing an example of a procedure of an amplitude coefficient calculation step in the third embodiment, which is step S6 in FIG. 27.

As shown in FIG. 40, first, the measurement device 1 sets the integer j to 1 (step S621). When there is a vehicle 6 traveling on the lane $L_j$ (Y in step S622), the measurement device 1 sets the integer i to 1 (step S623), and calculates, using a least square method, the amplitude coefficient $D_{A(i)j}$ at which a difference $e_{ij}(t)$ is minimized between the displacement waveform $U_{A(i)j}(t)$ at the observation point $R_{j\_1}$ and the waveform obtained by multiplying the path deflection waveform $CP_{A(i)j}(t)$ at the observation point $R_{j\_i}$ by the amplitude coefficient $D_{A(i)j}$ (step S624).

When the integer i is not n (N in step S625), the measurement device 1 adds 1 to the integer i (step S626), and repeats the processing in step S624.

When there is no vehicle 6 traveling on the lane $L_j$ (N in step S622), the measurement device 1 does not perform the processing in steps S623 to S626.

When the integer i is n (Y in step S625), when the integer j is not N (N in step S627), the measurement device adds 1 to the integer j (step S628), and repeats the processing in steps S622 to S626.

Then, when the integer j is N (Y in step S627), the measurement device 1 ends the processing in the amplitude coefficient calculation step.

Figure 41:
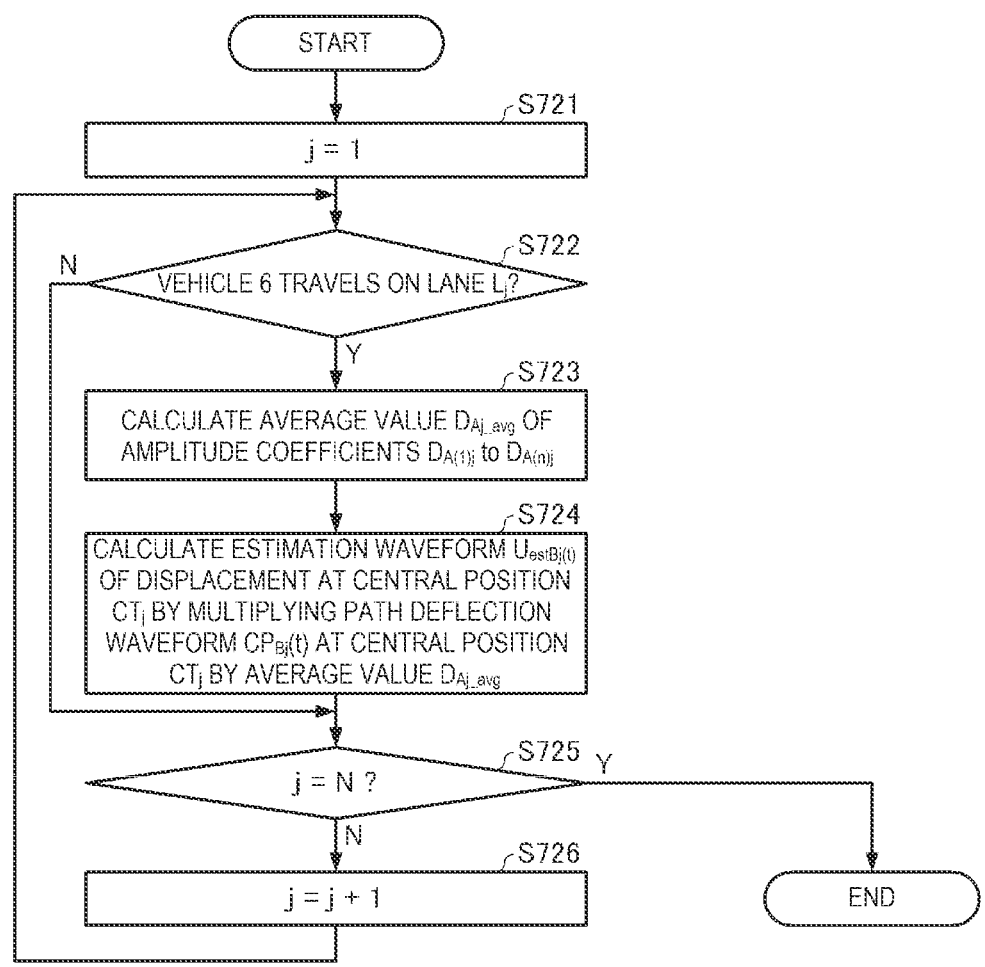
FIG. 41 is a flowchart showing an example of a procedure of an estimation waveform calculation step according to the third embodiment.

FIG. 41 is a flowchart showing an example of a procedure of an estimation waveform calculation step in the third embodiment, which is step S7 in FIG. 27.

As shown in FIG. 41, first, the measurement device 1 sets the integer j to 1 (step S721). When there is a vehicle 6 traveling on the lane $L_j$ (Y in step S722), the measurement device 1 calculates the average value $D_{Aj\_avg}$ of the amplitude coefficients $D_{A(1)j}$ to $D_{A(n)j}$ (step S723).

Next, the measurement device 1 calculates the estimation waveform $U_{estBj}(t)$ of displacement at the central position $CT_j$ by multiplying the path deflection waveform $CP_{Bj}(t)$ at the central position $CT_j$ by the average value $D_{Aj\_avg}$ calculated in step S723 (step S724).

When there is no vehicle 6 traveling on the lane $L_j$ (N in step S722), the measurement device 1 does not perform the processing in steps S723 and S724.

When the integer j is not N (N in step S725), the measurement device 1 adds 1 to the integer j (step S726), and repeats the processing in steps S722 to S724.

Then, when the integer j is N (Y in step S725), the measurement device 1 ends the processing in the estimation waveform calculation step.

In the present embodiment, for each integer j of 1 or more and N or less and each integer i of 1 or more and n or less, the first path deflection waveform calculation unit 113 performs processing of calculating the deflection waveform $H_{A(i)jk}(t)$ at the observation point $R_{j\_1}$, generated by each of the plurality of axles of the vehicle 6, based on the first observation point information acquired by the first observation point information acquisition unit 111, the second observation point information acquired by the second observation point information acquisition unit 112, the predetermined coefficient p, and the approximate expression of deflection at the observation point $R_{j\_1}$ based on the structural model of the superstructure 7, calculating the vehicle deflection waveform $CP_{A(i)jm}(t)$ by adding the deflection waveform $H_{A(i)jk}(t)$, and calculating the path deflection waveform $CP_{A(i)j}(t)$ at the observation point R of the lane $L_j$ based on the vehicle deflection waveform $CP_{A(i)jm}(t)$. The path deflection waveforms $CP_{A(1)1}(t)$ to $CP_{A(n)N}(t)$ calculated by the first path deflection waveform calculation unit 113 are stored in the storage unit 130.

For each integer j of 1 or more and N or less and each integer i of 1 or more and n or less, and based on the observation information obtained by the sensor 23 that observes the observation point $R_{j\_i}$, the measurement waveform calculation unit 115 performs processing of calculating the displacement waveform $U_{A(i)j}(t)$ which is the measurement waveform of the displacement as the physical quantity at the observation point $R_{j\_i}$. The displacement waveforms $U_{A(1)1}(t)$ to $U_{A(n)N}(t)$ calculated by the measurement waveform calculation unit 115 are stored in the storage unit 130.

For each integer j of 1 or more and N or less and each integer i of 1 or more and n or less, the amplitude coefficient calculation unit 116 calculates the difference $e_{ij}(t)$ and the amplitude coefficient $D_{A(i)j}$ at which the difference $e_{ij}(t)$ is minimized between the displacement waveform $U_{A(i)j}(t)$ at the observation point $R_{j\_i}$ calculated by the measurement waveform calculation unit 115 and the waveform $D_{A(i)j}$ $CP_{A(i)j}(t)$ obtained by multiplying the path deflection waveform $CP_{A(i)j}(t)$ at the observation point $R_{j\_i}$ calculated by the first path deflection waveform calculation unit 113 by the amplitude coefficient $D_{A(i)j}$. The amplitude coefficients $D_{A(1)1}$ to $D_{A(1)N}$ and the difference $e_{11}(t)$ to $e_{Nn}(t)$ calculated by the amplitude coefficient calculation unit 116 are stored in the storage unit 130.

For each integer j of 1 or more and N or less, and based on the path deflection waveform $CP_{Bj}(t)$ at the central position $CT_j$ calculated by the second path deflection waveform calculation unit 114 and the average value $D_{Aj\_avg}$ of the amplitude coefficients $D_{A(1)j}$ to $D_{A(n)j}$ calculated by the amplitude coefficient calculation unit 116, the estimation waveform calculation unit 117 performs processing of calculating the estimation waveform $U_{estBj}(t)$ of displacement as the physical quantity at the central position $CT_j$. Specifically, for each integer j of 1 or more and N or less, the estimation waveform calculation unit 117 calculates the estimation waveform $U_{estBj}(t)$ by multiplying the path deflection waveform $CP_{Bj}(t)$ by the average value $D_{Aj\_avg}$ of the amplitude coefficients $D_{A(1)j}$ to $D_{A(n)j}$. The estimation waveforms $U_{estB1}(t)$ to $U_{estBN}(t)$ calculated by the estimation waveform calculation unit 117 are stored in the storage unit 130.

Other configurations of the measurement device 1 are the same as those of the first embodiment, and description thereof will be omitted.

In the measurement method according to the third embodiment as described above, the measurement device 1 calculates the deflection waveform $H_{A(i)jk}(t)$ at the observation point $R_{j\_i}$, generated by each axle, according to Equation (87) and based on the first observation point information, the second observation point information, the predetermined coefficient p, and the approximate expression (82) of deflection at the observation point $R_{j\_i}$ based on the structural model of the superstructure 7 of the bridge 5, calculates the vehicle deflection waveform $CP_{A(i)jm}(t)$ by adding the deflection waveform $H_{A(i)jk}(t)$ at the observation point $R_{j\_i}$ according to Equation (88), and calculates the path deflection waveform $CP_{A(i)j}(t)$ at the observation point $R_{j\_i}$ of the lane $L_j$ based on the vehicle deflection waveform $CP_{A(i)jm}(t)$ and according to Equation (89). Further, the measurement device 1 calculates the displacement waveform $U_{A(i)j}(t)$ at the observation point $R_{j\_i}$ based on the observation information obtained by the sensor 23 that observes the observation point $R_{j\_i}$, and calculates, according to Equation (91), the amplitude coefficient $D_{A(i)j}$ at which the difference $e_{ij}(t)$ is minimized between the displacement waveform $U_{A(i)j}(t)$ and the waveform obtained by multiplying the path deflection waveform $CP_{A(i)j}(t)$ at the observation point $R_{j\_i}$ by the amplitude coefficient $D_{A(1)j}$. Then, based on the path deflection waveform $CP_{Bj}(t)$ at the central position $CT_j$ and the average value $D_{Aj\_avg}$ of the amplitude coefficients $D_{A(1)j}$ to $D_{A(n)j}$ obtained according to Equation (92), the measurement device 1 calculates the estimation waveform $U_{estBj}(t)$ of displacement at the central position $CT_j$. Specifically, the measurement device 1 calculates, according to Equation (93), the estimation waveform $U_{estBj}(t)$ by multiplying the path deflection waveform $CP_{Bj}(t)$ by the average value $D_{Aj\_avg}$. Therefore, according to the measurement method in the third embodiment, for example, even when it is difficult to provide a sensor at the central position $CT_j$, the measurement device 1 can estimate the displacement at the central position $CT_j$ without observing the central position $CT_j$. Further, according to the measurement method in the third embodiment, since the noise component included in the average value $D_{Aj\_avg}$ is reduced by averaging random noises included in the amplitude coefficients $D_{A(1)j}$ to $D_{A(n)j}$, the measurement device 1 can accurately estimate the displacement at the central position $CT_j$.

In addition, according to the measurement method in the third embodiment, the same effects as those of the first embodiment can be obtained.

4. Fourth Embodiment

In a measurement method according to a fourth embodiment, calculation accuracy for the estimation waveform $U_{estBj}(t)$ of displacement at the central position $CT_j$ is improved with respect to the third embodiment by further using a difference $e_{ij}(t)$ between the displacement waveform $U_{A(i)j}(t)$ at the observation point $R_{j\_i}$ and the path deflection waveform $CP_{A(i)j}(t)$ at the observation point $R_{j\_i}$ of the lane $L_j$. Hereinafter, the same components as those of the third embodiment will be denoted by the same reference numerals for the measurement method according to the fourth embodiment, and the description repeated with the third embodiment will be omitted or simplified, and different contents from the third embodiment will be mainly described.

In the present embodiment, for each integer i of 1 or more and n or less, the measurement device 1 substitutes the amplitude coefficient $D_{A(i)j}$ into Equation (94) which is transformed from the above Equation (90), and calculates the difference $e_{ij}(t)$ between the displacement waveform $U_{A(i)j}(t)$ at the observation point $R_{j\_i}$ and the path deflection waveform $CP_{A(i)j}(t)$ at the observation point $R_{j\_i}$ of the lane $L_j$.

$$e_{ij}(t) = U_{A(i)j}(t) - D_{A(i)j} CP_{A(i)j}(t) \tag{94}$$

For each integer i of 1 or more and n or less, the measurement device 1 calculates the estimation waveform $U_{estB(i)j}(t)$ of displacement at the central position $CT_j$ by adding the difference $e_{ij}(t)$ to a waveform obtained by multiplying the path deflection waveform $CP_{Bj}(t)$ at the central position $CT_j$ of the lane $L_j$ by the amplitude coefficient $D_{A(i)j}$ as in Equation (95). The estimation waveform $U_{estB(i)j}(t)$ is a displacement waveform at the central position $CT_j$ estimated based on the position of the observation point $R_{j\_1}$ and the displacement of the observation point $R_{j\_i}$ due to the traveling of the vehicle 6 on the lane $L_j$. The estimation waveform $U_{estB(i)j}(t)$ is an example of an "i-th estimation waveform".

$$U_{estB(i)j}(t) = D_{A(i)j} CP_{Bj}(t) + e_{ij}(t) \tag{95}$$

Then, the measurement device 1 calculates the estimation waveform $U_{estBj}(t)$ of displacement at the central position $CT_j$ of the lane $L_j$ by averaging n estimation waveforms $U_{estB(1)j}(t)$ to $U_{estB(n)j}(t)$ obtained according to Equation (95), as in Equation (96).

$$U_{estBj}(t) = \frac{1}{n} \sum_{i=1}^{n} U_{estB(i)j}(t) \tag{96}$$

Figure 42:
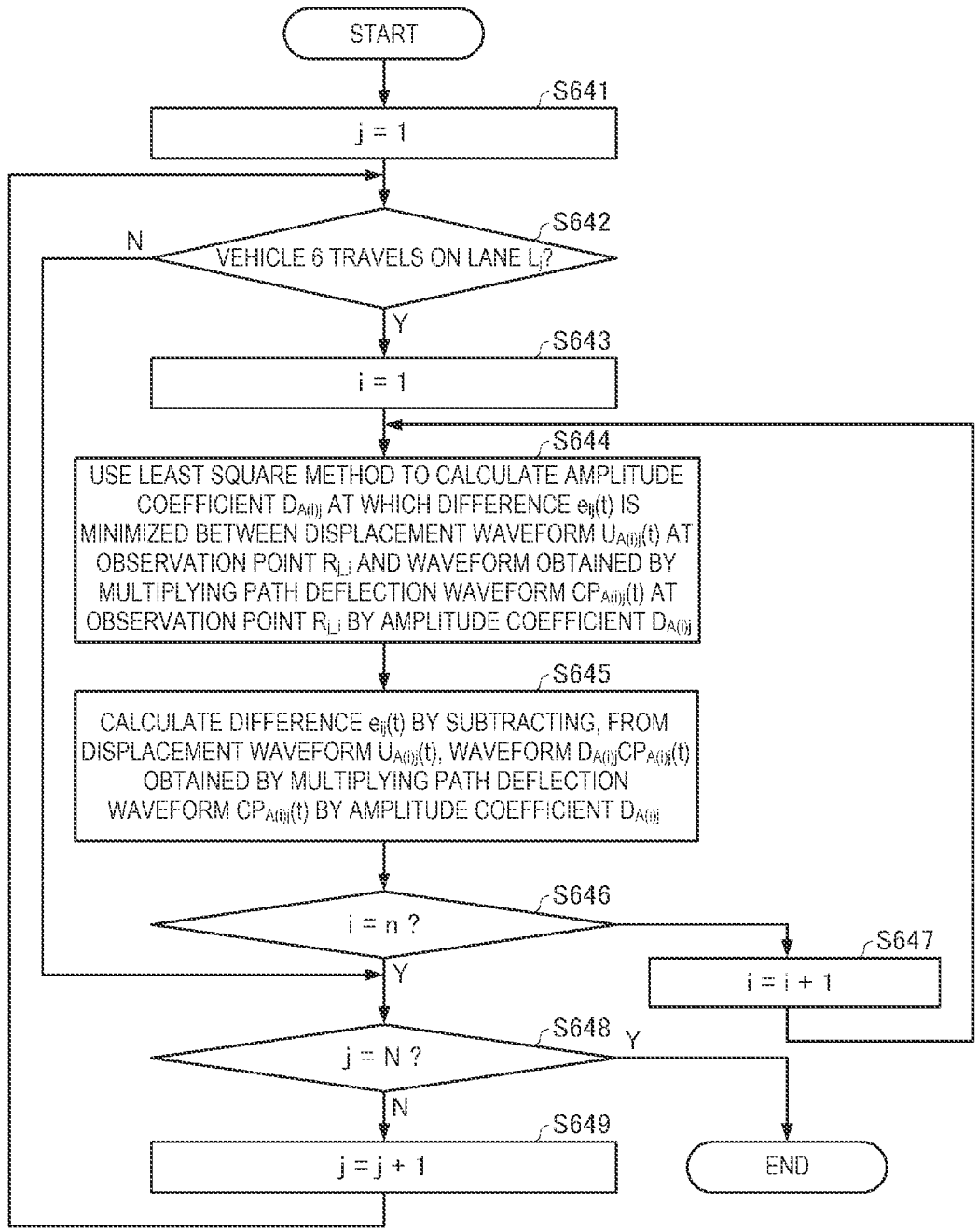
FIG. 42 is a flowchart showing an example of a procedure of an amplitude coefficient calculation step according to a fourth embodiment.

FIG. 42 is a flowchart showing an example of a procedure of an amplitude coefficient calculation step in the fourth embodiment, which is step S6 in FIG. 27.

As shown in FIG. 42, first, the measurement device 1 sets the integer j to 1 (step S641). When there is a vehicle 6 traveling on the lane $L_j$ (Y in step S642), the measurement device 1 sets the integer i to 1 (step S643), and calculates, using a least square method, the amplitude coefficient $D_{A(i)j}$ at which the difference $e_{ij}(t)$ is minimized between the displacement waveform $U_{A(i)j}(t)$ at the observation point $R_{j\_i}$ and the waveform obtained by multiplying the path deflection waveform $CP_{A(i)j}(t)$ at the observation point $R_{j\_i}$ by the amplitude coefficient $D_{A(i)j}$ (step S644).

The measurement device 1 calculates the difference $e_{ij}(t)$ by subtracting, from the displacement waveform $U_{A(i)j}(t)$, the waveform $D_{A(i)j} CP_{A(i)j}(t)$ obtained by multiplying the path deflection waveform $CP_{A(i)j}(t)$ by the amplitude coefficient $D_{A(i)j}$ (step S645).

When the integer i is not n (N in step S646), the measurement device 1 adds 1 to the integer i (step S647), and repeats the processing in steps S644 and S645.

When there is no vehicle 6 traveling on the lane $L_j$ (N in step S642), the measurement device 1 does not perform the processing in steps S643 to S647.

When the integer i is n (Y in step S646), when the integer j is not N (N in step S648), the measurement device adds 1 to the integer j (step S649), and repeats the processing in steps S642 to S647.

Then, when the integer j is N (Y in step S648), the measurement device 1 ends the processing in the amplitude coefficient calculation step.

Figure 43:
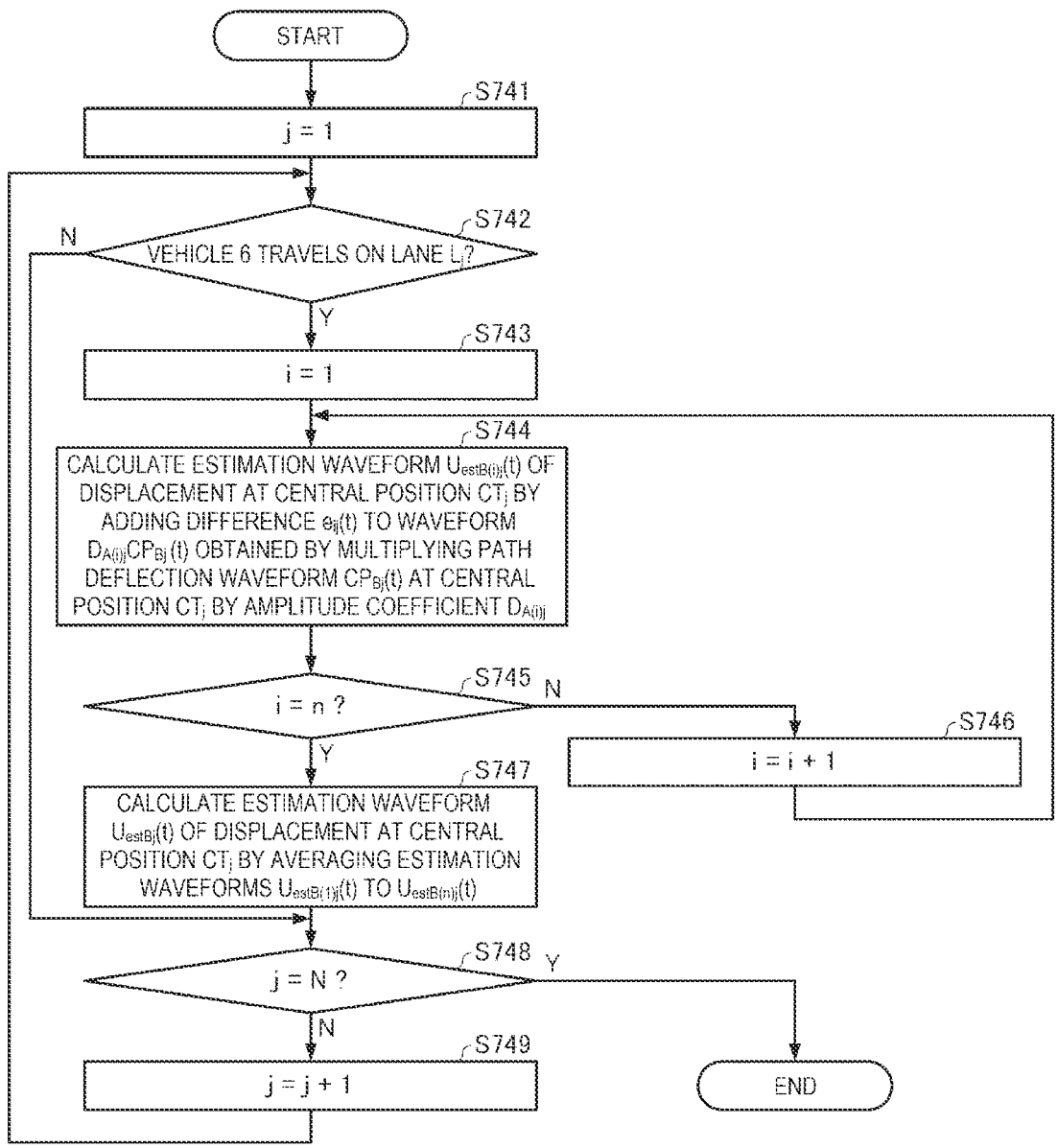
FIG. 43 is a flowchart showing an example of a procedure of an estimation waveform calculation step according to the fourth embodiment.

FIG. 43 is a flowchart showing an example of a procedure of an estimation waveform calculation step in the fourth embodiment, which is step S7 in FIG. 27.

As shown in FIG. 43, first, the measurement device 1 sets the integer j to 1 (step S741). When there is a vehicle 6 traveling on the lane $L_j$ (Y in step S742), the measurement device 1 sets the integer i to 1 (step S743), and calculates the estimation waveform $U_{estB(i)j}(t)$ of displacement at the central position $CT_j$ by adding the difference $e_{ij}(t)$ calculated in step S645 in FIG. 42 to the waveform $D_{A(i)j} CP_{Bj}(t)$ obtained by multiplying the path deflection waveform $CP_{Bj}(t)$ at the central position $CT_j$ by the amplitude coefficient $D_{A(i)j}$ (step S744).

When the integer i is not n (N in step S745), the measurement device 1 adds 1 to the integer i (step S746), and repeats the processing in step S744.

When the integer i is n (Y in step S745), the measurement device 1 calculates the estimation waveform $U_{estBj}(t)$ of displacement at the central position $CT_j$ by averaging the estimation waveforms $U_{estB(1)j}(t)$ to $U_{estB(n)j}(t)$ (step S747).

When there is no vehicle 6 traveling on the lane $L_j$ (N in step S742), the measurement device 1 does not perform the processing in steps S743 to S747.

When the integer j is not N (N in step S748), the measurement device 1 adds 1 to the integer j (step S749), and repeats the processing in steps S742 to S747.

Then, when the integer j is N (Y in step S748), the measurement device 1 ends the processing in the estimation waveform calculation step.

In the present embodiment, for each integer j of 1 or more and N or less and each integer i of 1 or more and n or less, the amplitude coefficient calculation unit 116 calculates the difference $e_{ij}(t)$ and the amplitude coefficient $D_{A(i)j}$ at which the difference $e_{ij}(t)$ is minimized between the displacement waveform $U_{A(i)j}(t)$ at the observation point $R_{j\_i}$ calculated by the measurement waveform calculation unit 115 and the waveform $D_{A(i)j}CP_{A(i)j}(t)$ obtained by multiplying the path deflection waveform $CP_{A(i)j}(t)$ at the observation point $R_{j\_i}$ calculated by the first path deflection waveform calculation unit 113 by the amplitude coefficient $D_{A(i)j}$. The amplitude coefficients $D_{A(1)1}$ to $D_{A(n)N}$ and the difference $e_{11}(t)$ to $e_{nN}(t)$ calculated by the amplitude coefficient calculation unit 116 are stored in the storage unit 130.

For each integer j of 1 or more and N or less and each integer i of 1 or more and n or less, the estimation waveform calculation unit 117 performs processing of adding the waveform $D_{A(i)j}CP_{Bj}(t)$ obtained by multiplying the path deflection waveform $CP_{Bj}(t)$ at the central position $CT_j$ calculated by the second path deflection waveform calculation unit 114 by the amplitude coefficient $D_{A(i)j}$ calculated by the amplitude coefficient calculation unit 116, calculating the estimation waveform $U_{estB(i)j}(t)$ of displacement as the physical quantity at the central position $CT_j$, and calculating the estimation waveform $U_{estBj}(t)$ of displacement at the central position $CT_j$ by averaging the estimation waveforms $U_{estB(1)j}(t)$ to $U_{estB(n)j}(t)$. The estimation waveforms $U_{estB1}(t)$ to $U_{estBN}(t)$ calculated by the estimation waveform calculation unit 117 are stored in the storage unit 130.

Other configurations of the measurement device 1 are the same as those of the first embodiment, and description thereof will be omitted.

In the measurement method according to the fourth embodiment described above, the measurement device 1 calculates, according to Equation (91), the amplitude coefficient $D_{A(i)j}$ at which the difference $e_{ij}(t)$ is minimized between the displacement waveform $U_{A(i)j}(t)$ at the observation point $R_{j\_1}$ and the waveform obtained by multiplying the path deflection waveform $CP_{A(i)j}(t)$ at the observation point $R_{j\_i}$ by the amplitude coefficient $D_{A(i)j}$, and calculates the difference $e_{ij}(t)$ according to Equation (94). Then, according to Equation (95), the measurement device 1 calculates the estimation waveform $U_{estB(i)j}(t)$ of displacement at the central position $CT_j$, generated by the observation point $R_{j\_i}$, by adding the difference $e_{ij}(t)$ to the waveform obtained by multiplying the path deflection waveform $CP_{Bj}(t)$ at the central position $CT_j$ by the amplitude coefficient $D_{A(i)j}$, and calculates the estimation waveform $U_{estBj}(t)$ of displacement at the central position $CT_j$ by averaging estimation waveforms $U_{estB(1)j}(t)$ to $U_{estB(n)j}(t)$ from the observation points $R_{j\_1}$ to $R_{j\_n}$. Therefore, according to the measurement method in the fourth embodiment, for example, even when it is difficult to provide a sensor at the central position $CT_j$, the measurement device 1 can estimate the displacement at the central position $CT_j$ without observing the central position $CT_j$. Further, according to the measurement method in the fourth embodiment, since the difference $e_{ij}(t)$ includes environmental noise caused by the vibration and the like of the superstructure 7, highly accurate estimation waveforms $U_{estB(1)j}(t)$ to $U_{estB(n)j}(t)$ can be obtained. Further, since random noise included in each of the estimation waveforms $U_{estB(1)j}(t)$ to $U_{estB(n)j}(t)$ is averaged, the noise component included in the estimation waveform $U_{estBj}(t)$ is reduced. Therefore, the measurement device 1 can accurately estimate the displacement at the central position $CT_j$.

In addition, according to the measurement method in the fourth embodiment, the same effects as those of the first embodiment can be obtained.

5. Fifth Embodiment

In the first to fourth embodiments, the measurement device 1 calculates the estimation waveform $U_{estBj}(t)$ of displacement as the physical quantity at the central position $CT_j$ for each lane $L_j$. In contrast, in a measurement method according to a fifth embodiment, an estimation waveform $W_{estBj}(t)$ of load generated by the vehicle 6 as the physical quantity at the central position $CT_j$ is calculated. In the fifth embodiment, the same components as those in the first to fourth embodiments are denoted by the same reference numerals, and the description repeated with the first to fourth embodiments will be omitted or simplified, and differences from the first to fourth embodiments will be mainly described.

In the present embodiment, the measurement device 1 performs low pass filter processing on an acceleration detected by the sensor 23 that observes the observation point $R_j$, and then performs double-integration to calculate a displacement waveform $U_{Aj}(t)$ at the observation point $R_j$. Then, the measurement device 1 converts the displacement waveform $U_{Aj}(t)$ into a load waveform $W_{Aj}(t)$ generated by the vehicle 6 according to Equation (97). A first-order coefficient $Sc_j$ and a zero-order coefficient $Ic_j$ in Equation (97) are obtained by a load test performed on a plurality of vehicles.

$$W_{Aj}(t) = Sc_j \cdot U_{Aj}(t) + Ic_j \tag{97}$$

When $Ic_j$ is sufficiently small in Equation (97), Equation (98) is obtained.

$$W_{Aj}(t) = Sc_j \cdot U_{Aj}(t) \tag{98}$$

The measurement device 1 can convert the displacement waveform $U_{Aj}(t)$ into the load waveform $W_{Aj}(t)$ according to a correlation Equation (97) or a correlation Equation (98).

A relationship between the load waveform $W_{Aj}(t)$ and the path deflection waveform $CP_{Aj}(t)$ is expressed as in Equation (99) using an amplitude coefficient $D_{Aj}$, which corresponds to a ratio of maximum amplitudes of the load waveform $W_{Aj}(t)$ and the path deflection waveform $CP_{Aj}(t)$.

$$W_{Aj}(t) = D_{Aj}CP_{Aj}(t) + e_j(t) \tag{99}$$

In Equation (99), the amplitude coefficient $D_{Aj}$ at which a difference $e_j(t)$ is minimized between the load waveform $W_{Aj}(t)$ and a waveform $D_{Aj}CP_{Aj}(t)$ obtained by multiplying the path deflection waveform $CP_{Aj}(t)$ by the amplitude coefficient $D_{Aj}$ can be obtained by, for example, a least square method as in Equation (100).

$$D_{Aj} = \frac{W_{Aj}(t)CP_{Aj}(t)}{CP_{Aj}(t)^2} \tag{100}$$

Substituting the amplitude coefficient $D_{Aj}$ into Equation (101), which is transformed from Equation (99), the difference $e_j$ between the load waveform $W_{Aj}(t)$ at the observation point $R_j$ generated by the vehicle 6 and the path deflection waveform $CP_{Aj}(t)$ at the observation point $R_j$ of the lane $L_j$ is obtained.

$$e_j(t) = W_{Aj}(t) - D_{Aj}CP_{Aj}(t) \quad (101)$$

Then, as in Equation (102), the measurement device 1 calculates the estimation waveform $W_{estBj}(t)$ of load at the central position $CT_j$ generated by the vehicle 6, by multiplying the path deflection waveform $CP_{Bj}(t)$ at the central position $CT_j$ of the lane $L_j$ obtained according to the above Equation (49) by the amplitude coefficient $D_{Aj}$ obtained according to Equation (100).

$$W_{estBj}(t) = D_{Aj}CP_{Bj}(t) \quad (102)$$

Alternatively, as in Equation (103), the measurement device 1 calculates the estimation waveform $W_{estBj}(t)$ of load at the central position $CT_j$ generated by the vehicle 6, by adding the difference $e_j(t)$ to a waveform obtained by multiplying the path deflection waveform $CP_{Bj}(t)$ at the central position $CT_j$ of the lane $L_j$ by the amplitude coefficient $D_{Aj}$.

$$W_{estBj}(t) = D_{Aj}CP_{Bj}(t) + e_j(t) \quad (103)$$

Figure 44:
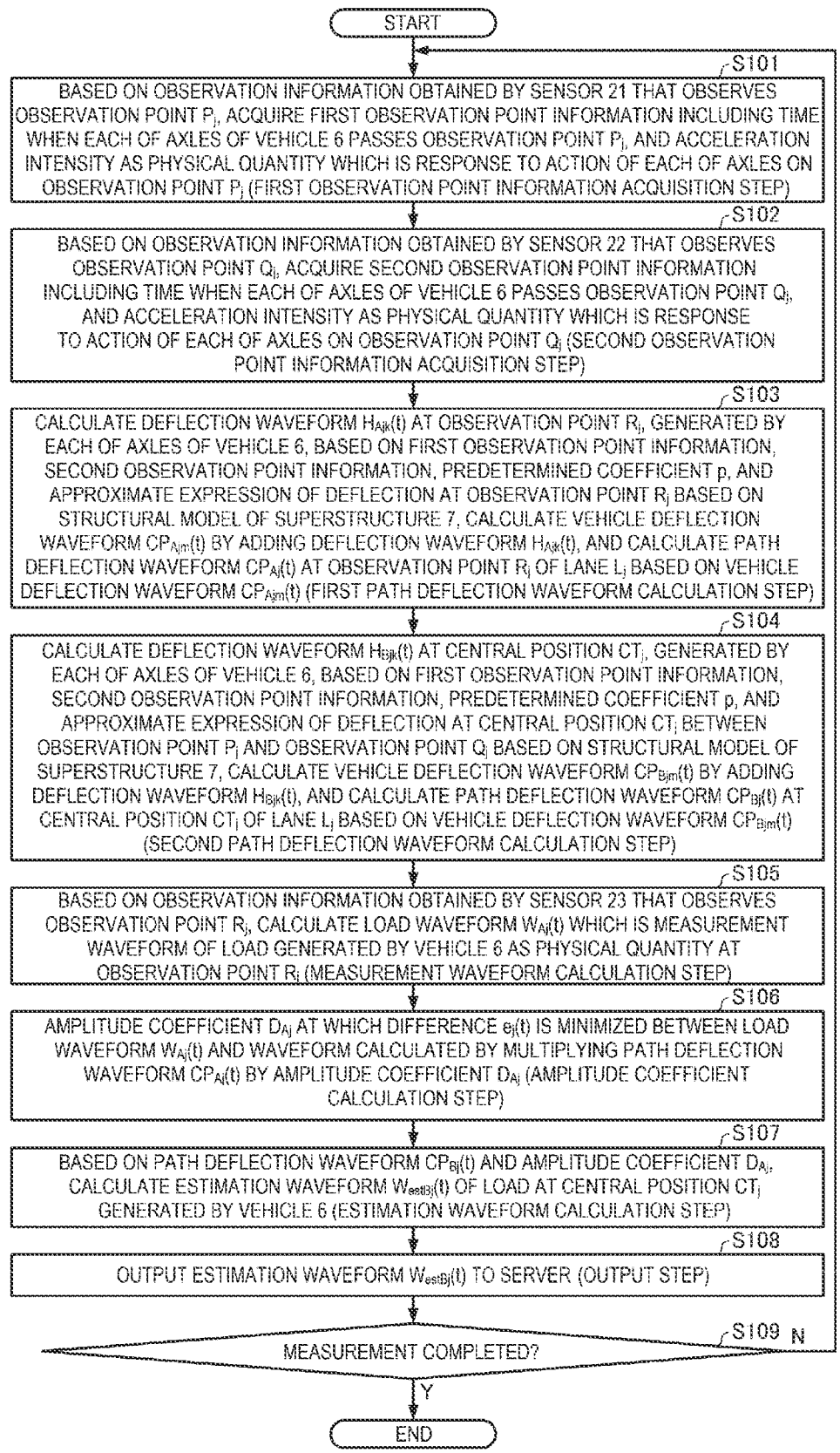
FIG. 44 is a flowchart showing an example of a procedure of a measurement method according to a fifth embodiment.

FIG. 44 is a flowchart showing an example of a procedure of the measurement method according to the fifth embodiment. In the present embodiment, the measurement device 1 executes the procedure shown in FIG. 44.

As shown in FIG. 44, first, the measurement device 1 performs the processing in steps S101 to S104 which are similar to steps S1 to S4 in FIG. 27.

Next, for each integer j of 1 or more and N or less, and based on the observation information by the sensor 23 that observes the observation point $R_j$, the measurement device 1 calculates the load waveform $W_{Aj}(t)$ which is the measurement waveform of load generated by the vehicle 6 as the physical quantity at the observation point $R_j$ (step S105). The measurement device 1 calculates the displacement waveform $U_{Aj}(t)$ by double-integrating the acceleration detected by the sensor 23 after low-pass filtering processing, and converts the displacement waveform $U_{Aj}(t)$ into the load waveform $W_{Aj}(t)$ according to the correlation Equation (97) or the correlation Equation (98). The step S105 is a measurement waveform calculation step.

Next, for each integer j of 1 or more and N or less, the measurement device 1 calculates the amplitude coefficient $D_{Aj}$ at which the difference $e_j(t)$ is minimized between the load waveform $W_{Aj}(t)$ calculated in step S105 and the waveform $D_{Aj}CP_{Aj}(t)$ obtained by multiplying the path deflection waveform $CP_{Aj}(t)$ calculated in step S103 by the amplitude coefficient $D_{Aj}$ (step S106). The measurement device 1 calculates the amplitude coefficient $D_{Aj}$ according to Equation (100). In step S106, the measurement device 1 may calculate the difference $e_j(t)$ between the load waveform $W_{Aj}(t)$ and the path deflection waveform $CP_{Aj}(t)$ according to Equation (101). The step S106 is an amplitude coefficient calculation step.

Next, for each integer j of 1 or more and N or less, and based on the path deflection waveform $CP_{Bj}(t)$ calculated in step S104 and the amplitude coefficient $D_{Aj}$ calculated in step S106, the measurement device 1 calculates the estimation waveform $W_{estBj}(t)$ of load at the central position $CT_j$ generated by the vehicle 6 (step S107). The measurement device 1 calculates the estimation waveform $W_{estBj}(t)$ according to Equation (102) or Equation (103). The step S107 is an estimation waveform calculation step.

Next, for each integer j of 1 or more and N or less, the measurement device 1 outputs the estimation waveform $W_{estBj}(t)$ calculated in step S107 to the server 2 (step S108). The step S108 is an output step.

The measurement device 1 repeats the processing in steps S101 to S108 until the measurement is completed (N in step S109).

In the present embodiment, for each integer j of or more and N or less, and based on the observation information obtained by the sensor 23 that observes the observation point $R_j$, the measurement waveform calculation unit 115 calculates the load waveform $W_{Aj}(t)$ which is the measurement waveform of load generated by the vehicle 6 as the physical quantity at the observation point $R_j$. That is, the measurement waveform calculation unit 115 performs the processing of the measurement waveform calculation step in FIG. 44. The load waveforms $W_{A1}(t)$ to $W_{AN}(t)$ calculated by the measurement waveform calculation unit 115 are stored in the storage unit 130.

For each integer j of 1 or more and N or less, the amplitude coefficient calculation unit 116 performs processing of calculating the amplitude coefficient $D_{Aj}$ at which the difference $e_j(t)$ is minimized between the load waveform $W_{Aj}(t)$ at the observation point $R_j$ calculated by the measurement waveform calculation unit 115 and the waveform $D_{Aj}CP_{Aj}(t)$ obtained by multiplying the path deflection waveform $CP_{Aj}(t)$ at the observation point $R_j$ calculated by the first path deflection waveform calculation unit 113 by the amplitude coefficient $D_{Aj}$. Further, the amplitude coefficient calculation unit 116 may calculate the difference $e_j(t)$. That is, the amplitude coefficient calculation unit 116 performs the processing of the amplitude coefficient calculation step in FIG. 44. The amplitude coefficients $D_{A1}$ to $D_{AN}$ and the differences $e_1(t)$ to $e_N(t)$ calculated by the amplitude coefficient calculation unit 116 are stored in the storage unit 130.

For each integer j of 1 or more and N or less, and based on the path deflection waveform $CP_{Bj}(t)$ at the central position $CT_j$ calculated by the second path deflection waveform calculation unit 114 and the amplitude coefficient DA calculated by the amplitude coefficient calculation unit 116, the estimation waveform calculation unit 117 performs processing of calculating the estimation waveform $W_{estBj}(t)$ of load generated by the vehicle 6 as the physical quantity at the central position $CT_j$. That is, the estimation waveform calculation unit 117 performs the processing of the estimation waveform calculation step in FIG. 44. The estimation waveforms $W_{estB1}(t)$ to $W_{estBN}(t)$ calculated by the estimation waveform calculation unit 117 are stored in the storage unit 130.

For each integer j of 1 or more and N or less, the output processing unit 118 performs processing of outputting the estimation waveform $W_{estBj}(t)$ calculated by the estimation waveform calculation unit 117 to the server 2 via the second communication unit 140. That is, the output processing unit 118 performs the processing of the output step in FIG. 44.

Other configurations of the measurement device 1 are the same as those of the first embodiment or the second embodiment, and description thereof will be omitted.

As in the third embodiment or the fourth embodiment, when the n observation points $R_{j\_1}$ to $R_{j\_n}$ located at positions other than the central position $CT_j$ are set for each lane $L_j$, the estimation waveform calculation unit 117 calculates the estimation waveform $W_{estBj}(t)$ of load at the central position $CT_j$ generated by the vehicle 6 by multiplying the path deflection waveform $CP_{Bj}(t)$ at the central position $CT_j$ by the average value $D_{Aj\_avg}$ of the amplitude coefficients $D_{A(1)j}$ to $D_{A(n)j}$, as in Equation (104) which is similar to the above Equation (93).

$$W_{estBj}(t) = D_{Aj\_avg}CP_{Bj}(t) \quad (104)$$

Alternatively, for each integer i of 1 or more and n or less, the estimation waveform calculation unit 117 calculates, as in Equation (105) which is similar to the above Equation (95), the estimation waveform $W_{estB(i)j}(t)$ of load at the central position $CT_j$ generated by the vehicle 6 by adding the difference $e_{ij}(t)$ to the waveform obtained by multiplying the path deflection waveform $CP_{Bj}(t)$ at the central position CT by the amplitude coefficient $D_{A(i)j}$, and, as in Equation (106) which is similar to the above Equation (96), calculates the estimation waveform $W_{estBj}(t)$ of load at the central position $CT_j$ generated by the vehicle 6 by averaging n estimation waveforms $W_{estB(1)j}(t)$ to $W_{estB(n)j}(t)$.

$$W_{estB(i)j}(t) = D_{A(i)j} CP_{Bj}(t) + e_{ij}(t) \tag{105}$$

$$W_{estBj}(t) = \frac{1}{n} \sum_{i=1}^{n} W_{estB(i)j}(t) \tag{106}$$

In the measurement method according to the fifth embodiment described above, the measurement device 1 calculates the load waveform $W_{Aj}(t)$ at the observation point $R_j$ based on the observation information obtained by the sensor 23 that observes the observation point $R_j$, and calculates, according to Equation (100), the amplitude coefficient $D_{Aj}$ at which the difference $e_j(t)$ is minimized between the load waveform $W_{Aj}(t)$ and the waveform obtained by multiplying the path deflection waveform $CP_{Aj}(t)$ at the observation point $R_j$ calculated by the amplitude coefficient $D_{Aj}$. Then, based on the path deflection waveform $CP_{Bj}(t)$ at the central position $CT_j$ and the calculated amplitude coefficient $D_{Aj}$, the measurement device 1 calculates the estimation waveform $W_{estBj}(t)$ of load at the central position $CT_j$ generated by the vehicle 6. For example, the measurement device 1 calculates, according to Equation (102), the estimation waveform $W_{estBj}(t)$ by multiplying the path deflection waveform $CP_{Bj}(t)$ by the average value $D_{Aj\_avg}$. Alternatively, the measurement device 1 calculates the difference $e_j(t)$ according to Equation (101), and calculates, according to Equation (103), the estimation waveform $W_{estBj}(t)$ by adding the difference $e_j(t)$ to the waveform obtained by multiplying the path deflection waveform $CP_{Bj}(t)$ at the central position $CT_j$ by the amplitude coefficient $D_{Aj}$. Alternatively, when n observation points $R_{j\_1}$ to $R_{j\_n}$ located at positions other than the central position $CT_j$ are set for each lane $L_j$, the measurement device 1 calculates the estimation waveform $W_{estBj}(t)$ according to Equation (104) or Equation (106). Therefore, according to the measurement method in the fifth embodiment, for example, even when it is difficult to provide a sensor at the central position $CT_j$, the measurement device 1 can estimate the load at the central position $CT_j$ generated by the vehicle 6 without observing the central position $CT_j$.

In addition, according to the measurement method of the fifth embodiment, the same effects as those of any one of the first to fourth embodiments can be obtained.

6. Modifications

The present disclosure is not limited to the above embodiments, and various modifications can be made within the scope of the gist of the present disclosure.

In each of the above embodiments, the observation device that observes observation points $P_1$ to $P_N$ and the observation device that observes observation points $Q_1$ to $Q_N$ are acceleration sensors, but the present disclosure is not limited thereto. For example, the observation device may be an impact sensor, a microphone, a strain gauge, or a load cell. It is not necessary that the observation device and the observation point have a one-to-one correspondence, and one observation device may observe a part or all of the observation points $P_1$ to $P_N$ and $Q_1$ to $Q_N$.

The impact sensor detects an impact acceleration as a response to the action of each axle of the vehicle 6 on the observation points $P_1$ to $P_N$ and $Q_1$ to $Q_N$. The measurement device 1 acquires first observation point information based on the impact acceleration for the observation points $P_1$ to $P_N$, and acquires second observation point information based on the impact acceleration for the observation points $Q_1$ to $Q_N$. The microphone detects sound as a response to the action of each axle of the vehicle 6 on the observation points $P_1$ to $P_N$ and $Q_1$ to $Q_N$. The measurement device 1 acquires first observation point information based on the sound for the observation points $P_1$ to $P_N$, and acquires second observation point information based on the sound for the observation points $Q_1$ to $Q_N$. The strain gauge and the load cell detects a stress change as a response to the action of each axle of the vehicle 6 on the observation points $P_1$ to $P_N$ and $Q_1$ to $Q_N$. The measurement device 1 acquires first observation point information based on the stress change for the observation points $P_1$ to $P_N$, and acquires second observation point information based on the stress change for the observation points $Q_1$ to $Q_N$.

In each of the above embodiments, the observation devices that observe the observation points $R_1$ to $R_N$ are acceleration sensors, but the present disclosure is not limited thereto. For example, the observation device may be a contact type displacement meter, a ring type displacement meter, a laser displacement meter, a pressure sensor, a displacement measurement device by image processing, or a displacement measurement device by an optical fiber. It is not necessary that the observation device and the observation point have a one-to-one correspondence, and one observation device may observe a part or all of the observation points $R_1$ to $R_N$.

The contact type displacement meter, the ring type displacement meter, the laser displacement meter, the displacement measurement device by image processing, and the displacement measurement device by the optical fiber measure a displacement as a response to the action of the vehicle 6 on the observation points $R_1$ to $R_N$. The measurement device 1 calculates, based on the displacement at the observation points $R_1$ to $R_N$, a displacement or a measurement waveform of load generated by the vehicle 6 as a physical quantity at the observation points $R_1$ to $R_N$. The pressure sensor detects a stress change as a response to the action of the vehicle 6 on the observation points $R_1$ to $R_N$. The measurement device 1 calculates, based on the stress change at the observation points $R_1$ to $R_N$, the displacement or the measurement waveform of load generated by the vehicle 6 as the physical quantity at the observation points $R_1$ to $R_N$.

In each of the above embodiments, the direction in which the vehicle 6 travels on the lanes $L_1$ to $L_N$ is all the same. Alternatively, the traveling direction of the vehicle 6 may be different from at least one lane of the lanes $L_1$ to $L_N$ and other lanes. For example, the vehicle 6 may travel in a direction from the observation point $P_1$ to the observation point $Q_1$ on the lane $L_1$, and may travel in a direction from the observation point $Q_2$ to the observation point $P_2$ on the lane $L_2$. In this case, the measurement device 1 acquires the entry time point of the vehicle 6 to the lane $L_1$ based on the acceleration data output from the sensor 21 that observes the observation point $P_1$, and acquires the exit time point of the vehicle 6 from the lane $L_1$ based on the acceleration data output from the sensor 22 that observes the observation point $Q_1$. The measurement device 1 acquires the entry time point of the vehicle 6 to the lane $L_2$ based on the acceleration data output from the sensor 22 that observes the observation point $Q_2$, and acquires the exit time point of the vehicle 6 from the lane $L_2$ based on the acceleration data output from the sensor 21 that observes the observation point $P_2$.

In each of the above embodiments, the sensors 21, 22, and 23 are provided on the main girder G of the superstructure 7. Alternatively, the sensors may be provided on the surface or inside of the superstructure 7, a lower surface of the floor plate F, the bridge pier 8*a*, or the like. In each of the above embodiments, the road bridge is taken as an example of the bridge 5, but the present disclosure is not limited thereto. For example, the bridge 5 may be a railway bridge. In each of the above embodiments, the superstructure of the bridge is taken as an example of the structure, but the present disclosure is not limited thereto. The structure may be deformed by the movement of the moving object.

The embodiments and the modifications described above are merely examples, and the present disclosure is not limited thereto. For example, the embodiments and the modifications can be combined as appropriate.

The present disclosure includes a configuration substantially the same as the configuration described in the embodiments, for example, a configuration having the same function, method, and result, or a configuration having the same object and effect.

The present disclosure includes a configuration in which a non-essential portion of the configuration described in the embodiment are replaced. In addition, the present disclosure includes a configuration having the same action effect as the configuration described in the embodiment, or a configuration capable of achieving the same object. The present disclosure includes a configuration in which a known technique is added to the configuration described in the embodiment.

What is claimed is:

1. A measurement method for causing a processor to execute a program stored in a memory, the measurement method comprising executing on the processor the steps of:

causing a first observation device to acquire first observation point information, the first observation device being disposed at a first observation point of a structure, the structure being a superstructure of a road bridge or a railway bridge, of a moving object moving on the superstructure along a first direction, the first observation point information including a plurality of first physical quantities in association with a first plurality of times, each of the plurality of first physical quantities corresponding to a response to an action of each of a plurality of parts of the moving object that passes by the first observation point at each of the first plurality of times;

causing a second observation device to acquire second observation point information, the second observation device being disposed at a second observation point of a structure, the second observation device being spaced apart from the first observation device along the first direction, the second observation point information including a plurality of second physical quantities in association with a second plurality of times, each of the plurality of second physical quantities corresponding to a response to an action of each of a plurality of parts of the moving object that passes by the second observation point at each of the second plurality of times;

calculating a first plurality of deflection waveforms at a third observation point, generated by the plurality of parts, based on the first observation point information, the second observation point information, a predetermined coefficient, and a first approximate expression of deflection at the third observation point according to a structural model of the structure, the third observation point being located between the first and second observation points along the first direction and shifted from a central position between the first and second observation points along the first direction;

calculating a first object deflection waveform at the third observation point penetrated by the moving object by adding the first plurality of deflection waveforms, calculating a first path deflection waveform at the third observation point based on the first object deflection waveform;

calculating a second plurality of deflection waveforms at the central position, generated by the plurality of parts, based on the first observation point information the second observation point information, the predetermined coefficient and a second approximate expression of deflection at the central position according to the structural model of the structure;

calculating a second object deflection waveform at central position generated by the moving object by the second plurality of deflection waveforms;

calculating a second path deflection waveform at the central position based on the second object deflection waveform;

causing a third observation device to acquire third observation point information, the third observation device being disposed at the third observation point of the structure, the third observation point information including a third physical quantity, the third physical quantity corresponding to a response to an action of the moving object that passes by the third observation point;

calculating a measurement waveform of the third physical quantity based on the third observation point information;

calculating an amplitude coefficient at which a difference is minimized between the measurement waveform and a waveform obtained by multiplying the first path deflection waveform by the amplitude coefficient;

calculating an estimation waveform at the central position based on the second path deflection waveform and the amplitude coefficient; and transmitting information relating to the estimation waveform to a server, the server monitoring the superstructure based on the estimation waveform.

2. The measurement method according to claim 1, wherein the processor is configured to calculate the estimation waveform by multiplying the second path deflection waveform at the central position by the amplitude coefficient.

3. The measurement method according to claim 1, wherein the processor is configured to calculate the estimation waveform by adding the difference to a waveform obtained by multiplying the second path deflection waveform at the central position by the amplitude coefficient.

4. The measurement method according to claim 1, wherein
for an integer n of 2 or more, between the first observation point and the second observation point, the third observation point to an (n+2)th observation point are arranged along the first direction,
for each integer i of 1 or more and n or less, a deflection waveform at the (i+2)th observation point generated by the plurality of parts is calculated based on the first observation point information, the second observation point information, the predetermined coefficient, and an approximate expression of deflection at the (i+2)th observation point based on the structural model of the structure), and a deflection waveform at the (i+2)th observation point generated by the moving object is calculated by adding the deflection waveform at the (i+2)th observation point generated by the plurality of parts, and a path deflection waveform at the (i+2)th observation point is calculated based on the deflection waveform at the (i+2)th observation point generated by the moving object,
for each integer i, a measurement waveform as a physical quantity at the (i+2)th observation point is calculated based on observation information obtained by an observation device that observes the (i+2)th observation point,
for each integer i, an i-th amplitude coefficient at which an i-th difference is minimized between a measurement waveform at the (i+2)th observation point and a waveform obtained by multiplying a path deflection waveform at the (i+2)th observation point by the i-th amplitude coefficient is calculated, and
the estimation waveform is calculated based on the second path deflection waveform at the central position and an average value of the first to n-th amplitude coefficients.

5. The measurement method according to claim 4, wherein
the processor is configured to calculate the estimation waveform by multiplying the second path deflection waveform at the central position by the average value.

6. The measurement method according to claim 4, wherein
for each integer i, the i-th amplitude coefficient and the i-th difference are calculated, and
for each integer i, the i-th estimation waveform as the physical quantity at the central position is calculated by adding the i-th difference to the waveform obtained by multiplying the second path deflection waveform at the central position by the i-th amplitude coefficient, and the estimation waveform is calculated by averaging the first to n-th estimation waveforms.

7. The measurement method according to claim 1, wherein
the third physical quantity at the third observation point is a displacement or a load generated by the moving object with respect to the superstructures.

8. The measurement method according to claim 1, wherein
the first observation point is set at a first end portion of the superstructure, and
the second observation point is set at a second end portion of the superstructure, and the second end portion is different from the first end portion.

9. The measurement method according to claim 1, wherein
the second approximate expression of deflection at the central position and the first approximate expression of deflection at the third observation point are normalized by a maximum value of the second approximate expression of deflection at the central position.

10. The measurement method according to claim 1, wherein
the moving object is a railroad vehicle, an automobile, a tram, a construction vehicle, or a military vehicle, and
the plurality of parts are axles or wheels.

11. The measurement method according to claim 1, wherein
the structural model is a simple beam that supports both ends.

12. The measurement method according to claim 1, wherein
the first observation device that observes the first observation point, the second observation device that observes the second observation point, and the third observation device that observes the third observation point are acceleration sensors.

13. The measurement method according to claim 1, wherein
each of the first observation device that observes the first observation point and the second observation device that observes the second observation point is an impact sensor, a microphone, a strain gauge, or a load cell.

14. The measurement method according to claim 1, wherein
the third observation device that observes the third observation point is a contact type displacement meter, a ring type displacement meter, a laser displacement meter, a pressure sensor, a displacement measurement device by image processing, or a displacement measurement device by an optical fiber.

15. The measurement method according to claim 1, wherein
the superstructure is a structure across any one of a bridge abutment and a bridge pier adjacent to each other, two adjacent bridge abutments, or two adjacent bridge piers, and
both end portions of the superstructure are located at positions of the bridge abutment and the bridge pier adjacent to each other, at positions of the two adjacent bridge abutments, or at positions of the two adjacent bridge piers.

16. The measurement method according to claim 1, wherein
the structure is a structure in which bridge weigh in motion (BWIM) functions.

17. A measurement device comprising:
a memory configured to store a program; and
a processor configured to execute the program so as to:
cause a first observation device to acquire first observation point information, the first observation device being disposed at a first observation point of a structure, the structure being a superstructure of a road bridge or a railway bridge, of a moving object moving on the superstructure along a first direction, the first observation point information including a plurality of first physical quantities in association with a first plurality of times, each of the plurality of first physical quantities corresponding to a response to an action of each of a plurality of parts of the moving object that passes by the first observation point at each of the first plurality of times;

cause a second observation device to acquire second observation point information, the second observation device being disposed at a second observation point of a structure, the second observation device being spaced apart from the first observation device along the first direction, the second observation point information including a plurality of second physical quantities in association with a second plurality of times, each of the plurality of second physical quantities corresponding to a response to an action of each of a plurality of parts of the moving object that passes by the second observation point at each of the second plurality of times;

calculate a first plurality of deflection waveforms at a third observation point, generated by the plurality of parts, based on the first observation point information, the second observation point information, a predetermined coefficient, and a first approximate expression of deflection at the third observation point according to a structural model of the structure, the third observation point being located between the first and second observation points along the first direction and shifted from a central position between the first and second observation points along the first direction;

calculate a first object deflection waveform at the third observation point penetrated by the moving object by adding the first plurality of deflection waveforms, calculate a first path deflection waveform at the third observation point based on the first object deflection waveform;

calculate a second plurality of deflection waveforms at the central position, generated by the plurality of parts, based on the first observation point information the second observation point information, the predetermined coefficient, and a second approximate expression of deflection at the central position according to the structural model of the structure;

calculate a second object deflection waveform at central position generated by the moving object by the second plurality of deflection waveforms;

calculate a second path deflection waveform at the central position based on the second object deflection waveform;

causing a third observation device to acquire third observation point information, the third observation device being disposed at the third observation point of the structure, the third observation point information including a third physical quantity, the third physical quantity corresponding to a response to an action of the moving object that passes by the third observation point;

calculate a measurement waveform of the third physical quantity based on the third observation point information;

calculate an amplitude coefficient at which a difference is minimized between the measurement waveform and a waveform obtained by multiplying the first path deflection waveform by the amplitude coefficient;

calculate an estimation waveform at the central position based on the second path deflection waveform and the amplitude coefficient; and transmit information relating to the estimation waveform to a server, the server monitoring the superstructure based on the estimation waveform.

18. A measurement system comprising:
the measurement device according to claim 17;
the first observation device that observes the first observation point;
the second observation device that observes the second observation point; and
the third observation device that observes the third observation point.

19. A measurement computer program product embodying computer readable instruction stored on a non-transitory computer-readable medium for causing a computer to execute a process by a processor so as to perform the steps of:

causing a first observation device to acquire first observation point information, the first observation device being disposed at a first observation point of a structure, the structure being a superstructure of a road bridge or a railway bridge, of a moving object moving on the superstructure along a first direction, the first observation point information including a plurality of first physical quantities in association with a first plurality of times, each of the plurality of first physical quantities corresponding to a response to an action of each of a plurality of parts of the moving object that passes by the first observation point at each of the first plurality of times;

causing a second observation device to acquire second observation point information, the second observation device being disposed at a second observation point of a structure, the second observation device being spaced apart from the first observation device along the first direction, the second observation point information including a plurality of second physical quantities in association with a second plurality of times, each of the plurality of second physical quantities corresponding to a response to an action of each of a plurality of parts of the moving object that passes by the second observation point at each of the second plurality of times;

calculating a first plurality of deflection waveforms at a third observation point, generated by the plurality of parts, based on the first observation point information, the second observation point information, a predetermined coefficient, and a first approximate expression of deflection at the third observation point according to a structural model of the structure, the third observation point being located between the first and second observation points along the first direction and shifted from a central position between the first and second observation points along the first direction;

calculating a first object deflection waveform at the third observation point penetrated by the moving object by adding the first plurality of deflection waveforms, calculating a first path deflection waveform at the third observation point based on the first object deflection waveform;

calculating a second plurality of deflection waveforms at the central position, generated by the plurality of parts, based on the first observation point information the second observation point information, the predetermined coefficient and a second approximate expression of deflection at the central position according to the structural model of the structure;

calculating a second object deflection waveform at central position generated by the moving object by the second plurality of deflection waveforms;

calculating a second path deflection waveform at the central position based on the second object deflection waveform;

causing a third observation device to acquire third observation point information, the third observation device being disposed at the third observation point of the structure, the third observation point information including a third physical quantity, the third physical quantity corresponding to a response to an action of the moving object that passes by the third observation point;

calculating a measurement waveform of the third physical quantity based on the third observation point information;

calculating an amplitude coefficient at which a difference is minimized between the measurement waveform and a waveform obtained by multiplying the first path deflection waveform by the amplitude coefficient;

calculating an estimation waveform at the central position based on the second path deflection waveform and the amplitude coefficient; and transmitting information relating to the estimation waveform to a server, the server monitoring the superstructure based on the estimation waveform.

\* \* \* \* \*